United States Patent
Nagai et al.

(10) Patent No.: US 7,911,325 B2
(45) Date of Patent: Mar. 22, 2011

(54) COMMUNICATION SYSTEM, AND ENDPOINT DEVICE AND INTERROGATOR

(75) Inventors: Takuya Nagai, Nagoya (JP); Tsuyoshi Ohashi, Hashima (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1189 days.

(21) Appl. No.: 10/791,879

(22) Filed: Mar. 4, 2004

(65) Prior Publication Data

US 2004/0235428 A1    Nov. 25, 2004

(30) Foreign Application Priority Data

Mar. 6, 2003  (JP) ................................ 2003-059851
Mar. 31, 2003 (JP) ................................ 2003-095434
Apr. 16, 2003 (JP) ................................ 2003-111100

(51) Int. Cl.
*H04Q 5/22* (2006.01)
*H03K 17/00* (2006.01)

(52) U.S. Cl. .................. 340/10.2; 340/825.73; 340/2.2; 340/2.7; 340/2.8

(58) Field of Classification Search ................ 455/450; 370/344, 343; 340/7.32, 7.36, 7.37, 636.19, 340/636.1, 455, 855.8, 539.3, 10.34, 333
See application file for complete search history.

(56) References Cited

U.S. PATENT DOCUMENTS

| | | | |
|---|---|---|---|
| 5,103,222 A | | 4/1992 | Hogen Esch et al. |
| 5,621,412 A | * | 4/1997 | Sharpe et al. ............. 340/10.33 |
| 5,686,902 A | * | 11/1997 | Reis et al. ..................... 340/10.2 |
| 5,821,470 A | * | 10/1998 | Meyer et al. .................. 181/155 |
| 5,940,006 A | * | 8/1999 | MacLellan et al. .......... 340/10.1 |
| 5,945,920 A | | 8/1999 | Maletsky |

(Continued)

FOREIGN PATENT DOCUMENTS

CA    2219075    6/1998

(Continued)

*Primary Examiner* — Brian A Zimmerman
*Assistant Examiner* — Omer S Khan
(74) *Attorney, Agent, or Firm* — Oliff & Berridge, PLC

(57) ABSTRACT

A communication system wherein each endpoint device which has received an interrogating signal from an interrogator responds with a reflected signal generated by modulating the interrogating signal with appropriate information, wherein each endpoint device includes a distance detecting portion operable to detect a distance between the interrogator and the endpoint device, a reflecting portion operable to receive and reflect the interrogating signal, an information generating portion operable to generate replying information to be transmitted to the interrogator, a band determining portion operable to determine, on the basis of the detected distance, a frequency band of a modulating signal used to modulate a reflected signal generated by the reflecting portion, and a modulating-signal generating portion operable, according to the replying information, to generate the modulating signal having a frequency within the determined frequency band. The distance detecting portion may be provided in the interrogator, rather than in the endpoint device. The frequency of the modulating signal may be determined on the basis of the number of the endpoint devices ready for communication with the interrogator, or a distribution of overall frequency utilization ratio of the reflected signals received from the individual endpoint devices.

10 Claims, 35 Drawing Sheets

U.S. PATENT DOCUMENTS

| | | | |
|---|---|---|---|
| 6,008,760 A * | 12/1999 | Shattil | 342/378 |
| 6,088,416 A * | 7/2000 | Perahia et al. | 375/377 |
| 6,107,910 A * | 8/2000 | Nysen | 340/10.1 |
| 6,177,861 B1 | 1/2001 | MacLellan et al. | |
| 6,346,884 B1 * | 2/2002 | Uozumi et al. | 340/572.1 |
| 6,362,737 B1 * | 3/2002 | Rodgers et al. | 340/572.1 |
| 6,792,276 B1 * | 9/2004 | Butovitsch et al. | 455/453 |
| 6,839,560 B1 * | 1/2005 | Bahl et al. | 455/456.1 |
| 6,963,184 B2 * | 11/2005 | Carlson | 318/460 |
| 2001/0020897 A1 * | 9/2001 | Takatori et al. | 340/572.7 |
| 2001/0040508 A1 * | 11/2001 | Janning et al. | 340/573.3 |
| 2002/0122003 A1 * | 9/2002 | Patwari et al. | 342/450 |
| 2006/0072649 A1 * | 4/2006 | Chang et al. | 375/132 |

FOREIGN PATENT DOCUMENTS

| | | |
|---|---|---|
| JP | A 64-080892 | 3/1989 |
| JP | A 09-200089 | 7/1997 |
| JP | A 10-093479 | 4/1998 |
| JP | A 10-293825 | 11/1998 |
| JP | A 2000-049656 | 2/2000 |
| JP | A 2000-49658 | 2/2000 |
| JP | A 2001-504625 | 4/2001 |

* cited by examiner

FIG.4

| DISTANCE(m) | CENTER FREQUENCY OF BANDS(kHz) |
|---|---|
| 0.5 | 300 |
| 0.6 | 290 |
| 0.7 | 280 |
| . | . |
| . | . |
| . | . |
| 3.0 | 50 |

COMMUNICATION SYSTEM, AND ENDPOINT DEVICE AND INTERROGATOR

This application is based on Japanese Patent Applications No. 2003-059851 filed Mar. 6, 2003, No. 2003-095434 filed Mar. 31, 2003, and No. 2003-111100 filed Apr. 16, 2003, the contents of which are incorporated hereinto by reference.

BACKGROUND OF THE INVENTION

1. Field of the Invention

The present invention relates in general to a communication system, and more particularly to improvements of an interrogator and endpoint or local devices (e.g., so-called "tags") included in a communication system which is arranged such that the endpoint devices which have received an interrogating signal transmitted from the interrogator respond to the interrogator with modulated reflected signals.

2. Discussion of Related Art

There is known a communication system wherein an interrogator transmits a main carrier to a plurality of endpoint devices or local devices (which may be so-called "tags"), and each endpoint device which has received the main carrier responds to the interrogator with a reflected signal which is generated by modulating the main carrier with appropriate information such as an identification signal which identifies the endpoint device. In this type of communication system, the endpoint devices are available at a comparatively low cost, so that the system has a high degree of cost performance, particularly where the system includes a relatively large number of endpoint devices. On the other hand, however, this communication system tends to suffer from a problem of a collision among the reflected signals transmitted from a large number of endpoint devices. In an attempt to solve this drawback, there have been proposed some solutions, such as 1) provision of a time slotted structure including a plurality of time slots or frames for the respective endpoint devices to respond to the interrogator, and 2) frequency hopping technology involving frequency division multiplexing of subcarrier signals used for modulating reflected signals to be transmitted from the endpoint devices, and random selection of the subcarrier signal frequency for each reflected signal. Examples of the above-indicated solutions are disclosed in U.S. Pat. No. 6,177,861 B1 (corresponding to JP-2000-49656 A).

However, the provision of the plurality of time slots requires a long time to complete the data communication of the interrogator with all of a large number of endpoint devices.

On the other hand, the frequency division multiplexing technology using the frequency hopping reduces the time required to complete the data communication of the interrogator with all of the endpoint devices. However, the reflected signal transmitted from an endpoint device which is relatively distant from the interrogator may interfere with the reflected signals transmitted from endpoint devices relatively near the interrogator, or with higher harmonics of the reflected signals. In this case, the interrogator may not even recognize the presence of the reflected signal transmitted from the endpoint device distant from the interrogator. Where the plurality of endpoint devices transmit the reflected signals using the same subcarrier frequency, the interrogator may not correctly demodulate the reflected signals if the reflected signals have substantially the same intensity. In this event, the interrogator can transmit a retry request signal asking the endpoint devices to repeat the transmission of the reflected signals. When the reflected signal transmitted from the endpoint device relatively distant from the interrogator interferes with the reflected signals transmitted from the endpoint devices relatively near the interrogator or the higher harmonics of the reflected signals, the interrogator can correctly demodulate the reflected signals from the nearby endpoint devices, so that the interrogator does not transmit the retry request signal, resulting in a failure of the interrogator to recognize the reflected signal transmitted from the relatively distant endpoint device.

In a communication system of the frequency hopping type wherein the number of endpoint devices varies, the frequency range in which the subcarrier frequency hopping is implemented need to be as broad as possible, in order to reliably avoid a collision among the reflected signals from the endpoint devices. However, an increase in the subcarrier frequency range results in an increase in the ratio of the used subcarrier signals having relatively high frequencies, leading to an accordingly increased amount of consumption of electric power by the endpoint devices, and an accordingly reduced service life of the endpoint devices where the endpoint devices have a relatively small electric energy storage capacity.

U.S. Pat. No. 6,177,861 B1 also discloses a technique to change the timing for the endpoint devices to respond to the interrogator, for the purpose of avoiding a collision among the reflected signals. However, this technique requires a relatively long data communication time due to the time required for changing the timing. To overcome this drawback, it is considered to use a large number of spread codes for establishing a quasi-random system, in order to avoid the collision. This technique requires a complex operation to assign the spread codes to the respective endpoint devices, and requires the interrogator to discriminate the large number of spread codes from each other.

SUMMARY OF THE INVENTION

The present invention was made in view of the background art discussed above. It is a first object of the present invention to provide an endpoint device for use in a communication system, which endpoint device permits data communication with an interrogator, without a collision between a reflected signal transmitted from the endpoint device relatively distant from the interrogator and a reflected signal transmitted from another endpoint device relatively near the interrogator or higher harmonics of the reflected signals.

A second object of the invention is to provide a communication system including endpoint devices each of which permits data communication with the interrogator without such collision as described above.

A third object of the invention is to provide a communication system arranged to minimize the amount of electric energy required by the endpoint devices and a risk of collision among the reflected signals from the endpoint devices.

A fourth object of the invention is to provide an interrogator for use in such communication system as described above with respect to the third object.

A fifth object of the invention is to provide an endpoint device for use in such communication system as described above with respect to the third object.

The first object indicated above may be achieved according to a first aspect of the present invention, which provides an endpoint device for use in a communication system wherein the endpoint device which has received an interrogating signal containing a main carrier and transmitted from an interrogator responds to the interrogator with a reflected signal which is generated by modulating the main carrier with appropriate information, the endpoint device comprising:

a distance detecting portion operable to detect a distance between the interrogator and the endpoint device;

a reflecting portion operable to receive and reflect the interrogating signal transmitted from the interrogator;

an information generating portion operable to generate replying information to be transmitted to the interrogator;

a band determining portion operable to determine, on the basis of the distance detected by the distance detecting portion, a frequency band of a modulating signal used to modulate a reflected signal generated by the reflecting portion; and a modulating-signal generating portion operable, according to the replying information generated by the information generating portion, to generate the modulating signal having a frequency within the frequency band determined by the band determining portion.

In the endpoint device according to the first aspect of this invention described above, the frequency band of the modulated signal to be transmitted from each endpoint device is determined on the basis of the distance between the endpoint device and the interrogator. Where the communication system includes a plurality of endpoint devices, which have respective different distances to and from the interrogator, the reflected signals transmitted from the different endpoint devices have respective different frequencies, so that a risk of collision among those reflected signals can be effectively minimized.

In a first preferred form of the endpoint device according to the first aspect of this invention, the band determining portion is operable to determine the frequency band of the modulating signal such that the determined frequency band increases with a decrease in the distance detected by the distance detecting portion.

In the communication system including the above-indicated first preferred form of the endpoint device, the frequency band determined in the endpoint device which is relatively near the interrogator has a relatively high center frequency, the fundamental frequency or higher harmonic of the reflected signal transmitted from that endpoint device will not interfere with the reflected signal transmitted from an endpoint device which is located relatively distant from the interrogator.

In a second preferred form of the endpoint device according to the first aspect of the invention, the band determining portion is operable to determine the frequency band of the modulating signal on the basis of the distance detected by the distance detecting portion, and according to a predetermined equation representative of a relationship between the distance and the frequency band.

In the endpoint device according to the above-indicated second preferred form, the frequency band of the modulating signal can be easily and accurately determined by calculating according to the predetermined relationship between the frequency band and the detected distance, and the required capacity of a memory provided in the endpoint device can be reduced.

In a third preferred form of the endpoint device of the invention, the band determining portion is operable to determine the frequency band on the basis of the distance detected by the distance detecting portion, and according to a predetermined data table representative of a relationship between the distance and the frequency band.

In the endpoint device according to the above-indicated third preferred form, the frequency band of the modulating signal can be determined by simply referring to the predetermined data table representative of the relationship between the frequency band and the detected distance, which data table is stored in a suitable memory provided in the endpoint device.

In a fourth preferred form of the endpoint device of the invention, the band determining portion is operable to determine the frequency band of the modulating signal, on the basis of the distance detected by the distance detecting portion, and according to a predetermined data table representative of a relationship between a plurality of ranges of the distance and a plurality of frequency bands which respectively correspond to the plurality of ranges of the distance and each of which consists of a group of a plurality of mutually adjacent frequency channels, the band determining portion being operable to select, randomly or according to a predetermined rule, one of the plurality of channels of the group corresponding to one of the plurality of ranges to which the distance detected by the distance detecting portion belongs.

In a communication system including the endpoint device according to the above-indicated fourth preferred form, the frequency of the modulating signal transmitted from each endpoint device is changed randomly or according to the predetermined rule, within the frequency band selected on the basis of the detected distance, so that there is a reduced risk of collision among the reflected signals transmitted from a plurality of endpoint devices which have substantially the same distance from the interrogator.

In a fifth preferred form of the endpoint device according to the first aspect of this invention, the modulating-signal generating portion is operable to generate the modulating signal in one of a plurality of time frames which is selected randomly or according to a predetermined rule.

In a communication system including the endpoint device according to the above-indicated fifth preferred form of the invention, the risk of collision between the reflected signals transmitted from the end point devices having substantially the same distance from the interrogator is further reduced since the corresponding modulating signals are generated in the time frames that are selected randomly or according to the predetermined rules.

In a sixth preferred form of the endpoint device of the invention, wherein the modulating-signal generating portion maintains the frequency band determined by the band determining portion, until transmission of the replying information to the interrogator is completed.

In a communication including the endpoint device according to the above-indicated sixth preferred form, the reflected signal can be accurately demodulated to recover the replying information, since the band frequency of the modulating signal determined by the band determining portion is maintained until the transmission of the replying information to the interrogator is completed.

The endpoint device according to a seventh preferred form of the invention further comprises a charging portion operable to charge the endpoint device with an electric energy derived from the interrogating signal. The charging portion activates the endpoint device when an amount of the electric energy stored in the endpoint device has reached a predetermined value.

The endpoint device according to the above-indicated seventh preferred form of the invention does not need an exclusive electric power source, in the presence of the charging portion, so that the size and weight of the endpoint device can be reduced. In a communication system including a plurality of endpoint devices according to the seventh preferred form of the invention, the individual endpoint devices require different lengths of time for full charging, since the interrogating signals received by the individual endpoint devices 3a-3c have different intensity values depending upon the different distances from the interrogator. Accordingly, the reflected signals are transmitted from the individual endpoint devices at different times, making it possible to reduce a risk of collision among the reflected signals.

In one advantageous arrangement of the above-indicated seventh preferred form of the endpoint device, the distance detecting portion is operable to detect the distance between the interrogator and the endpoint device, on the basis of a change of the electric energy with which the endpoint device is charged by the charging portion. In the arrangement, the endpoint device may further comprise a voltage detecting portion operable to detect a voltage of the charging portion, and the distance detecting device detects the change of the electric energy on the basis of the voltage detected by the voltage detecting portion.

In the above-indicated arrangement wherein the distance between the interrogator and the endpoint device is detected on the basis of a change of the electric energy with which the endpoint device is charged, the distance can be detected while the endpoint device is being charged. Further, the distance detected on the basis of the change of the electric energy of the interrogating signal does not represent an actual linear distance to the interrogator, but represents an apparent distance which relatively accurately reflects an actual positional relationship between the endpoint device and the interrogator, which relationship is affected by any walls and barriers that are disposed therebetween and may define passageways in the environment in which the endpoint devices are used.

In an eighth preferred form of the endpoint device of the invention, the distance detecting portion is operable to detect the distance on the basis of an intensity of the interrogating signal.

In the endpoint device according to the above-indicated eighth preferred form of the invention wherein the distance is detected on the basis of the intensity of the interrogating signal, the distance can be easily detected. The thus detected distance does not represent an actual linear distance to the interrogator, but represents an apparent distance which relatively accurately reflects an actual positional relationship between the endpoint device and the interrogator, which relationship is affected by any walls and barriers that are disposed therebetween and may define passageways in the environment in which the endpoint devices are used.

The second object indicated above may be achieved according to a second aspect of this invention, which provides a communication system including an interrogator operable to transmit an interrogating signal containing a main carrier, and an endpoint device operable to receive the interrogating signal and respond to the interrogator with a reflected signal which is generated by modulating the main carrier with appropriate information, wherein an improvement comprises:

the interrogator including a distance detecting portion operable to detect a distance between the interrogator and the endpoint device, on the basis of an intensity of a modulating signal with which the reflected signal has been modulated in the endpoint device, the interrogator further including a distance-information transmitting portion operable to transmit to the endpoint device distance information indicative of the distance detected by the distance detecting portion; and the endpoint device including (a) a reflecting portion operable to receive the interrogating signal containing the main carrier, and transmit the reflected signal to the interrogator, (b) an information generating portion operable to generate replying information to be transmitted to the interrogator, (c) a band determining portion operable to determine a frequency band of the modulating signal, on the basis of the distance information received from the distance-information transmitting portion, and (d) a modulating-signal generating portion operable, according to the replying information generated by the information generating portion, to generate the modulating signal having a frequency within the frequency band determined by the band determining portion.

In the communication system according to the second aspect of this invention described above, the modulating-signal generating portion of the endpoint device is arranged to generate the modulating signal having a frequency within the frequency band determined by the band determining portion. Accordingly, the present communication system has substantially the same advantages as described above with respect to the endpoint device according to the first aspect of the invention. Further, the distance between the interrogator and the endpoint device is detected by the distance detecting portion provided in the interrogator, and the distance information indicative of the detected distance is transmitted from the distance-information transmitting portion to the endpoint device. Accordingly, the endpoint device need not include the distance detecting portion, so that a control load of the endpoint devices can be reduced, and the endpoint device can be simplified in construction.

The third object of this invention indicated above may be achieved according to a third aspect of the invention, which provides a communication system including an interrogator operable to transmit an interrogating signal containing a main carrier, and at least one endpoint device each operable to receive the interrogating signal and respond to the interrogator with a reflected signal which is generated by modulating the main carrier with appropriate information, wherein an improvement comprises:

the interrogator including (a) a communication-condition detecting portion operable to detect a detect a condition of communication of the interrogator with the above-indicated at least one endpoint device, (b) an available-band determining portion operable to determine an available frequency band of a subcarrier signal available for the least one endpoint device, on the basis of the condition of communication detected by the communication-condition detecting portion, and (c) a band-information transmitting portion operable to transmit to each endpoint device band information representative of the available frequency band of the subcarrier signal determined by the available-band determining portion; and each endpoint device being including a frequency determining portion operable to determine a frequency of the subcarrier signal within the available frequency band represented by the band information received from the band-information transmitting portion of the interrogator.

In the communication system constructed according to the third aspect of this invention described above, the available frequency band of the subcarrier signal available for the at least one endpoint device can be changed according to the detected condition of communication of the interrogator with the endpoint device or devices, so that the amount of consumption of electric energy by the at least one end point device can be reduced by narrowing the available frequency band of the subcarrier signal, and the risk of collision among the reflected signals transmitted by the endpoint devices can be reduced by broadening the available frequency band.

In a first preferred form of the communication system according to the third aspect of the present invention, the available-band determining portion is operable to change an upper limit of the available frequency band on the basis of the condition of communication detected by the communication-condition detecting portion.

In the first preferred form of the communication system described above, the frequencies of the subcarrier signals used by the endpoint devices are generally lowered by narrowing the available frequency band by lowering the upper limit of the available frequency band, so that the amount of consumption of electric energy by the end point devices can be reduced. Further, the available frequency band can be broadened by raising the upper limit of the band, so that the risk of collision among the reflected signals transmitted by the endpoint devices can be reduced.

In a second preferred form of the communication system according to the third aspect of this invention, the communication-condition detecting portion is operable to detect the condition of communication of the interrogator with the at least one endpoint device, on the basis of the number of at least one of the at least one endpoint device which has transmitted the reflected signal to the interrogator.

In the second preferred form of the communication system described above, the condition of communication of the interrogator with the at least one endpoint device can be detected with high accuracy, on the basis of the number of the endpoint devices ready for communication with the interrogator.

In a third preferred form of the communication system described above, the communication-condition detecting portion is operable to detect the condition of communication of the interrogator with the at least one endpoint device, on the basis of at least one of a collision rate among the reflected signals transmitted from a plurality of endpoint devices, the number of occurrences of collision among the reflected signals transmitted from the plurality of endpoint devices per unit time, and an amount of error data contained in the reflected signal transmitted from each endpoint device.

In the above-described third preferred form of the communication system, the condition of communication of the interrogator with the at least one end point device can be detected with high accuracy, on the basis of the suitably selected one or ones of (a) the collision rate among the reflected signals transmitted from the endpoint devices, (b) the number of occurrences of collision among the reflected signals, and (c) the amount of error data contained in the reflected signals.

In one advantageous arrangement of the above-indicated second preferred form of the communication system, the available-band determining portion is operable to determine the available frequency band such that an upper limit of the available frequency band increases with an increase in the number of the at least one endpoint device which has been detected by the communication-condition detecting portion.

In the arrangement described above, the available frequency band of the subcarrier signal can be suitably determined by increasing the upper limit as the number of the at least one endpoint device from which the reflected signal has been received.

In one advantageous arrangement of the above-indicated third preferred form of the communication system according to the third aspect of this invention, the available-band determining portion is operable to determine the available frequency band such that an upper limit of the available frequency band increases with an increase in the above-indicated at least one of the above-indicated collision rate, number of occurrences of collision and amount of error data, which has been detected by the communication-condition detecting portion.

In the above-indicated arrangement of the third preferred form of the communication system described above, the available frequency band of the subcarrier signal can be suitably determined by increasing the upper limit with an increase in the collision rate, the number of occurrences of collision and/or the amount of error data.

In a second preferred arrangement of the above-indicated second preferred form of the communication system according to the third aspect of the invention, the available-band determining portion is operable to determine the available frequency band such that an upper limit of the available frequency band is increased when the number of the at least one endpoint device which has been detected by the communication-condition detecting portion is equal to or larger than a predetermined first threshold value, and decreased when the number is reduced when the above-indicated number is equal to or smaller than a predetermined second threshold value.

In the above-indicated second preferred arrangement, the available frequency band can be efficiently determined by simply comparing the detected number of the endpoint devices which have transmitted the reflected signals, with the predetermined first and second threshold values.

In a second advantageous arrangement of the above-indicated third preferred form of the communication system according to the third aspect of this invention, the available-band determining portion is operable to determine the available frequency band such that an upper limit of the available frequency band is increased when the collision rate, the number of occurrences of collision or the amount of error data which has been detected by the communication-condition detecting portion is equal to or larger than a predetermined first threshold value, and decreased when the collision rate, the number of occurrences of collision or the amount of error data is equal to or smaller than a predetermined second threshold value.

In the above-indicated second preferred arrangement of the third preferred form of the second aspect of this invention, the available frequency band can be efficiently determined by simply comparing the detected collision rate, number of occurrences of collision or the amount of error data, with the predetermined first and second threshold values.

In the second preferred arrangement of the second preferred form of the second aspect of the invention, the available-band determining means may be operable to adjust the first and second threshold values on the bass of the number of the above-indicated at least one endpoint device which has been detected by the communication-condition detecting portion.

The adjustment of the first and second threshold values on the basis of the detected number of the endpoint devices which have transmitted the reflected signals permits efficient determination of the suitable available frequency band of the subcarrier signals.

In the second preferred arrangement of the third preferred form of the second aspect of the invention, the available-band determining means may be operable to adjust the first and second threshold values on the basis of the collision rate, the number of occurrences of collision or the amount of error data which has been detected by the communication-condition detecting portion.

The adjustment of the first and second threshold values on the basis of the detected collision rate, number of occurrences of collision or amount of error data, permits efficient determination of the suitable available frequency band of the subcarrier signals.

In a fourth preferred form of the communication system according to the third aspect of the invention, the available-band determining portion is operable to set an upper limit of the available frequency band at a maximum value in an initial state of the communication system.

In the above-indicated fourth preferred form of the communication system, the communication between the interrogator and each endpoint device is initiated with the frequency of the subcarrier signal being selected within the broadest frequency band, so that the interrogator can receive the reflected signal with high stability.

In a fifth preferred form of the communication system according to the third aspect of the invention, the available-band determining portion is operable to set an upper limit of the available frequency band at a minimum value in an initial state of the communication system.

In the above-indicated fifth preferred form of the communication system, the communication between the interrogator and each endpoint device can be initiated with the frequency of the subcarrier signal being selected within the narrowest frequency band, so that the amount of consumption of electric energy by the endpoint device can be reduced.

In a sixth preferred form of the communication system according to the third aspect of this invention, the frequency determining portion of each endpoint device is operable to determine the frequency of the subcarrier signal, by selecting, by means of random hopping or according to a predetermined rule of hopping, one of a plurality of frequency channels set within the available frequency band determined by the available-band determining portion of said interrogator.

In the above-indicated sixth preferred form of the communication system, the frequency of the subcarrier signal is hopped within the determined available frequency band consisting of a plurality of frequency channels, making it possible to reduce not only the amount of consumption of electric energy by each endpoint device but also the risk of collision among the reflected signals transmitted from the endpoint devices.

The fourth object indicated above may be achieved according to a fourth aspect of the present invention, which provides an interrogator for use in a communication system wherein each of at least one endpoint device which has received an interrogating signal containing a main carrier and transmitted from the interrogator responds to the interrogator with a reflected signal which is generated by modulating the main carrier with appropriate information, the interrogator comprising:
  a communication-condition detecting portion operable to detect a detect a condition of communication of the interrogator with each endpoint device;
  an available-band determining portion operable to determine an available frequency band of a subcarrier signal available for each endpoint device, on the basis of the condition of communication detected by the communication-condition detecting portion; and
  a band-information transmitting portion operable to transmit to each endpoint device band information representative of the available frequency band of the subcarrier signal determined by the available-band determining portion.

In the interrogator according to the fourth aspect of this invention described above, the available frequency band of the subcarrier signal available for the endpoint device or devices can be changed depending upon the detected condition of communication of the interrogator with each endpoint device, so that the amount of consumption of electric energy by the endpoint device can be reduced by lowering the upper limit of the available frequency band, and the interrogator is communicable with the end point device even when the endpoint device is relatively distant from the interrogator. Further, the risk of collision among the reflected signals transmitted from the endpoint devices can be reduced by broadening the available frequency band of the subcarrier signal, so that the interrogator is simultaneously communicable with the two or more endpoint devices with high reliability. Thus, the present interrogator permits data communication with two or more endpoint devices, without a risk of collision among the reflected signals, while minimizing the amount of consumption of electric energy by the endpoint devices.

The fifth object indicated above may be achieved according to a fifth aspect of this invention, which provides an endpoint device for use in a communication system wherein the endpoint device which has received an interrogating signal containing a main carrier and transmitted from an interrogator responds to the interrogator with a reflected signal which is generated by modulating the main carrier with appropriate information, the endpoint device comprising a frequency determining portion operable to determine a frequency of a subcarrier signal used by the endpoint device, within an available frequency band which has been determined by the interrogator.

In the endpoint device according to the fifth aspect of this invention described above, the amount of consumption of electric energy can be reduced by lowering the upper limit of the available frequency band, and the communication with the interrogator is possible even when the interrogator is relatively distant from the endpoint device. Further, the risk of collision among the reflected signals transmitted from two or more endpoint devices can be reduced by broadening the available frequency band of the subcarrier signal, so that two or more endpoint devices are simultaneously communicable with the interrogator. Thus, a plurality of endpoint devices each constructed according to the sixth aspect of the invention permit data communication with the interrogator, without a risk of collision among the reflected signals transmitted from the respective endpoint devices, while minimizing the amount of consumption of electric energy by the endpoint devices.

The fifth object indicated above may be achieved according to a sixth aspect of this invention, which provides an endpoint device for use in a communication system wherein the endpoint device which has received an interrogating signal containing a main carrier and transmitted from an interrogator responds to the interrogator with a reflected signal which is generated by modulating the main carrier with appropriate information, the endpoint device comprising:
  a frequency-utilization-ratio setting portion operable to set a distribution of a frequency utilization ratio of a subcarrier signal used to modulate the main carrier, over a predetermined range of frequency of the subcarrier signal which consists of a plurality of mutually adjacent frequency channels; and
  a frequency determining portion operable on the basis of the distribution of the frequency utilization ratio set by the frequency-utilization-ratio setting portion, to determine a frequency of the subcarrier signal, by random selection within the predetermined range of frequency.

In the endpoint device according to the sixth aspect of this invention described above, the frequency of the subcarrier signal used to modulate the main carrier to generate the reflected signal is determined on the basis of the distribution of the frequency utilization ratio of the subcarrier signal, so that the frequency of the subcarrier signal to be transmitted can be selected over a frequency range broad enough to reduce a risk of a collision between the reflected signal generated by the present endpoint device and a reflected signal generated by another endpoint device. Further, the amount of consumption of electric energy by the endpoint device can be reduced by narrowing a range of the distribution of the frequency utilization ratio which is set by the frequency-utilization-ratio setting portion.

In a first preferred form of the sixth aspect of this invention, the endpoint device further comprises a power source device, and a power-source-information detecting portion operable to detect an operating state of the power source device, and the frequency-utilization-ratio setting portion is operable on the basis of the operating state of the power source device detected by the power-source-information detecting portion, to set the distribution of the frequency utilization ratio of the subcarrier signal.

In the above-described first preferred form of the endpoint device, the frequency of the subcarrier signal can be changed on the basis of the supply voltage of the power source device of the endpoint device, for example, so as to reduce a risk of a collision between the reflected signals transmitted by two or more endpoint devices including the present endpoint device. For instance, the frequency-utilization-ratio setting portion is arranged to set the distribution of the frequency utilization ratio of the subcarrier signal, so that the endpoint device relatively frequently transmit the subcarrier signal having relatively low frequencies when the detected, supply voltage of the power source device is relatively low, whereby the amount of consumption of electric energy by the endpoint device can be minimized. Where the power source device incorporates a circuit to rectify and smooth the interrogating signal received from the interrogator, to obtain an electric energy, the endpoint device can communicate with the interrogator, even when the endpoint device is relatively distant from the interrogator.

In a first advantageous arrangement of the above-indicated first preferred form of the endpoint device according to the sixth aspect of the invention, the frequency-utilization-ratio setting portion is operable to lower a center frequency of the distribution of the frequency utilization ratio of the subcarrier signal, when a supply voltage of the power source device detected by the power-source-information detecting portion is lower than a predetermined threshold value.

In the above-indicated advantageous arrangement, the end point device relatively frequently transmits the subcarrier signals having relatively low frequencies, when the supply voltage is relatively low, so that the amount of consumption of electric energy by the endpoint device can be minimized.

In a second advantageous arrangement of the first preferred form of the endpoint device, the frequency-utilization-ratio setting portion is operable to raise a center frequency of the distribution of the frequency utilization ratio of the subcarrier signal, when a supply voltage of the power source device detected by the power-source-information detecting portion is higher than a predetermined threshold value.

In the above-indicated second advantageous arrangement, the end point device relatively frequently transmits the subcarrier signals having relatively high frequencies, when the supply voltage is relatively low, so that the risk of a collision between the reflected signal transmitted by the present endpoint device and the reflected signal transmitted by another endpoint device can be minimized.

In a second preferred form of the endpoint device according to the sixth aspect of this invention, the frequency-utilization-ratio setting portion is operable to select one of a plurality of different frequency-utilization-ratio distribution patterns each of which represents a relationship between the plurality of mutually adjacent frequency channels and the frequency utilization ratio of the subcarrier signal, the endpoint device including a memory storing data table representative of the different frequency-utilization-ratio distribution patterns, the frequency determining portion being operable to hop the frequency of the subcarrier signal according to the selected one of the different frequency-utilization-ratio distribution pattern.

In the above-indicated second preferred form of the endpoint device, the distribution of the frequency utilization ratio of the subcarrier signal can be easily set, so that the frequency of the subcarrier signal to be transmitted is selected by random hopping according to the selected frequency-utilization-ratio distribution pattern.

In a third preferred form of the sixth aspect of the present invention, the endpoint device further comprises a power source device, and the frequency-utilization-ratio setting portion is operable to set the distribution of the frequency utilization ratio of the subcarrier signal such that a center frequency of the distribution is lower when the power source device is a primary battery cell, than when the power source device is other than the primary battery cell.

In the above-indicted third preferred form of the endpoint device of the sixth aspect of the invention, the amount of consumption of electric energy by the primary battery cell which cannot be charged can be reduced.

In a fourth preferred form of the sixth aspect of the invention, the endpoint device further comprises a solar cell as a power source device.

The supply voltage of the solar cell tends to easily vary depending upon the specific ambient atmosphere, so that the distribution of the frequency utilization ratio is likely to vary due to a variation in the supply voltage, so that the risk of a collision between the reflected signals transmitted by two or more endpoint devices including the present endpoint device can be minimized. Further, the solar cell having a relatively small capacity permits the endpoint device to effect data communication with the interrogator.

In a fifth preferred form of the endpoint device according to the sixth aspect of this invention, the frequency-utilization-ratio setting portion is operable to set the distribution of the frequency utilization ratio of the subcarrier signal, by changing at least an amount of the reflected signal and a time period during which the reflected signal is transmitted, each time the reflected signal having a selected one of the mutually adjacent frequency channels is transmitted.

In the above-indicated fifth preferred form of the endpoint device, the distribution of the frequency utilization ratio of the subcarrier signal is set by changing the amount of data transmitted with the reflected signal and/or the time period during which the reflected signal is transmitted. This arrangement make it possible to reduce the risk of a collision between the reflected signals transmitted by the two endpoint devices including the present endpoint device, and the amount of consumption of electric energy by the present endpoint device.

The third object indicated above may be achieved according to a seventh aspect of this invention, which provides a communication system including an interrogator having a transmitting portion operable to transmit an interrogating signal containing a main carrier, and a plurality of endpoint devices each operable to receive the interrogating signal and respond to the interrogator with a reflected signal which is generated by modulating the main carrier with appropriate information, wherein an improvement comprises:

each endpoint device including (a) an individual-frequency-utilization-ratio setting portion operable to set a distribution of an individual frequency utilization ratio of a subcarrier signal used to modulate the main carrier, over a predetermined range of frequency of the subcarrier signal which consists of a plurality of mutually adjacent frequency channels, and (b) a frequency determining, portion operable on the basis of the distribution of the individual frequency utilization ratio set by the individual-frequency-utilization-ratio setting portion, to determine a frequency of the subcarrier signal, by random selection within the predetermined range of frequency;

the interrogator including (i) an overall-frequency-utilization-ratio determining portion operable to determine a distribution of an overall frequency utilization ratio of the reflected signal received from the plurality of endpoint devices, and (ii) a switching-information generating portion operable on the basis of the distribution of the overall frequency utilization ratio determined by the overall-frequency-utilization-ratio determining portion, to generate switching information on the basis of which the individual-frequency-utilization-ratio setting portion of each endpoint device sets the distribution of the individual frequency utilization ratio of the subcarrier signal;

the transmitting portion of the interrogator being operable to transmit the interrogating signal containing the main carrier and the switching information generated by the switching-information generating portion; and the individual-frequency-utilization-ratio setting portion being operable to set the distribution of said individual frequency utilization ratio of the subcarrier signal of each endpoint device.

In the communication system constructed according to the seventh aspect of the present invention, the distribution of the individual frequency utilization ratio of the subcarrier signal used by each endpoint device is set on the basis of the distribution of the overall frequency utilization ratio determined by the interrogator, so as to reduce a risk of a collision among the reflected signals transmitted by the plurality of endpoint devices, and an amount of consumption of electric energy by each endpoint device.

In a first preferred form of the communication system according to the seventh aspect of this invention, the switching-information generating portion is operable to generate the switching information for raising a center frequency of the distribution of the individual frequency utilization ratio of the subcarrier signal of each endpoint device, when the overall-frequency-utilization-ratio determining portion determines that the overall frequency utilization ratio of the reflected signals in relatively low frequency channels of the predetermined range of frequency of the subcarrier signal is higher than a predetermined threshold value.

In the above-described first preferred form of the communication system, the frequency of the subcarrier signal of only a selected one or ones of the endpoint devices can be raised as needed, making it possible to effectively reduce the risk of the collision among the reflected signals.

In a second preferred form of the communication system according to the seventh aspect of the invention, the switching-information generating portion is operable to generate the switching information for lowering a center frequency of the distribution of the individual frequency utilization ratio of the subcarrier signal of each endpoint device, when the overall-frequency-utilization-ratio determining portion determines that the overall frequency utilization ratio of the reflected signals in the predetermined range of frequency of the subcarrier signal is lower than a predetermined threshold value.

In the above-described second preferred form of the communication system, the frequency of the subcarrier signal of only a selected one or ones of the endpoint devices can be lowered as needed, making it possible to effectively reduce the risk of the collision among the reflected signals.

The third object may also be achieved according to an eighth aspect of this invention, which provides a communication system including an interrogator having a transmitting portion operable to transmit an interrogating signal containing a main carrier, and a plurality of endpoint devices each operable to receive the interrogating signal and respond to the interrogator with a reflected signal which is generated by modulating the main carrier with appropriate information, wherein an improvement comprises:

each endpoint device including (a) an individual-frequency-utilization-ratio setting portion operable to set a distribution of an individual frequency utilization ratio of a subcarrier signal used to modulate the main carrier, over a predetermined range of frequency of the subcarrier signal which consists of a plurality of mutually adjacent frequency channels, (b) a frequency determining portion operable on the basis of the distribution of the individual frequency utilization ratio set by the individual-frequency-utilization-ratio setting portion, to determine a frequency of the subcarrier signal, by random selection within the predetermined range of frequency, (c) a power source device, and (d) a power-source-information detecting portion operable to detect supply-voltage information indicative of a supply voltage of the power source device, said interrogator including (i) an overall-frequency-utilization-ratio determining portion operable to determine a distribution of an overall frequency utilization ratio of the reflected signal received from the plurality of endpoint devices, (ii) an endpoint-device monitoring portion operable on the basis of the supply-voltage information received from the power-source-information detecting portion, to determines one of a plurality of predetermined supply voltage ranges in which the supply voltage of the power source device detected by the power-source-information detecting portion of each endpoint device falls, and (iii) a switching-information generating portion operable on the basis of the distribution of the overall frequency utilization ratio determined by the overall-frequency-utilization-ratio determining portion, and a result of determination by the endpoint-device monitoring portion, to generate switching information on the basis of which the individual-frequency-utilization-ratio determining portion of each endpoint device sets the distribution of the individual frequency utilization ratio of the subcarrier signal;

the transmitting portion of the interrogator being operable to transmit the interrogating signal containing the main carrier and the switching information generated by the switching-information generating portion; and the individual-frequency-utilization-ratio setting portion being operable to set the distribution of the individual frequency utilization ratio of the subcarrier signal of each endpoint device, on the basis of the switching information generated by the switching-information generating portion and the supply-voltage of the power source device detected by the power-source-information detecting portion.

In the communication system constructed according to the eighth aspect of the present invention, each endpoint device the distribution of the individual frequency utilization ratio of which is to be set is determined by the detected supply voltage of the power source device of the endpoint device. Accordingly, the interrogator recognizes the number of the endpoint devices the individual-frequency-utilization-ratio distributions of which are to be set or changed, so as to reduce the risk of the collision among the reflected signals and the amount of consumption of electric energy by the endpoint devices.

In a first preferred form of the communication system according to the eighth aspect of this invention, the switching-information generating portion is operable to generate the switching information for raising a center frequency of the distribution of the individual frequency utilization ratio of the subcarrier signal of each endpoint device, when the overall-frequency-utilization-ratio determining portion determines that the overall frequency utilization ratio of the reflected signals in relatively low frequency channels of the predetermined range of frequency of the subcarrier signal is higher than a predetermined threshold value.

In the above-described first preferred form of the communication system, the frequency of the subcarrier signal of only a selected one or ones of the endpoint devices can be raised as needed, making it possible to effectively reduce the risk of the collision among the reflected signals.

In a second preferred form of the communication system according to the eighth aspect of the invention, the switching-information generating portion is operable to generate the switching information for lowering a center frequency of the distribution of the individual frequency utilization ratio of the subcarrier signal of each endpoint device, when the overall-frequency-utilization-ratio determining portion determines that the overall frequency utilization ratio of the reflected signals in the predetermined range of frequency of the subcarrier signal is lower than a predetermined threshold value.

In the above-described second preferred form of the communication system, the frequency of the subcarrier signal of only a selected one or ones of the endpoint devices can be lowered as needed, making it possible to effectively reduce the risk of the collision among the reflected signals.

In a third preferred form of the communication system of the eighth aspect of the invention, the plurality of endpoint devices include at least one first endpoint device wherein a primary battery cell is provided as the power source device, and at least one second endpoint device wherein a secondary battery cell is provided as the power source device, the switching-information generating portion being operable to generate the switching information that causes the individual-frequency-utilization-ratio setting portion of each of the above-indicated at least one first endpoint device to set the distribution of the individual frequency utilization ratio of the subcarrier signal such that a center frequency of the distribution of the individual frequency utilization ratio of the subcarrier signal of each first endpoint device is lower that that of each second endpoint device.

In the above-indicated third preferred form of the communication system, the amount of consumption of electric energy by the primary battery cell which is provided in each first endpoint device and which cannot be reclaimed or charged can be effectively reduced, so that the life expectancy of the primary battery cell can be prolonged.

The fourth object described above may be achieved according to a ninth aspect of this invention, which provide an interrogator for use in a communication system wherein a plurality of endpoint devices which have received an interrogating signal containing a main carrier and transmitted from the interrogator respond to the interrogator with respective reflected signals which are generated by modulating the main carrier with appropriate information, said interrogator comprising:

an overall-frequency-utilization-ratio determining portion operable to determine a distribution of an overall frequency utilization ratio of the reflected signals received from the plurality of endpoint devices;

a switching-information generating portion operable on the basis of the distribution of the overall frequency utilization ratio determined by the overall-frequency-utilization-ratio determining portion, to generate switching information on the basis of which each endpoint device sets a distribution of an individual frequency utilization ratio thereof, and a transmitting portion operable to transmit the interrogating signal containing the main carrier and the switching information generated by the switching-information generating portion.

In the interrogator constructed according to the ninth aspect of this invention, the switching information transmitted to each endpoint device contains not only the main carrier but also the switching information which is used by each endpoint device to set the distribution of its individual frequency utilization ratio and which is generated on the basis of the distribution of the overall frequency utilization ratio of the reflected-signals received from the respective endpoint devices. Accordingly, the frequencies of the subcarrier signals used by the respective endpoint devices are determined on the basis of the switching information such that the frequencies are distributed over a relatively broad frequency range, so as to reduce a risk of a collision among the reflected signal transmitted by the plurality of endpoint devices.

The fourth object may also be achieved according to a tenth aspect of this invention, which provides an interrogator for use in a communication system wherein a plurality of endpoint devices which have received an interrogating signal containing a main carrier and transmitted from the interrogator respond to the interrogator with respective reflected signals which are generated by modulating the main carrier with appropriate information, said interrogator comprising:

an overall-frequency-utilization-ratio determining portion operable to determine a distribution of an overall frequency utilization ratio of the reflected signals received from the plurality of endpoint devices;

an endpoint-device monitoring portion operable on the basis of supply-voltage information which has been received from each of the endpoint devices and which is indicative of a supply voltage of each endpoint device, to determine one of a plurality of predetermined supply voltage ranges in which the supply voltage of each endpoint device falls;

a switching-information generating portion operable on the basis of the distribution of the overall frequency utilization ratio determined by the overall-frequency-utilization-ratio determining portion, and a result of determination by the endpoint-device monitoring portion, to generate switching information on the basis of which each endpoint device sets a distribution of an individual frequency utilization ratio thereof; and a transmitting portion operable to transmit the interrogating signal containing the main carrier and the switching information generated by the switching-information generating portion.

The interrogator according to the tenth aspect of the present invention is arranged to determine each endpoint device the distribution of the individual frequency utilization ratio of which is to be set, on the basis of the detected supply voltage of the endpoint device. Accordingly, the interrogator recognizes the number of the endpoint devices the individual-frequency-utilization-ratio distributions of which are to be set or changed, so as to reduce the risk of the collision among the reflected signals and the amount of consumption of electric energy by the endpoint devices.

BRIEF DESCRIPTION OF THE DRAWINGS

The above and other objects, features, advantages and technical and industrial significance of the present invention will be better understood by reading the following detailed description of presently preferred embodiments of the invention, when considered in connection with the accompanying drawings, in which:

FIG. 4 is an example of a data table indicative of a relationship between a distance between the interrogator and the end point device, and a selected frequency band;

DETAILED DESCRIPTION OF THE PREFERRED EMBODIMENT

There will be described in detail some embodiments of this invention, referring to the accompanying drawings.

Figure 1:
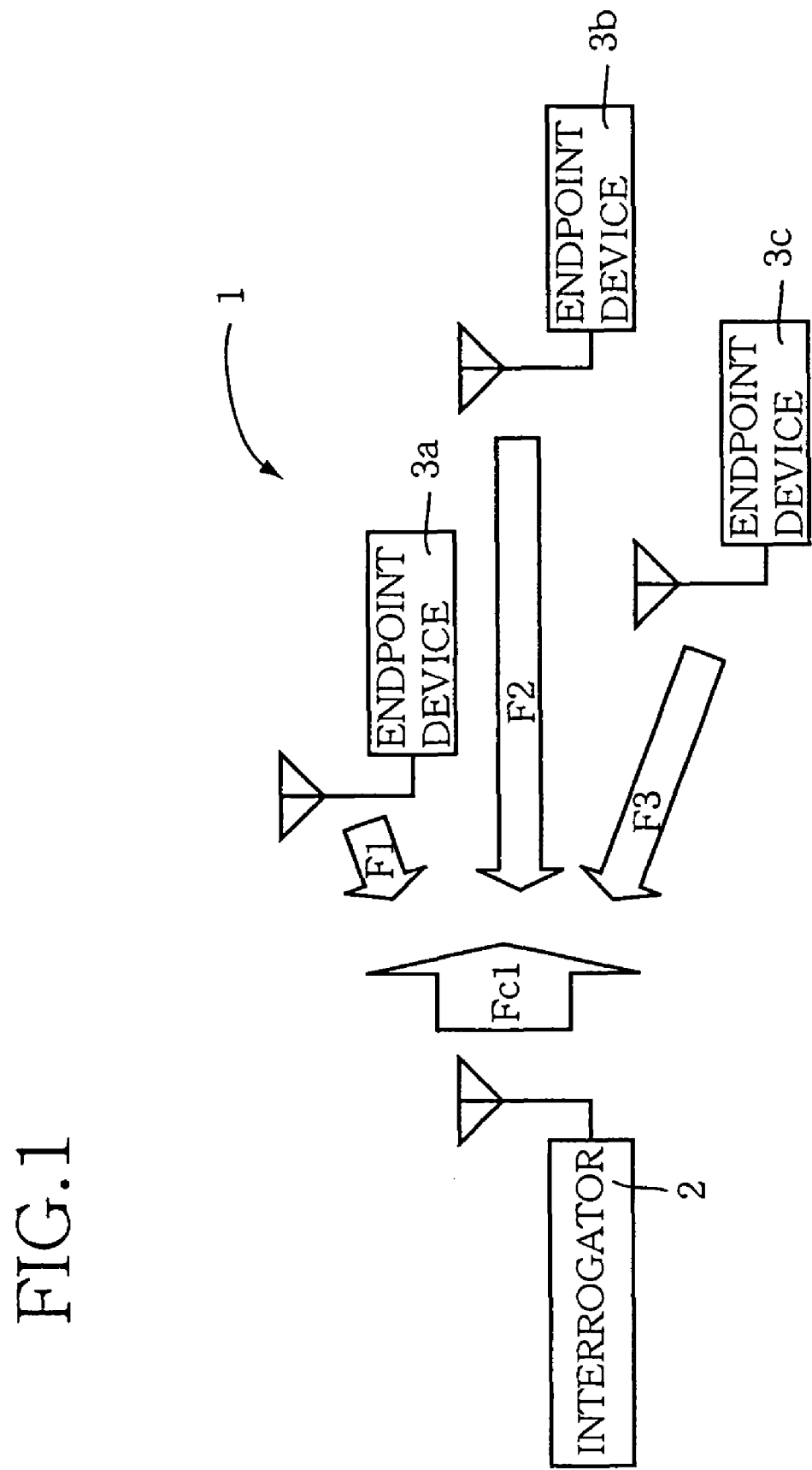
FIG. 1 is a view showing an arrangement of a communication system constructed according to a first embodiment of this invention.

Referring first to FIG. 1, there is shown a communication system 1 arranged according to a first embodiment of this invention. The communication system 1 includes an interrogator 2, and three endpoints or local devices 3a, 3b and 3c, which may be so-called "IC tags". As shown in FIG. 1, the endpoint device 3a is located nearest to the interrogator 2, and the endpoint device 3b is located most distant from the interrogator 2, while the endpoint device 3b is located intermediate between the endpoint devices 3a and 3b, with respect to the interrogator 2. The interrogator 2 is constructed to transmit an interrogating signal of a main carrier frequency Fc1 to the endpoint devices 3a-3c. Upon reception of the interrogating signal from the interrogator 2, the endpoint devices 3a-3c respond to the interrogator 2, with reflected signals F1-F3 of subcarrier frequencies fs1-fs3 that have been modulated with replying information to be transmitted to the interrogator 2. The communication system 1 arranged as described above is suitably used as a system for collecting, via the interrogator 2, data or information (uplink data) which relate to each of the endpoint devices 3a-3c or which have been obtained by the endpoint devices 3a-3c. For example, the interrogator 2 is located at a selected place within a shop, while the endpoint devices 3a-3c are tags attached to customers present within the shop, so that walking paths of the customers within the shop can be recognized or obtained. Alternatively, the interrogator 2 is located at a selected place within a factory, while the endpoint devices 3a-3c are connected to respective working devices installed at different places in the factory, so that operating states of the working devices can be monitored for centralized control of a working system including those working devices within the factory. Although the communication system 1 shown in FIG. 1 includes the three endpoint devices 3a-3c corresponding to the one interrogator 1, a communication system according to the present invention may include two or more interrogators, and a plurality of endpoint devices for each interrogator, the numbers of which may be selected as needed.

There will be described the arrangements of the interrogator 3 and the endpoint devices 3a-3c, by reference to the drawings.

Figure 2:
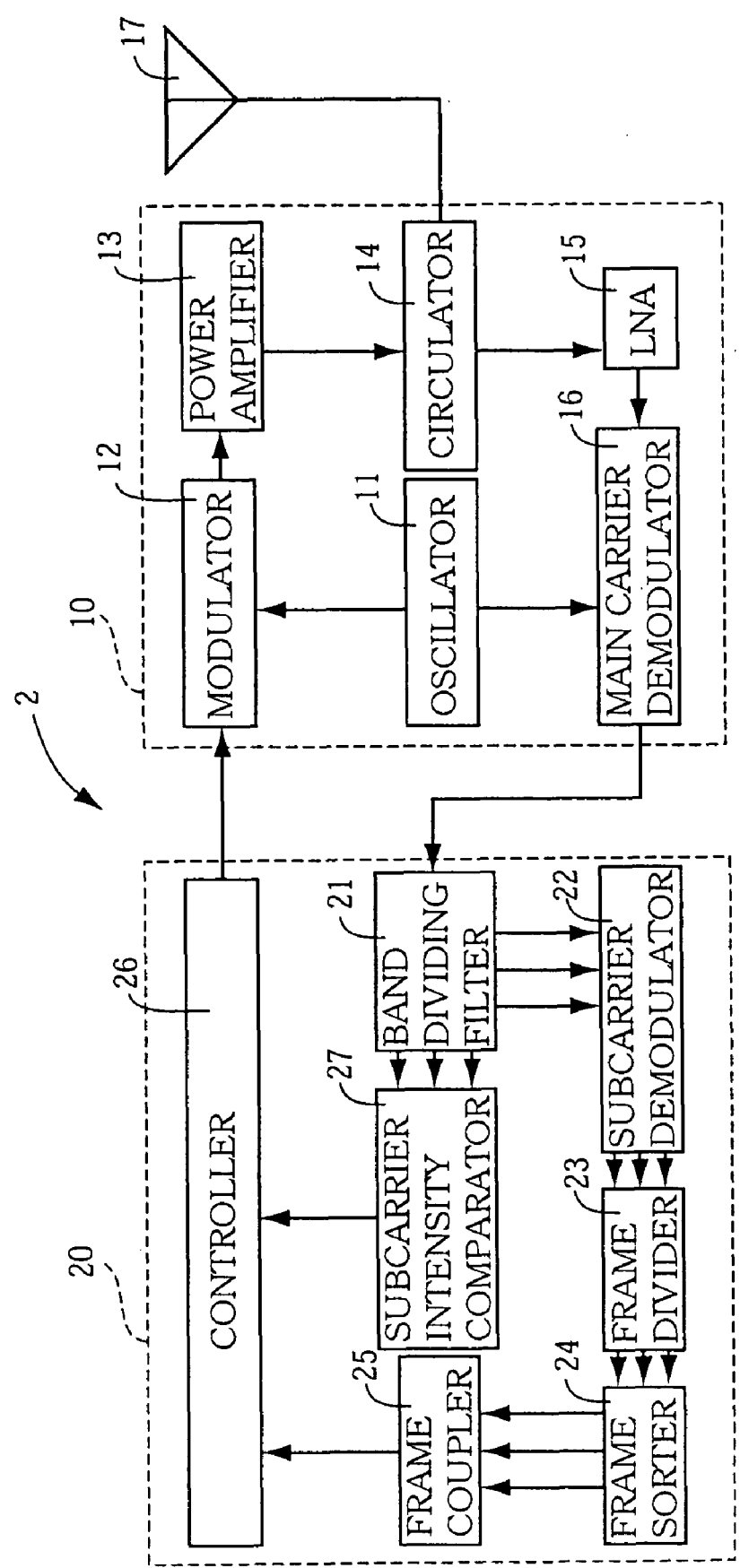
FIG. 2 is a block diagram showing an arrangement of an interrogator included in the communication system of FIG. 1.

Referring to the block diagram of FIG. 2, the arrangement of the interrogator 2 will be first described. As shown in FIG. 2, the interrogator 2 includes an analog circuit, portion 10, a digital circuit portion 20 and an antenna 17. The analog circuit portion 10 includes an oscillator 11, a modulator 12, a power amplifier 13, a circulator 14, a low-noise amplifier (LNA) 15, and a main carrier demodulator 16.

The oscillator 11 is arranged to generate a main carrier of a suitable frequency such as 900 MHz, 2.45 GHz or 5 GHz, which is received by the modulator 12. The modulator 12 is arranged to modulate the main carrier received from the oscillator 11, with appropriate information indicative of identification number of the interrogator 2, etc., by means of amplitude modulation (Amplitude Shift Keying: ASK). The modulated main carrier is received by the power amplifier 13, which is arranged to power-amplify the modulated main carrier and apply the amplified modulated main carrier to the circulator 14. The circulator 14 is arranged to apply the amplified modulated main carrier received from the power amplifier 13, to the antenna 17. The circulator 14 is further arranged to receive radio signals received by the antenna, and apply the received radio signals to the LNA 15. The amplified modulated main carrier (interrogating signal) produced by the analog circuit portion 10 is transmitted through the antenna 17. Thus, the circulator 14 provides an output of the interrogator 2 through the antenna 17, and receives inputs through the antenna 17.

The LNA 15 is arranged to receive the reflected signals which are received by the antenna 17 from the endpoint devices 3a-3b and which are input to the circulator 14. The LNA 15 amplifies the reflected signals and applies the amplified reflected signals to the main carrier demodulator 16. The main carrier demodulator 16 is arranged to mix the amplified reflected signals received from the LNA 15, with the signal generated by the oscillator 11, thereby effecting homodyne detection of the reflected signals. An output of the main carrier demodulator 16 is applied to a band dividing, filter 21 of the digital circuit portion 20, which will be described.

The digital circuit portion 20 includes the above-indicated band dividing filter 21, a subcarrier demodulator 22, a frame divider 23, a frame sorter 24, a frame coupler 25, a controller 26 and a subcarrier intensity comparator 27. The band dividing filter 21 is arranged to convert the reflected signals homodyne-detected by the main carrier demodulator 16 of the analog circuit portion 10, into digital signals; separate the digital signals into channels corresponding to the hopping frequencies, by Fourier transformation; obtain modulated subcarrier signals by timewise conversion by means of reverse Fourier transformation; and apply the modulated subcarrier signals to the subcarrier demodulator 22 and the subcarrier intensity comparator 27. The subcarrier demodulator 22 is arranged to demodulate the subcarrier signals separated by the band dividing filter 21, for thereby recovering the original data signals, which are received by the frame divider 23. The frame divider 23 is arranged to separate the outputs of the individual channels generated by the subcarrier demodulator 22, into respective frames, which are received by the frame sorter 24. The frame sorter 24 is arranged to sort the frames obtained by the frame divider 23, and the sorted frames are received by the frame coupler 25. The frame coupler 25 is arranged to timewise couple the sorted frames for the respective endpoint devices 3a-3c. The thus coupled frames are applied to the controller 26. The subcarrier intensity comparator 27 is arranged to compare the intensities of the subcarrier signals received from the band dividing filter 21, with a predetermined threshold, and apply an output indicative of a result of the comparison to the controller 26. The controller 26 is arranged to control the operations of the interrogator 2 in a coordinated fashion.

Referring next to the block diagram of FIG. 3, the arrangement of the endpoint device 3a will be described. The endpoint devices 3b and 3c are identical in construction with the endpoint device 3a, and the foregoing description of the endpoint device 3a applies to the endpoint devices 3b and 3c.

Figure 3:
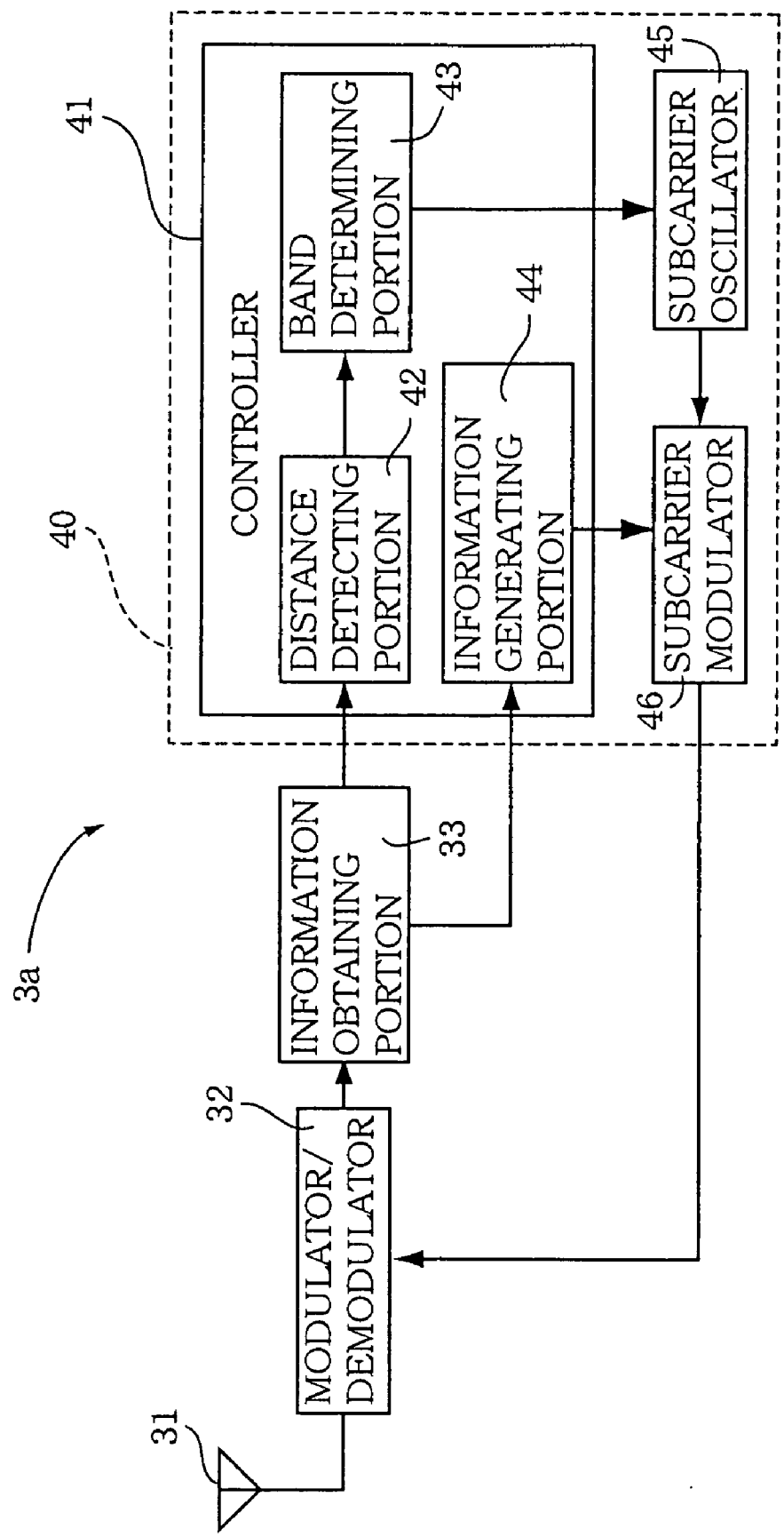
FIG. 3 is a block diagram showing an arrangement of one of endpoint devices included in the communication system of FIG. 1.

As shown in FIG. 3, the endpoint device 3a includes an antenna 31, a modulator/demodulator 32, an information obtaining portion 33, and a digital circuit portion 40. The modulator/demodulator 32 is arranged to demodulate the interrogating received from the interrogator 2 through the antenna 31, and apply the interrogating signal to the information obtaining portion 33. The modulator/demodulator 32 is further arranged to modulate the received interrogating signal with a subcarrier signal modulated by a subcarrier modulator 46 (which will be described), so that the thus modulated signal is transmitted to the interrogator 2 through the antenna 32, as a reflected signal of the endpoint device 3a. The information obtaining portion 33 is arranged to obtain intensity information indicative of the intensity of the demodulated interrogating signal received from the modulator/demodulator 32, and obtain content information representative of the content of the modulated interrogating signal. The intensity information is received by a distance detecting portion 42 (which will be described) of the controller 41, while the content information is received by an information generating portion 44 (which will be described) of the controller 41.

The digital circuit portion 40 includes a controller 41, a subcarrier oscillator 45 and a modulating-signal generating portion in the form of a subcarrier modulator 46. The subcarrier oscillator 45 is arranged to generate a subcarrier signal of a frequency determined by a band determining portion 43 (which will be described) of the controller 41. The generated subcarrier signal is applied to the subcarrier modulator 46. The subcarrier modulator 46 is arranged to modulate the subcarrier signal received from the subcarrier oscillator 45, with information signal generated by the above-indicated information generating portion 44, by means of Phase Shift Keying (PSK). The modulated subcarrier signal is received by the modulator/demodulator 32. The controller 41 is provided to control the endpoint device 3a, and includes the above-indicated distance detecting portion 42, band determining portion 43 and information generating portion 44. It is noted that the subcarrier oscillator 45 and the subcarrier modulator 46 may be provided by a software arrangement utilizing a clock of the controller 41. The modulation of the subcarrier signal by the subcarrier modulator 46 may be effected by Frequency Shift Keying (FSK) or Amplitude Shift Keying (ASK), as well as by the Phase Shift Keying (PSK) described above. The subcarrier oscillator 45 and the subcarrier modulator 46 may be constituted by a single chip built in the controller 41.

The functions performed by the controller 41 will be described. The distance detecting portion 42 is arranged to detect the distance between the interrogator 2 and the endpoint device 3a, on the basis of the intensity information indicative of the intensity of the interrogating signal, which has been obtained by the information obtaining portion 33. Described in detail, the distance detecting portion 42 determines the distance between the interrogator 2 and the endpoint device 3a, on the basis of the intensity of the interrogating signal obtained by the information obtaining portion 33, and according to a stored data table indicative of a relationship between the intensity and the distance, more specifically, between different intensity values and the corresponding distance values. Distance information indicative of the thus determined distance between the interrogator 2 and the endpoint device 3a is received by the band determining portion 43. It is noted that the data table used to detect the distance between the interrogator 2 and the endpoint device 3a may be replaced by a suitable equation which includes the intensity of the interrogating signal.

The band determining portion 43 is arranged to determine a frequency band of the reflected signal in the form of the subcarrier signal, so that the subcarrier oscillator 45 generates the subcarrier signal in the frequency band determined by the band determining portion 43. The band determining portion 43 determines the frequency of each subcarrier signal by frequency hopping method in which one of a plurality of mutually adjacent frequency channels within a selected frequency band is randomly selected. The endpoint device 3a is arranged to hop the frequency of the subcarrier signal, for each transmission of the subcarrier signal (reflected signal). The frequency hopping method is effective to minimize a possibility of an undesirable collision among the reflected signal transmitted from the endpoint device 3a and the reflected signals simultaneously transmitted from the other endpoint devices 3b and 3c, and improve confidentiality of the replying information to be transmitted to the interrogator 2. If the frequency is hopped through a broad frequency range, the reflected signal transmitted from an endpoint device which is relatively distant from the interrogator 2 may interfere with the reflected signals transmitted from endpoint devices relatively near the interrogator, or with higher harmonics of the reflected signals. In view of this fact, the band determining portion 43 is arranged to determine the frequency of each subcarrier signal on the basis of a distance between the interrogator 2 and the endpoint device, and by establishing a plurality of frequency bands each consisting of a group of a plurality of mutually adjacent frequency channels (CH), such that the center frequency of the selected frequency band in which the frequency hopping is implemented is relatively high when the distance between the interrogator 2 and the endpoint device is relatively small, and is relatively low when the distance is relatively large.

Described in detail, the band determining portion 43 determines or selects the frequency band in which the frequency hopping is implemented, on the basis of the distance information received from the distance detecting portion 42, and according to a stored data table representative of a relationship between the distance between the interrogator 2 and the endpoint device 3a, and the frequency band of the subcarrier signal to be selected. An example of the data table is shown in FIG. 4. In this example, the center frequency of the selected frequency band is decremented from 300 kHz by 10 kHz as the distance between the interrogator 2 and the endpoint device 3a is incremented from 0.5 m by 0.1 m. Where the distance between the interrogator 2 and the endpoint device 3a is 0.6 m, for instance, the frequency band from 285.0 kHz to 295.0 kHz is determined or selected, and one of the frequency channels of the group corresponding to the selected frequency band is selected by hopping at random or according to a predetermined rule.

While the data table as shown in FIG. 4 is used in the present first embodiment of the invention, to determine the frequency band of the subcarrier signal, the frequency band may be calculated according to one of the following equations (1), (2) and (3) and on the basis of the distance between the interrogator 2 and the endpoint device 3a.

$$f=a/r+b \quad (1)$$

$$f=a/r^2+b \quad (2)$$

$$f=a/r^2+b/r+c \quad (3)$$

In the above equations, "a", "b" and "c" represents constants, and "f" represents the center frequency of the frequency band of the subcarrier signal, while "r" represents the distance between the interrogator 2 and the endpoint device 3a.

The band determining portion 43 is further arranged to control the timing at which a signal indicative of the selected or determined frequency band is applied to the subcarrier oscillator 45, so that the timing at which the reflected signal is transmitted to the interrogator 2 is controlled. The timing of transmission of each reflected signal is determined by randomly selecting one of a plurality of time frames long enough to permit the transmission of the reflected signal. The time frames may be sequentially selected in a predetermined order.

The information generating portion 44 is arranged to read out the replying information from a memory of the controller 41, according to the content information of the interrogating signal obtained by the information obtaining portion 33. The replying information which has been read out are supplied, to the subcarrier modulator 46. The replying information may be read out from an external device connected to the endpoint device 3a.

Referring to the block diagrams of FIGS. 5A and 5B, there will be described the circuit arrangements of the demodulating means of the modulator/demodulator 32 and the information obtaining portion 33 of each endpoint device 3a, 3b, 3c.

Figure 5A:
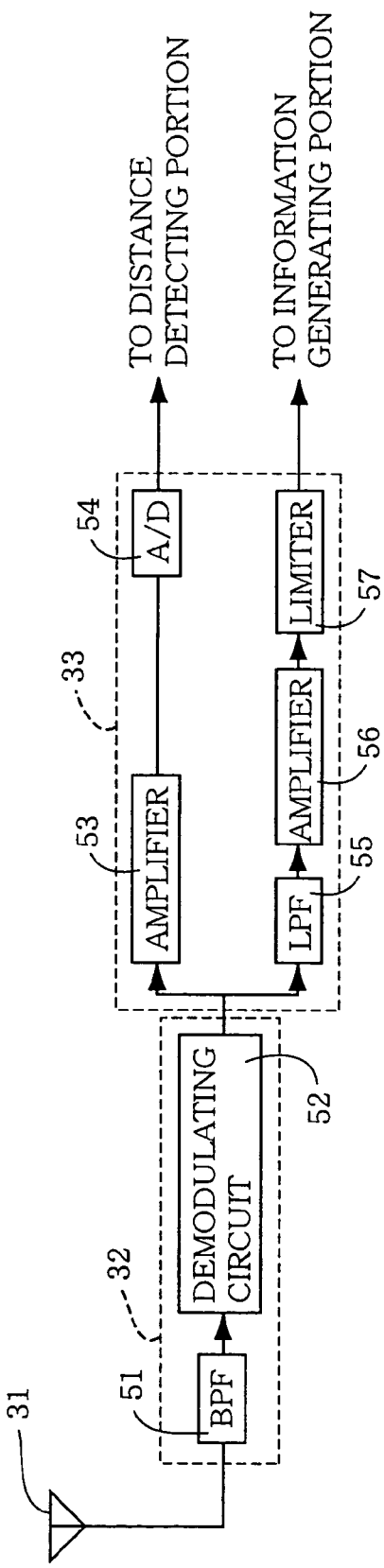
FIG. 5A is a block diagram showing a demodulator of a modulating/demodulating portion, and an information obtaining portion, which are included in the end point device shown in FIG. 4.
Figure 5B:
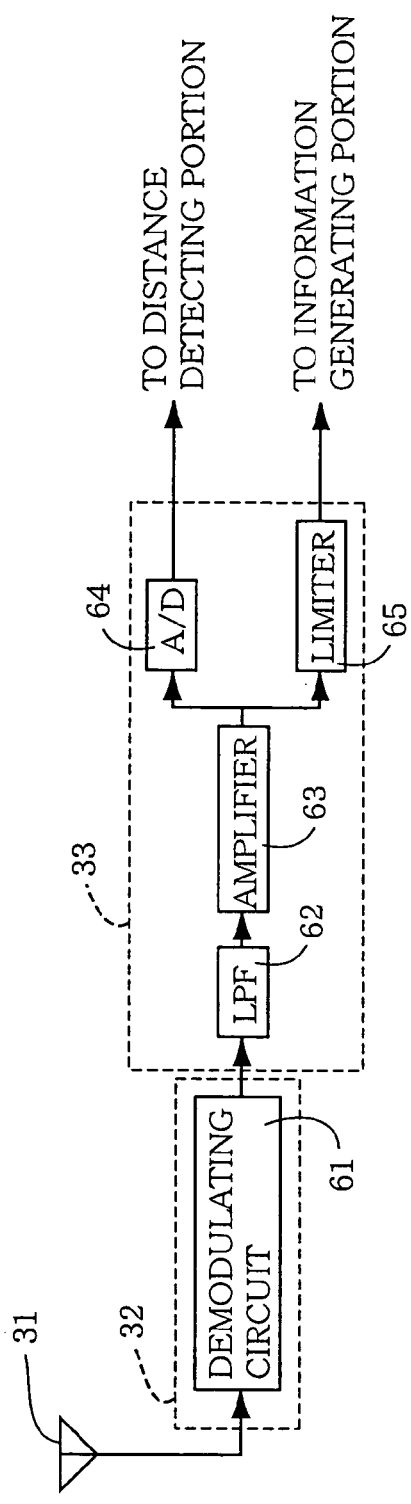
FIG. 5B is a block diagram showing a modified form of a combination of the demodulator and the information obtaining portion.

As shown in FIG. 5A, the demodulating means of the modulator/demodulator 32 includes a band-pass filter (BPF) 51 and demodulating circuit 52. The BPF 51 is arranged to extract a signal within the frequency band of the interrogating signal in the form of the main carrier received from the antenna 31. The extracted signal is received by the demodulating circuit 52. The demodulating circuit 52 is arranged to demodulate the signal extracted by the BPF 51, so that the demodulated signal is received by an amplifier 53 and a low-pass filter (LPF) 55 of the information obtaining portion 33, which will be described. The information obtaining portion 33 includes the above-indicated amplifier 53, an A/D converter 54, the above-indicated LPF 55, an amplifier 56 and a limiter 57. The amplifier 53 is arranged to amplify the signal demodulated by the modulator/demodulator 32, so that the amplified signal is received by the A/D converter 54. The A/D converter 54 is arranged to convert the amplified signal received from the amplifier 53, into a digital signal corresponding to the intensity of the amplified signal. The digital signal is applied to the distance detecting portion 42 of the controller 41, as a signal indicative of the intensity of the interrogating signal. The LPF 55 is arranged to remove a high-frequency noise from the signal demodulated by the modulator/demodulator 32. The signal the high-frequency noise of which has been removed by the LPF 55 is received by the amplifier 56. The amplifier 56 is arranged to amplify the signal received from the LPF 55, so that the amplified signal is received by the limiter 57. The limiter 57 is arranged to shape the amplified signal received from the amplifier 56, into a digital signal. This digital signal is applied to the information obtaining portion 44 of the controller 51, as the content information representative of the content of the interrogating signal.

Where the main carrier is not amplitude-modulated, the modulator/demodulator 32 may not include the BPF 51, as shown in FIG. 5B. In the arrangement of FIG. 5B, the modulator/demodulator 32 consists solely of a demodulating circuit 61. The demodulating circuit 61 is arranged to demodulate the interrogating signal received through the antenna 31. The demodulated interrogating signal is received by a LPF 62 of the information obtaining portion 33, which will be described. The information obtaining portion 33 includes the above-indicated LPF 62, an amplifier 63, an A/D converter 64 and a limiter 57. The LPF 62 is arranged to remove a high-frequency noise from the signal demodulated by the modulator/demodulator 32. An output of the LPF 62 is received by the amplifier 63. The amplifier 63 is arranged to amplify the signal the high-frequency noise of which has been removed by the LPF 62. An output of the amplifier 63 is received by the A/D converter 64 and the limiter 65. The A/D converter 64 is arranged to convert the signal amplified by the amplifier 63, into a digital signal corresponding to the intensity of the amplified signal. The digital signal is applied to the distance detecting portion 42 of the controller 41, as a signal indicative of the intensity of the interrogating signal. The limiter 65 is arranged to shape the amplified signal received from the amplifier 63, into a digital signal. This digital signal is applied to the information obtaining portion 44 of the controller 51, as the content information representative of the content of the interrogating signal.

Referring back to FIGS. 2 and 3, there will be described data communication in the communication system 1. Initially, the oscillator 11 of the analog circuit portion 10 in the interrogator 2 is activated to generate the main carrier, which is amplitude-modulated by the modulator 12, with the information indicative of the identification number of the interrogator 2, etc. The main carrier amplitude-modulated by the modulator 12 is power-amplified by the power amplifier 13, and the power-amplified main carrier is transmitted by the circulator 14 through the antenna 17, as the interrogating signal from the interrogator 2.

The interrogating signal transmitted from the interrogator 2 is received by the antenna 31 of each of the endpoint devices 3a-3c. The interrogating signal received by the antenna 31 is demodulated by the modulator/demodulator 32. The interrogating signal demodulated by the modulator/demodulator 32 is processed by the information obtaining portion 33, to obtain the intensity information and the content information. On the basis of the intensity information, the distance between the interrogator 2 and each endpoint device 3a, 3b, 3c is detected by the distance detecting portion 42. At the same time, the replying information is generated on the basis of the content information obtained by the information obtaining portion 33. The frequency band of the subcarrier signal is determined by frequency hopping on the basis of the distance detected by the distance detecting portion 42, such that the center frequency of the frequency band decreases with an increase in the distance, and increases with a decrease in the distance. The determined or selected frequency band is applied to the subcarrier oscillator 45, at the timing corresponding to a randomly selected one of a plurality of times frames. The subcarrier signal is generated by the subcarrier oscillator 45, according to the frequency band determined by the band determining portion 43. The subcarrier signal oscillated by the subcarrier oscillator 45 is phase-modulated by the subcarrier modulator 46, according to the replying information generated by the information generating portion 44. The interrogating signal being receiving from the interrogator 2 is amplitude-modulated or phase-modulated by the modulator/demodulator 32, with the subcarrier signal phase-modulated by the subcarrier modulator 46, whereby a reflected signal is generated and transmitted through the antenna 31, in response to the interrogating signal.

The reflected signal transmitted from each of the endpoint devices 3a-3c is received by the antenna 17 of the interrogator 2. The reflected signals received from the endpoint devices 3a-3c through the antenna 17 are received by the LNA 15 through the circulator 14 and amplified by the LNA 15. The signal generated by the oscillator 11 is mixed by the main carrier demodulator 16, with the reflected signals amplified by the LNA 15, whereby homodyne detection is effected to obtain a signal including the subcarrier signals, which are separated from each other by the band dividing filter 21, into the modulated subcarrier signals of the three endpoint devices 3a-3c, which are received by the subcarrier demodulator 22 and the subcarrier intensity comparator 27.

The modulated subcarrier signals extracted by the band dividing filter 21 are demodulated by the subcarrier demodulator 22, to generate data signals. The data signals generated by the subcarrier demodulator 22 are separated by the frame divider 23 into respective frames corresponding to the individual channels. The frames of the data signals obtained by the frame divider 23 are sorted by the frame sorter 24, into the data signals corresponding to the three endpoint devices 3a-3c, which are timewise coupled together by the frame coupler 25, to recover the replying information from the endpoint devices 3a-3c. The replying information recovered by the frame coupler 25 is applied to the controller 26, and the replying information corresponding to each of the channels is processed by the controller 26 only when the subcarrier intensity comparator 27 determines that the intensity of the corresponding data signal is higher than the predetermined threshold.

Figure 6:
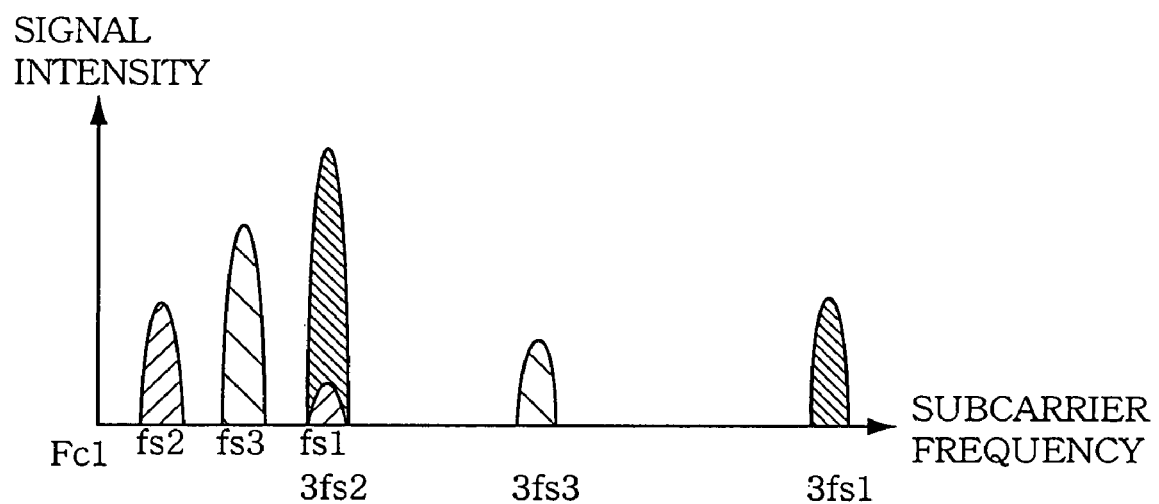
FIG. 6 is a graph showing a frequency distribution of reflected subcarrier signals which are simultaneously received and demodulated by all endpoint devices included in the communication system of FIG. 1.
Figure 7:
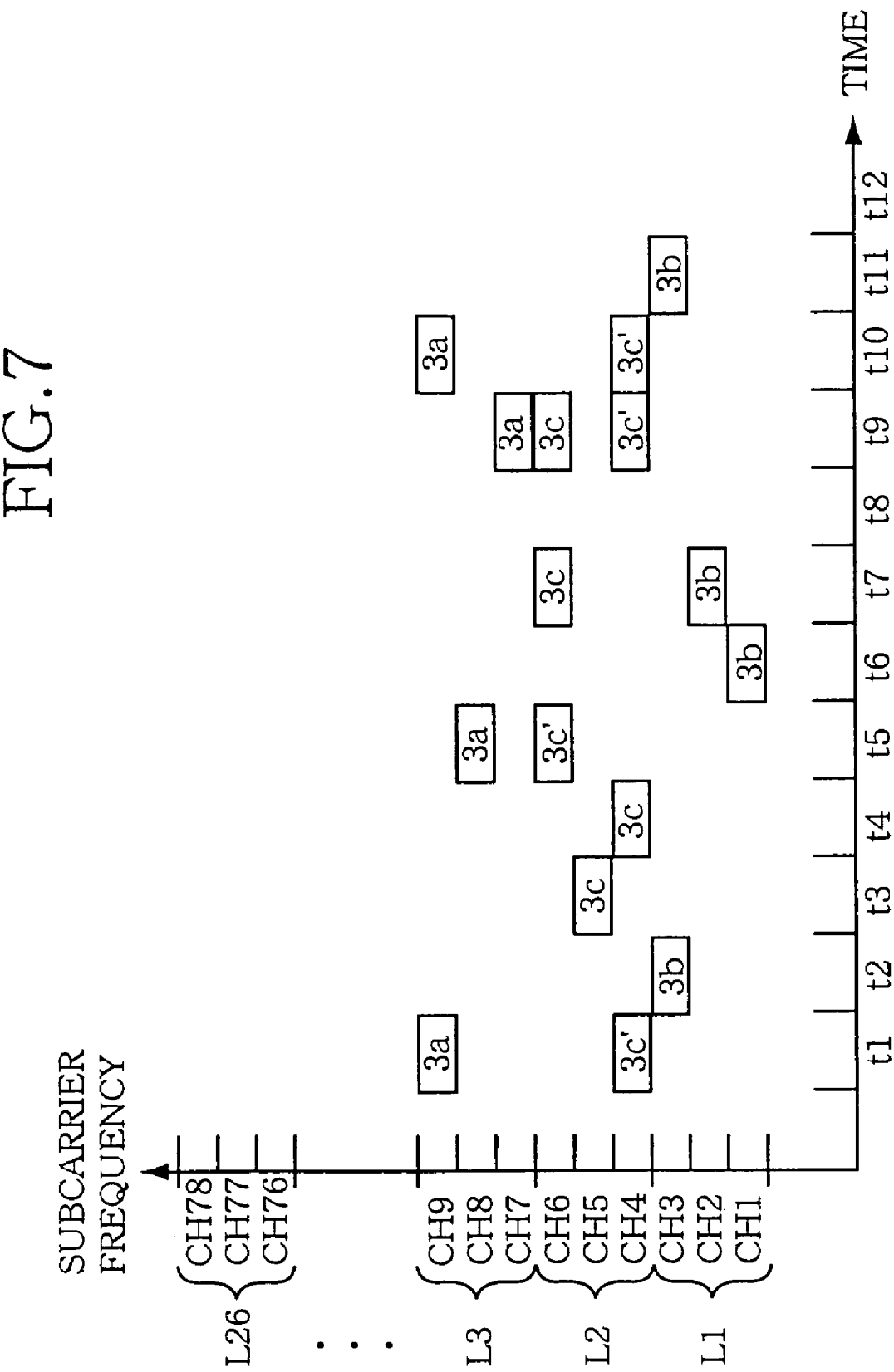
FIG. 7 is a graph showing a frequency distribution of the subcarrier signals in relation to time.

Referring next to FIGS. 6 and 7, there will be described the nature of the subcarrier signals used in the communication system 1. FIG. 6 is a graph indicating a frequency distribution of the reflected subcarrier signals which are simultaneously received by the interrogator 2 from the endpoint devices 3a-3c and demodulated. In the graph of FIG. 6, the intensity of the subcarrier signals is taken along the ordinate while the frequency of the subcarrier signals is taken along the abscissa. As described above by reference to FIG. 4, the frequency band of the subcarrier signal is determined by the band determining portion 43 such that the center frequency of the frequency band increases with a decrease in the distance between the interrogator 2 and the endpoint devices 3a-3c. In the present embodiment, the endpoint devices 3a-3c are located such that the endpoint device 3a has the smallest distance from the interrogator 2, and the endpoint device 3b has the largest distance from the interrogator 2, while the endpoint device 3c has an intermediate distance from the interrogator 2, as shown in FIG. 1. In this embodiment, therefore, the subcarrier signal from the nearest endpoint device 3a has the highest frequency fs1, and the subcarrier signal from the most distant endpoint device 3b has the lowest frequency fs2, while the subcarrier signal from the intermediate endpoint device 3c has an intermediate frequency fs3. The intensity of the subcarrier signal decreases with an increase in the distance to the interrogator 2. The subcarrier signal has a higher harmonic the frequency of which is an odd-number multiple of the fundamental frequency. For example, the subcarrier signal transmitted from the most distant endpoint device 3b and having the frequency fs2 has a higher harmonic having a frequency 312 which is three times as high as the frequency fs2. Even if the subcarrier signal having the higher harmonic 3fs2 is superimposed on the subcarrier signal transmitted from the nearest endpoint device 3a and having the frequency fs1, the subcarrier signal having the frequency fs1 can be recognized since it has a sufficiently higher intensity than the higher harmonic having the frequency 3fs2.

Referring to the graph of FIG. 7 indicating a frequency distribution of the subcarrier signals in relation to time, the frequency is taken along the ordinate while the time is taken along the abscissa. In the graph, CH1-CH78 represent mutually adjacent frequency channels to be hopped, while L1-L26 represent ranges of the distance between the interrogator 2 and the endpoint device 3a, 3b, 3c. As indicated in the graph, the frequency channels CH1-CH78 are grouped such that a plurality of groups of the frequency channels correspond to the respective distance ranges L1-L26. In the example of FIG. 7, a group of three channels CH1-CH3 corresponds to the first distance range L1 and a group of three channels CH4-CH6 corresponds to the second distance range L2, while a group of three channels CH7-CH9 corresponds to the third distance range L3. The distance decreases in the order of L1, L2, L3 . . . L26, with the distance range L1 having the largest distance. In the present example, the detected distance of the endpoint device 3b belongs to the distance range L1 and the detected distances of the endpoint device 3c and an endpoint device 3c' (not shown in FIG. 1) belong to the distance range L2, while the detected distance of the endpoint device 3a belongs to the distance range L3. Each of t1-t12 represents a time frame long enough for each endpoint device 3a, 3b, 3c, 3c' to complete the transmission of the subcarrier signal. Rectangular boxes in the graph of FIG. 7 indicate combinations of the time frame and the frequency band (channel) of the reflected subcarrier signal transmitted in that time frame from the endpoint devices 3a, 3b, 3c, 3c'.

As indicated in FIG. 7, the frequency of the subcarrier signal to be transmitted from the endpoint device 3a is hopped within the frequency band consisting of the channels CH7-CH9, and the frequency of the subcarrier signal to be transmitted from the endpoint device 3b is hopped within the frequency band consisting of the channels CH1-CH3, while the frequency of the subcarrier signal to be transmitted from the endpoint devices 3c, 3c' is hopped within the frequency band consisting of the channels CH4-CH6. The reflected subcarrier signals are transmitted from the endpoint devices 3a, 3b, 3c, 3c' in the randomly selected time frames.

In the first embodiment described above, the frequency band of the subcarrier signal transmitted from each endpoint device 3a, 3b, 3c is determined on the basis of the distance between the endpoint device and the interrogator 2. Since the endpoint devices 3a-3c have the respective different distances to and from the interrogator 2, the reflected subcarrier signals transmitted from the different endpoint devices have respective different frequencies, so that a risk of collision among those subcarrier signals can be effectively minimized.

Further, the frequency band selected for the most distant endpoint device 3b has the lowest center frequency, and the frequency band selected for the nearest endpoint device 3a has the highest center frequency, so that the fundamental frequency or higher harmonic of the reflected subcarrier signal transmitted from the endpoint device 3a will not interfere with the reflected subcarrier signal transmitted from the endpoint device 3b.

Since the band determining portion 43 is arranged to hop the frequency of the subcarrier signals within the selected frequency band, there is a reduced risk of collision between the reflected subcarrier signals transmitted from the endpoint devices 3c, 3c' the distances of which to the interrogator 2 are in the same distance range L2.

In addition, the risk of collision between the above-indicated reflected subcarrier signals transmitted from the end point devices 3c, 3c' is further reduced since these subcarrier signals are transmitted in the randomly selected time frames.

Further, the distance between the interrogator 2 and each endpoint device 3a, 3b, 3c can be easily detected on the basis of the intensity of the interrogating signal, and the thus detected distance does not represent an actual linear distance to the interrogator 2, but represents an apparent distance which relatively accurately reflects an actual positional relationship between each endpoint device and the interrogator 2, which relationship is affected by any walls and barriers that are disposed therebetween and may define passageways in the environment in which the endpoint devices are used.

Referring next to the block diagram of FIG. 8, there will be described a second embodiment of this invention, which is substantially identical with the first embodiment, except the demodulating means of the modulator/demodulator 32 and the information obtaining portion 33 of each endpoint device 3a, 3b, 3c, which are arranged to obtain the intensity information and the content information from the interrogating signal received from the interrogator 2.

Figure 8:
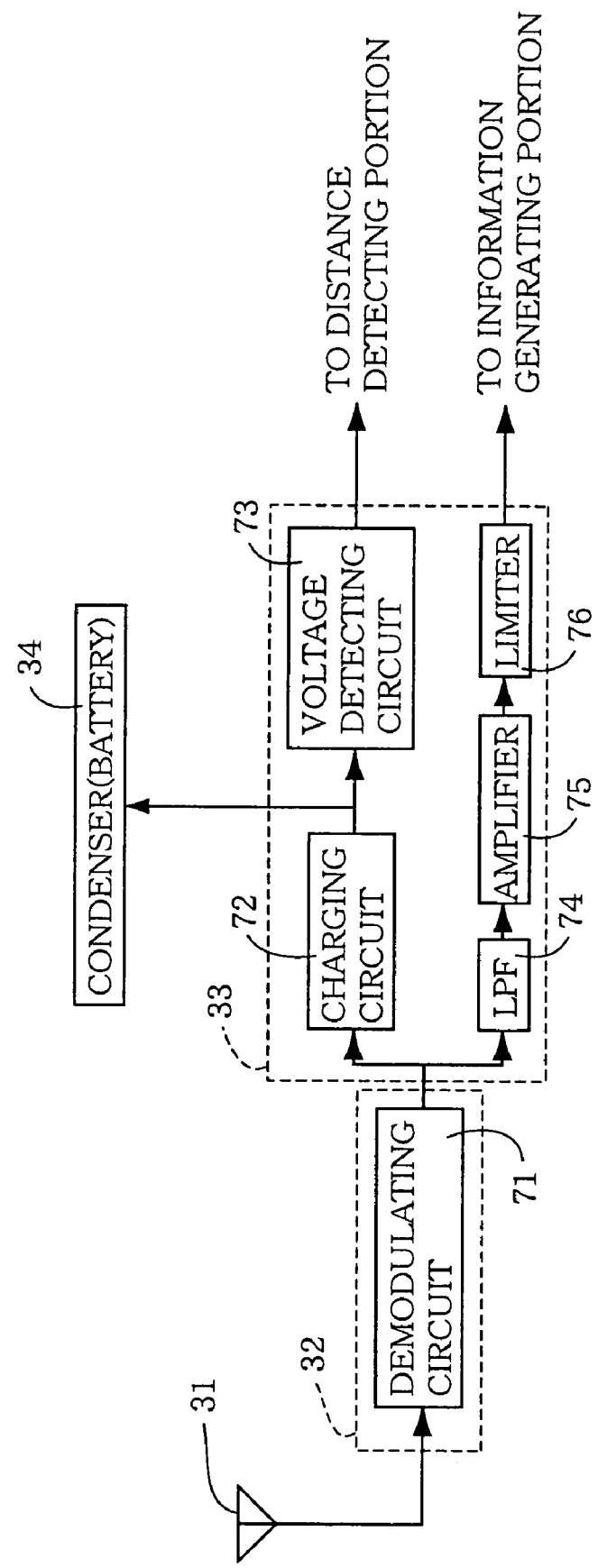
FIG. 8 is a block diagram showing a demodulator of a modulating/demodulating portion, and an information obtaining portion, which are included in each endpoint device of a communication system according to a second embodiment of the present invention.

The block diagram of FIG. 8 shows the demodulating means of the modulator/demodulator 32 and the information obtaining portion 33 of each endpoint device 3a, 3b, 3c, which are provided in the second embodiment to obtain the intensity information and the content information from the received interrogating signal.

As shown in FIG. 8, the demodulating means of the modulator/demodulator 32 is constituted by a demodulating circuit 71, which is arranged to demodulate the interrogating signal received through the antenna 31. The demodulated interrogating signal is received by a charging portion in the form of a charging circuit 72 and a voltage detecting circuit 73 of the information obtaining portion 33, which will be described. The information obtaining portion 33 includes the above-indicated charging circuit 72 and voltage detecting circuit 73, and further includes a LPF 74, an amplifier 75 and a limiter 76. The charging circuit 72 is arranged to charge a condenser (battery) 34 provided in the endpoint device $3a$, $3b$, $3c$, with an electric energy derived from the interrogating signal which has been demodulated by the modulator/demodulator 32. The voltage detecting circuit 73 is arranged to detect a voltage of the charging circuit 72 and convert the detected voltage into a digital signal, which is applied to, the distance detecting portion 42 of the controller 41, as the intensity information of the received interrogating signal. The LPF 74 is arranged to remove a high-frequency noise from the interrogating signal demodulated by the modulator/demodulator 32. An output of the LPF 74 is received by the amplifier 75, which is arranged to amplify the signal from which the high-frequency noise has been removed by the LPF 74. The amplified signal is received by the limiter 76, which is arranged to shape the amplified signal into a digital signal that is applied to the information obtaining portion 33 of the controller 41, as the content information.

The distance detecting portion 42 of the controller 41 is arranged to detect the distance of the endpoint device to the interrogator 2, on the basis of a rate of change of the voltage of the charging circuit 72, or a length of time during which the voltage of the charging circuit 72 has changed by a predetermined amount. It is noted that the voltage detecting circuit 73 may be replaced by an electric energy detecting circuit arranged to detect an amount of electric energy with which the condenser 34 is charged by the charging circuit 72. In this case, the distance detecting portion 42 detects the distance of the endpoint device to the interrogator 2, on the basis of a rate of change of the amount of electric energy detected by the electric energy detecting circuit, or a length of time during which the detected amount of electric energy has changed by a predetermined amount The condenser 34 is provided an electric power source for operating the endpoint device $3a$, $3b$, $3c$, and is charged with the electric energy which is obtained by the charging circuit 72 from the received interrogating signal. The endpoint device $3a$, $3b$, $3c$ is turned on when the amount of electric energy stored in the condenser 34 has reached a predetermined value.

The operation of the communication system 1 according to the second embodiment of this invention is substantially identical with that of the communication system 1 of the first embodiment.

The second embodiment described above has the same advantages as described above with respect to the first embodiment, and has a further advantage that each endpoint device $3a$, $3b$, $3c$ does not need an exclusive electric power source, in the presence of the condenser 34, the electric energy of which is used to operate the endpoint device. Accordingly, the size and weight of each endpoint device $3a$, $3b$, $3c$ can be reduced.

It is further appreciated that the condensers 34 of the individual endpoint devices $3a$, $3b$, $3c$ require different lengths of time for full charging, since the interrogating signals received by the individual endpoint devices $3a$-$3c$ have different intensity values depending upon the different distances to the interrogator 2. Accordingly, the reflected subcarrier signals are transmitted from the individual endpoint devices $3a$-$3c$ at different times, making it possible to reduce a risk of collision among the reflected subcarrier signals.

Where the condenser 34 has a comparatively large capacity, some amount of electric energy may be left in the condenser 34 upon transmission of the next reflected subcarrier signal to the interrogator 2, and the amounts of electric energy stored in the condensers 34 of the endpoint devices $3c$, $3c'$ in the same distance range may differ from each other upon repeated transmissions of the reflected subcarrier signals to the interrogator 2, and due to different operating characteristics of the condensers 34. Therefore, the risk of collision between the reflected subcarrier signals transmitted from the endpoint devices $3c$, $3c'$ can be reduced to an appreciable extent.

Referring next to the block diagrams of FIGS. 9 and 10, there will be described a third embodiment of this invention. The communication system 1 according to the third embodiment is substantially identical with the communication system 1 of the first embodiment, except the controller 26 of the digital circuit portion 20 of the interrogator 2, and the controller 41 of the digital circuit portion 40 of each endpoint device $3a$, $3b$, $3c$.

Figure 9:
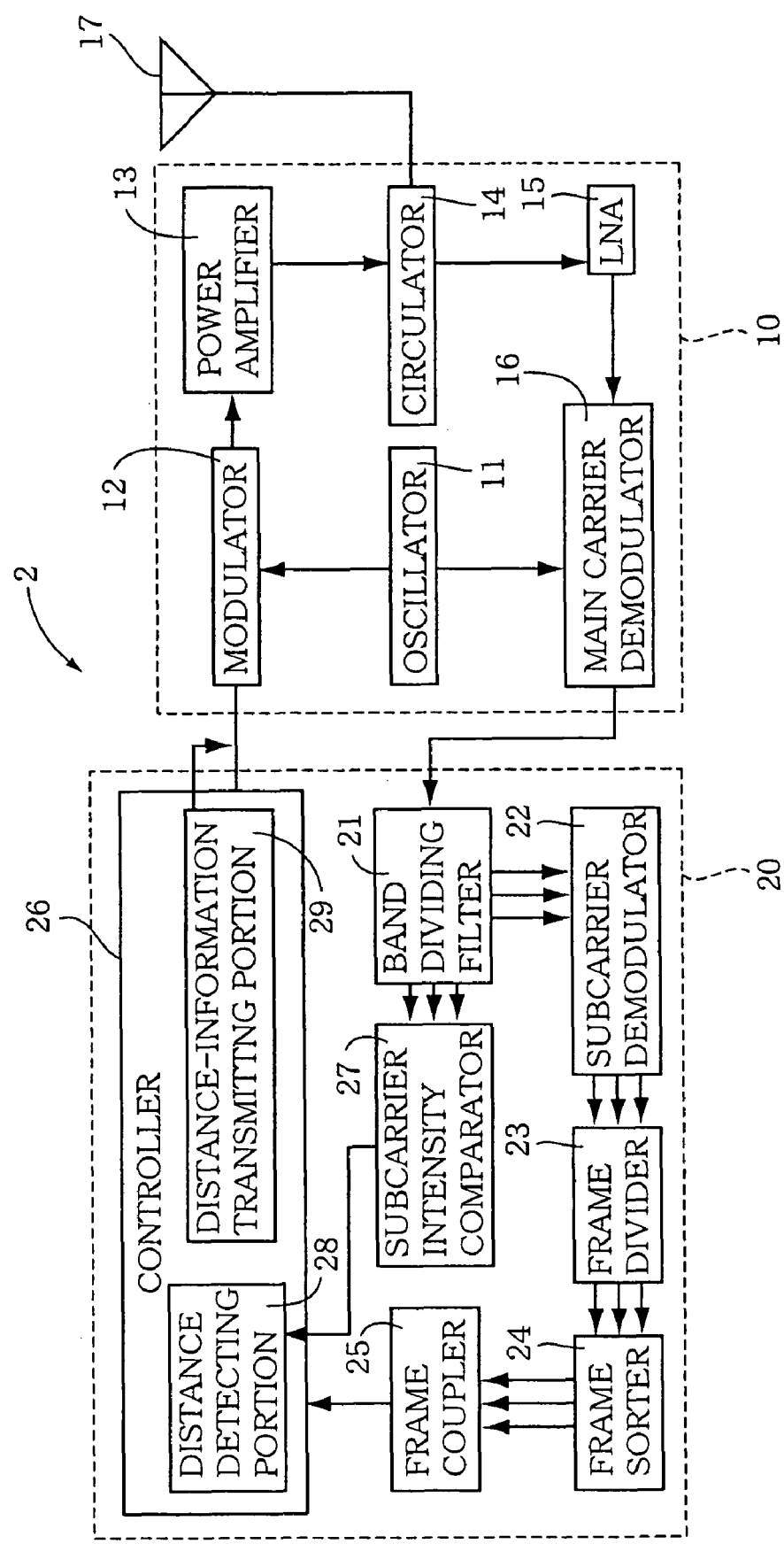
FIG. 9 is a block diagram showing an arrangement of an interrogator in a third embodiment of the invention.

As shown in the block diagram of FIG. 9, the controller 26 of the interrogator 2 includes an interrogator-distance detecting portion in the form of a distance detecting portion 28, and a distance-information transmitting portion 29. The distance detecting portion 28 is arranged to detect the distances from the interrogator 2 to the endpoint devices $3a$-$3c$ on the basis of the intensity values of the reflected signals received from the endpoint devices $3a$-$3c$. Described more specifically, the intensity values of the subcarrier signals obtained by the band dividing filter 21 are compared with a plurality of threshold values by the subcarrier intensity comparator 27. On the basis of results of comparison by the subcarrier intensity comparator 27, the distance detecting portion 28 detects the distances between the interrogator 2 and the endpoint devices $3a$-$3c$, according to a stored data table indicative of a relationship between the intensity values of the subcarrier signals and the distances. The distance-information transmitting portion 29 is arranged to transmit to the endpoint devices $3a$-$3c$ distance information indicative of the distances detected by the distance detecting portion 28.

All of the endpoint devices $3a$-$3c$ have the same arrangement. The endpoint device $3a$ will be described by way of example. The following description applies to the endpoint devices $3b$ and $3c$.

Like the end point device $3a$ described with respect to the first embodiment by reference to FIG. 3, the endpoint device $3a$ includes the antenna 31, modulator/demodulator 32, information obtaining portion 33, and digital circuit portion 40. The endpoint device $3a$ of FIG. 10 is identical with that of FIG. 3, except the digital circuit portion 40, more specifically, the controller 41 of the digital circuit portion 40.

Figure 10:
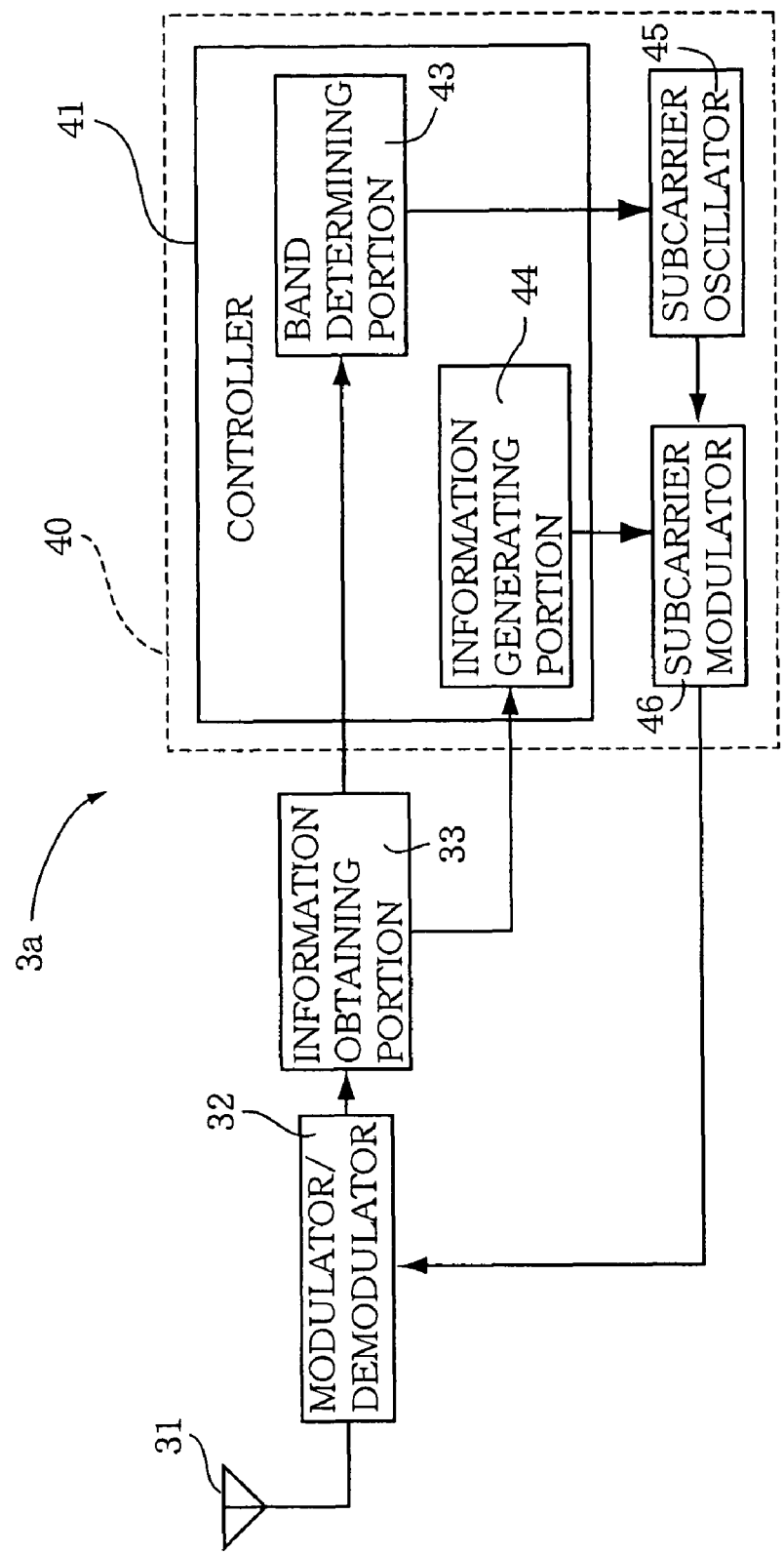
FIG. 10 is a block diagram showing an arrangement of each endpoint device in the third embodiment.

Unlike the controller 41 of the digital circuit portion 40 in the first embodiment of FIG. 3, the controller 41 in the present third embodiment of FIG. 10 does not include the distance detecting portion 42, and the band determining portion 51 receives the distance information directly from the information obtaining portion 33.

In the present third embodiment, the distance information transmitted from the distance-information transmitting portion 29 of the interrogator 2 is received by the information obtaining portion 33, together with the content information. The band determining portion 43, which receives the distance information from the information obtaining portion 33 through the modulator/demodulator 32, determines or selects frequency band for the frequency hopping operation, on the basis of the distance, information received from the information receiving portion 33, and according to the stored data table representative of the relationship between the distance between the interrogator 2 and the endpoint device 3a, and the frequency band of the subcarrier signal to be selected, as shown in FIG. 4 by way of example and as described above with respect to the first embodiment. In this example, the center frequency of the selected frequency band is decremented from 300 kHz by 10 kHz as the distance is incremented from 0.5 m by 0.1 m. One of the frequency channels grouped together within the selected frequency band corresponding to the detected distance is selected by hopping, as described above.

The band determining portion 43 controls the timing at which a signal indicative of the determined frequency band is applied to the subcarrier oscillator 45, so that the timing at which the reflected signal is transmitted to the interrogator 2 is determined by randomly selecting one of the time frames.

The information generating portion 44 reads out the replying information from the appropriate memory of the controller 41, according to the content information of the interrogating signal obtained by the information obtaining portion 33. The replying information which has been read out are supplied to the subcarrier modulator 46. The replying information may be read out from an external device connected to the endpoint device 3a.

The modulator/demodulator 32 and the information obtaining portion 33 are identical with those in the first embodiment described above by reference to FIGS. 3, 5A and 5B, except that the information obtaining portion 33 receives the distance information which is obtained by the distance detecting portion 28 and transmitted from the distance-information transmitting portion 29.

Figure 11:
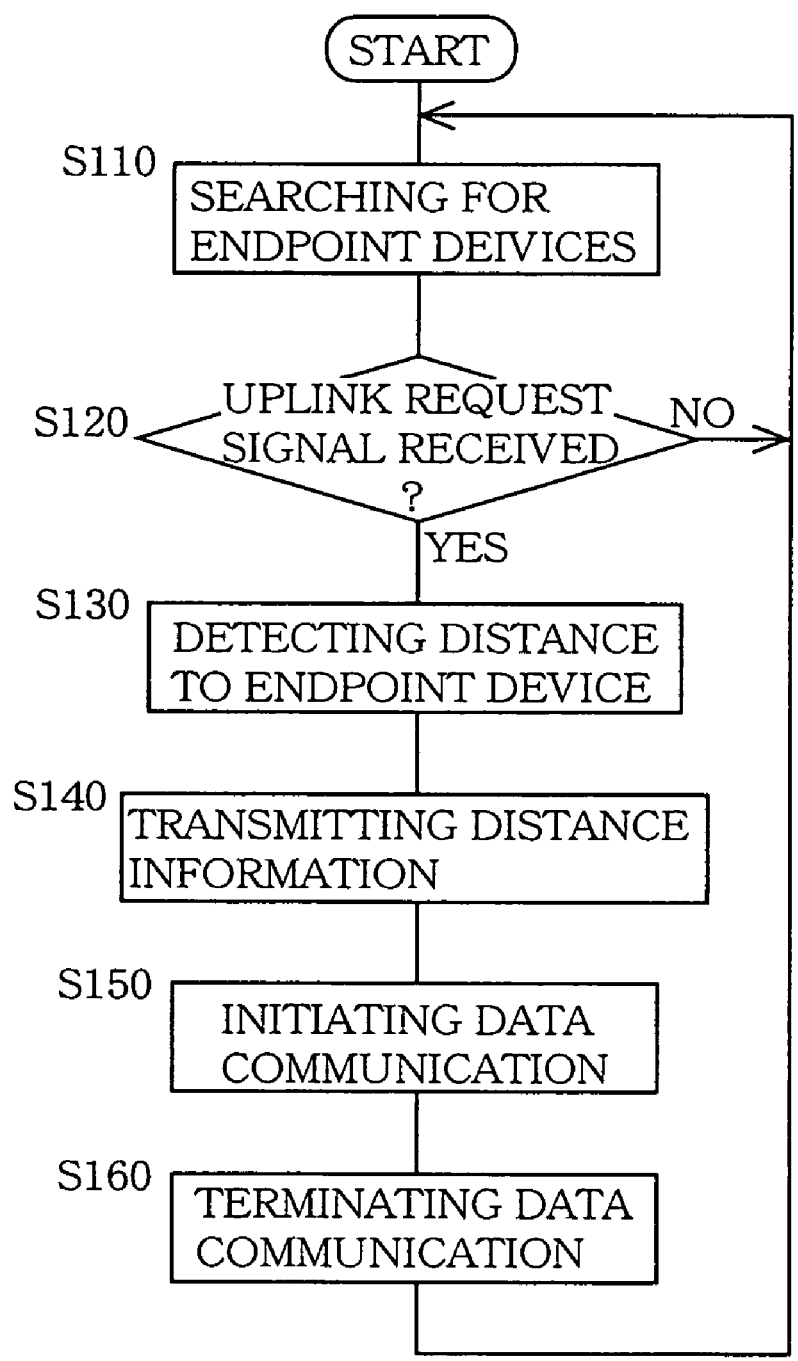
FIG. 11 is a flow chart illustrating a data communication routine executed by the interrogator in the third embodiment.

Referring next to the flow chart of FIG. 11, there will be described a data communication routine executed by the interrogator 2 in the third embodiment of FIGS. 9 and 10. The data communication routine is initiated with step S110 in which the interrogator 2 transmits the interrogating signal to the endpoint devices 3a-3c, for searching for the endpoint devices 3a-3c. Then, the control flow goes to step S120 to determine whether the interrogator 2 has received an uplink request signal in the form of a reflected subcarrier signal from each of the endpoint devices 3a-3c, within a predetermined time. If a negative decision (NO) is obtained in step S120, the control flow goes back to step S110 to repeat the transmission of the interrogating signal (search signal) for searching for the endpoint devices 3a-3c. If the interrogator 2 has received the reflected subcarrier signal as the uplink request signal from the endpoint device 3a, 3b, 3c, that is, if an affirmative decision (YES) is obtained in step S120, the control flow goes to step S130 in which the distance detecting portion 28 of the controller 26 detects the distance between the interrogator 2 the endpoint device in question, on the basis of the intensity of the reflected subcarrier signal.

Step S130 is followed by step S140 in which the distance-information transmitting portion 29 of the controller 26 transmits to the endpoint device 3a, 3b, 3c in question the distance information obtained on the basis of the intensity of the reflected subcarrier signal, as the interrogating signal. Then, the control flow goes to step S150 to initiate data communication with the endpoint device in question, in response to the reflected subcarrier signal. Step S150 is followed by step S160 in which the data communication with the endpoint device 3a, 3b, 3c is terminated. Then, the control flow goes back to step S110 to initiate the next cycle of execution of the data communication routine.

Figure 12:
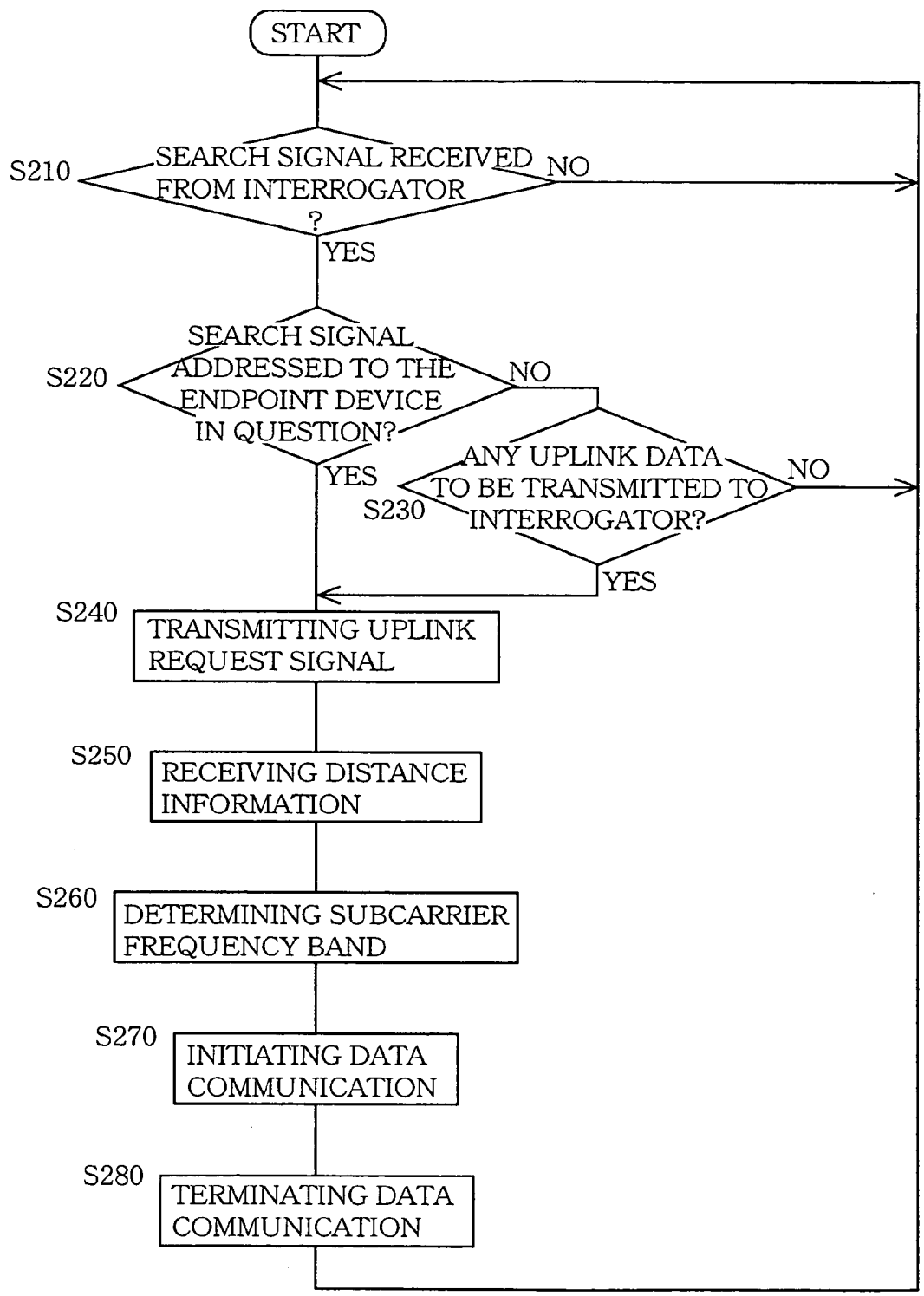
FIG. 12 is a flow chart illustrating a data communication routine executed by each endpoint device in the third embodiment.

Then, there will be described a data communication routine executed by each of the endpoint devices 3a-3c, by reference to the flow chart of FIG. 12. This data communication routine is initiated with step S210 to determine whether the endpoint device in question has received the interrogating signal (search signal) from the interrogator 2. If a negative decision (NO) is obtained in step S210, the control flow goes back to step S210. Step S210 is repeatedly implemented until an affirmative decision (YES) is obtained, that is, until the endpoint device in question has received the interrogating signal transmitted from the interrogator 2 for searching for the endpoint device. If the affirmative decision (YES) is obtained in step S221, the control flow goes to step S220 to determine whether the received interrogating signal is addressed to the endpoint device 3a, 3b, 3c in question. If an affirmative decision (YES) is obtained in step S220, the control flow goes to step S240. If a negative decision (NO) is obtained in step S220, that is, if the received interrogating signal is not addressed to the endpoint device in question, the control flow goes to step S230 to determine whether there are any uplink data to be transmitted to the interrogator 2. If a negative decision (NO) is obtained in step S230, the control flow goes back to step S210, and steps S210 and S220 are repeatedly implemented until the endpoint device has received the interrogating signal addressed thereto. If the received interrogating signal is addressed to the endpoint device in question, that is, if the affirmative decision (YES) is obtained in step S220, the endpoint device transmits to the interrogator 2 the uplink request signal in the form of the reflected subcarrier signal.

Step S240 is followed by step S250 to receive from the interrogator 2 the interrogating signal which contains the distance information indicative of the distance between the endpoint device 3a, 3b, 3c in question and the interrogator 2. Then, the control flow goes to step S260 in which the band determining portion 43 determines or selected the frequency band in which the frequency of the reflected subcarrier signal is hopped. Step S260 is followed by step S270 to initiate the data communication with the interrogator 2, that is, to transmit the modulated subcarrier signal (reflected signal) of a frequency within the selected frequency band, in response to the received interrogating signal.

Figure 13:
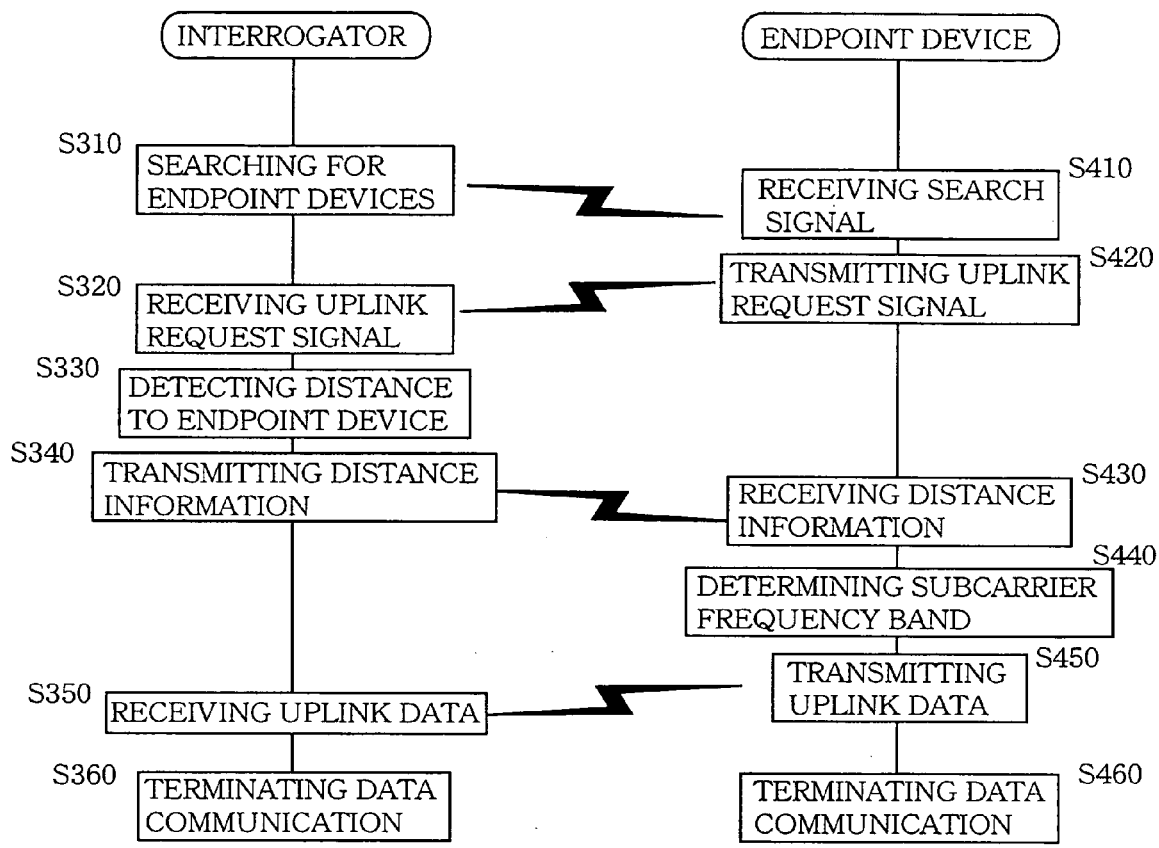
FIG. 13 is a flow chart illustrating a sequence of the data communication performed by the communication system of the third embodiment.

Referring further to the flow chart of FIG. 13, there will be a sequence of the data communication performed by the communication system 1. The sequence is initiated with step S310 in which the interrogator 2 transmits the interrogating signal (search signal) to each endpoint device 3a-3c. In step S410, the endpoint device receives the interrogating signal transmitted from the interrogator 2. In the next step S420, the endpoint device which has received the interrogating signal addressed thereto transmits to the interrogator 2 the uplink request signal in response to the received interrogating signal. In step S320, the interrogator 2 receives the uplink request signal transmitted from the endpoint device in question. Step S320 is followed by step S330 in which the distance detecting portion 28 of the interrogator 2 detects the distance to the endpoint device 3a, 3b, 3c in question, on the basis of the intensity of the uplink request signal in the form of the reflected subcarrier signal. In the next step S340, the distance information transmitting portion 39 transmits to the endpoint device in question the distance information indicative of the distance detected by the distance detecting portion 28.

In step S430, the endpoint device in question receives the distance information from the interrogator 2. Step S430 is followed by step S440 in which the band determining portion 43 determines, on the basis of the received distance information, the frequency band in which the frequency of the subcarrier signal is hopped. Step S440 is followed by step S450 in which the endpoint device 3a-3c modulates the interrogating signal with the subcarrier signal of a frequency in the determined frequency band, and transmits the thus modulated reflected subcarrier signal to the interrogator 2, as uplink data in response to the interrogating signal. The data communication of the endpoint device with the interrogator 2 is terminated in step S460 following the step S450. In step S350, the interrogator 2 receives the reflected subcarrier signal from the endpoint device in question. The data communication of the interrogator 2 with the endpoint device is terminated in step S360 following the step S350.

In the third embodiment described above, the frequency band of the subcarrier signal transmitted from each endpoint device 3a, 3b, 3c is determined on the basis of the distance between the endpoint device 3a-3c and the interrogator 2. Since the endpoint devices 3a-3c have the respective different distances to and from the interrogator 2, the reflected subcarrier signals transmitted from the different endpoint devices have respective different frequencies, so that a risk of collision among those subcarrier signals can be effectively minimized.

Further, the frequency band selected for the most distant endpoint device 3b has the lowest center frequency, and the frequency band selected for the nearest endpoint device 3a has the highest center frequency, so that the higher harmonic of the reflected subcarrier signal transmitted from the endpoint device 3a will not interfere with the reflected subcarrier signal transmitted from the endpoint device 3b.

Since the band determining portion 43 is arranged to hop the frequency of the subcarrier signals within the selected or determined frequency band, there is a reduced risk of collision between the reflected subcarrier signals transmitted from the endpoint devices (e.g., 3c and 3c' described with respect to the first embodiment) the distances of which to the interrogator 2 are in the same distance range L2.

In addition, the risk of collision between the above-indicated reflected subcarrier signals transmitted from the end point devices within the same distance range is further reduced since these subcarrier signals are transmitted in the randomly selected time frames.

Further, the distance between the interrogator 2 and each endpoint device 3a, 3b, 3c is detected by the distance detecting portion 28 of the interrogator 2, and the distance information indicative of the detected distance is transmitted from the distance-information transmitting portion 29 to each endpoint device. Accordingly, each endpoint device need not include the distance detecting portion 42, so that a control load of the endpoint devices can be reduced, and the endpoint devices can be simplified in construction.

In the first, second and third embodiments, the frequencies of the reflected subcarrier signals to be transmitted from the endpoint devices 3a-3c are determined such that the frequency of the reflected subcarrier signal to be transmitted from the endpoint device relatively distant from the interrogator 2 is selected in a relatively low frequency band, while the frequency of the reflected subcarrier signal to be transmitted from the endpoint device relatively near the interrogator 2 is selected in a relatively high frequency band. However, the frequencies of the subcarrier signals to be transmitted from the endpoint devices need not be determined on the basis of the distances of the endpoint devices to and from the interrogator 2. For instance, the frequencies of the reflected subcarrier signals may be determined irrespective of the distances, provided the reflected subcarrier signals to be transmitted from the endpoint devices having different distances to the interrogator are transmitted from those endpoint devices at different times, that is, in respective different time frames.

While the frequency of the reflected subcarrier signal to be transmitted from each endpoint device is hopped at random within the selected frequency band, the frequency may be hopped to the predetermined values (frequency channels) within the selected band, in the predetermined order.

In the first, second and third embodiments, the frequency band in which the frequency of the subcarrier signal is hopped is selected from a plurality of frequency bands which correspond to respective ranges of the distance between the interrogator 2 and each endpoint device 3a-3c, and each of which consists of a plurality of frequency channels which are grouped together for the corresponding distance range. However, the frequency band in which the frequency is selected for each endpoint device may be determined otherwise, on the basis of the distance to the interrogator.

In the embodiments described above, the reflected subcarrier signal is transmitted from each endpoint device, in a randomly selected one of different times frames. However, the reflected subcarrier signals may be transmitted in the predetermined time frames. Further, the time frames need not be used to transmit the reflected subcarrier signals of different frequencies.

In the illustrated embodiments described above, the interrogator is arranged to detect the distances to and from each endpoint device, and transmit the distance information to each endpoint device, so that each endpoint device determines the frequency band of the reflected subcarrier signal to be transmitted. However, the interrogator may be further arranged to determine the frequency band of the reflected subcarrier signals to be received from each endpoint device, and transmit to each endpoint device frequency band information indicative of the determined frequency band.

In the illustrated embodiments described above, the frequency of the reflected subcarrier signals to be transmitted from each endpoint device is changed at a predetermined time interval, that is, hopped within the determined frequency band in relation to time as indicated in FIG. 7. However, the frequency of the reflected subcarrier signal need not be hopped within the determined or selected frequency band, as long as the frequency for each endpoint device is determined on the basis of the distance to the interrogator, or the timing at which the reflected subcarrier signal is transmitted from each endpoint device is determined on the basis of the distance to the interrogator.

Figure 14:
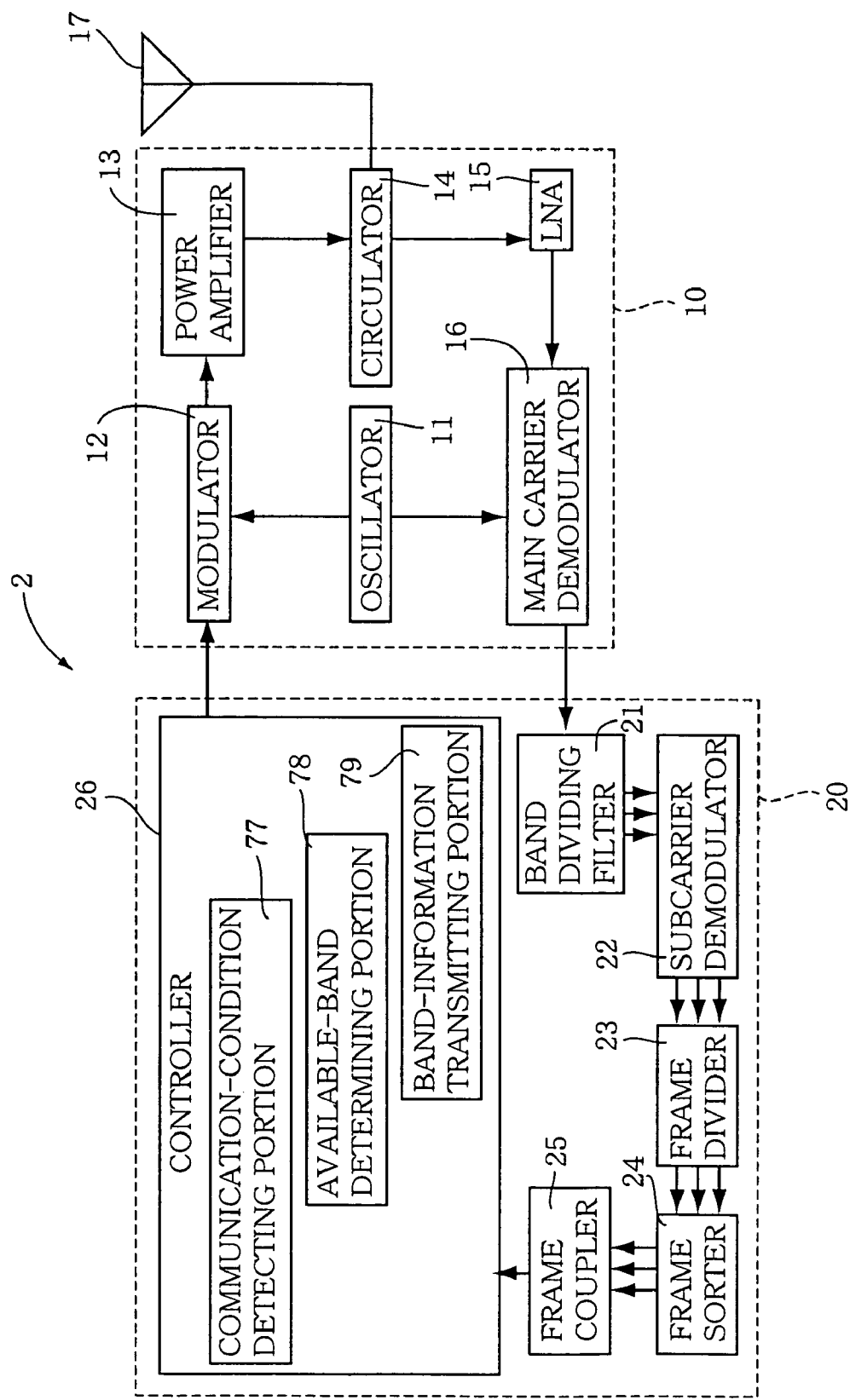
FIG. 14 is a block diagram showing an arrangement of an interrogator included in a communication system according to a fourth embodiment of this invention.

Referring next to FIGS. 14-19, there will be described a communication system according to a fourth embodiment of this invention, which is different from the first, second and third embodiments in that a frequency determining portion 47 provided in each endpoint device 3a, 3b, 3c (endpoint device 3a shown in FIG. 15 by way of example) is arranged to determine the frequency of the subcarrier signal on the basis of frequency band information received from the interrogator 2 as described below in detail by reference to FIG. 14. Namely, the endpoint devices 3a, 3b and 3c respond to the interrogating signal received from the interrogator 2, with respective reflected signals F1-F3 having respective frequencies fs1, fs2 and fs3. Each of the frequency fs1-fs3 is quasi-randomly selected by hopping within an available frequency band represented by the received frequency band information. As described below, the frequency band information transmitted from the interrogator 2 to each endpoint device 3a-3c represents the frequency band available for the endpoint device in question. Since the frequency bands available for the different endpoint devices 3a-3c are different from each other, multiplex transmission of the reflected signals is possible between the endpoint devices and the interrogator 2. Although the three endpoint devices 3a-3c are provided in this communication system as in the communication system 1 of the preceding embodiments, the number of the endpoint devices included in the present communication system may be selected as needed.

The interrogator 2 of the communication system according to the present fourth embodiment does not include, the subcarrier intensity comparator 27 provided in the preceding embodiments, and the output of the band dividing filter 21 is applied to only the subcarrier demodulator 22.

As shown in the block diagram of FIG. 14, the controller 26 of the digital circuit portion 20 of the present interrogator 2 includes a communication-condition detecting portion 77, an available-band determining portion 78 and a band-information transmitting portion 79. The communication-condition detecting portion 77 is arranged to detect a condition of communication of the interrogator with each, endpoint device 3a-3c. The communication condition is detected on the basis of the number of the endpoint devices which have transmitted the reflected signals to the interrogator 2. The above-indicated number of the endpoint devices is obtained by counting the number of channels generated by the subcarrier demodulator 22.

The available-band determining portion 78 is arranged to determine the frequency band available for each endpoint device 3a-3c, on the basis of the communication condition detected by the communication-condition detecting portion 77. Described more precisely, the lower limit of the available frequency band is kept constant at a predetermined value determined by the frequency of the main carrier used by the interrogator 2, while the upper limit of the available frequency band is changed or determined by the available-band determining portion 78. Accordingly, a decrease in the width of the available frequency band results in an increase in the probability of using the subcarrier signals having relatively low frequencies, while an increase in the width of the available frequency band results in an increase in the probability of using the subcarrier signals having relatively high frequencies. The available-band determining portion 78 is arranged to increment the available frequency band by a predetermined amount when the value indicative of the detected communication condition is equal to or larger than a predetermined first threshold value Th which is used for broadening the available frequency band, and to decrement the available frequency band by a predetermined amount when the value indicative of the detected communication condition is equal to or smaller than a predetermined second threshold value T1 which is used for narrowing the available frequency band. If the available frequency band is incremented or decremented by the available-band determining portion 78, the first and second threshold values Th and T1 are updated depending upon the present threshold values.

Described in detail, the available-band determining portion 78 selects one of four upper limit values f1-f4 (f1<f2<f3<f4) of the frequency band for each endpoint device 3a-3c, to thereby determine the available frequency band for each endpoint device. When the presently selected upper limit value is f1, the first threshold value Th used for broadening the available frequency band is set at 2, but the second threshold value T1 is made invalid since the value T1 cannot be smaller than 1 (minimum value for T1). When the presently selected upper limit value is f2, the first and second threshold values Th and T1 are set at 3 and 1, respectively. When the presently selected upper limit value is f3, the first and second threshold values Th and T1 are set at 4 and 2, respectively. When the presently selected upper limit value is f4, the second threshold values T1 is set at 3, but the first threshold value Th is made invalid since the value Th cannot be larger than 4 (maximum value for Th). Each time the number of the endpoint devices which have transmitted the reflected signals is changed, the available frequency band is changed. The upper limit values and the threshold values may be selected as needed, and the threshold values may be kept constant at predetermined values. Only one threshold value or three or more threshold values may be used to determine whether the available frequency band must be changed or not.

The band-information transmitting portion 79 is arranged to transmit to the endpoint devices 3a-3c the band information representative of the available frequency band determined by the available-band determining portion 78. The band information is contained in the interrogating signal to be transmitted to each endpoint device 3a-3c.

Figure 15:
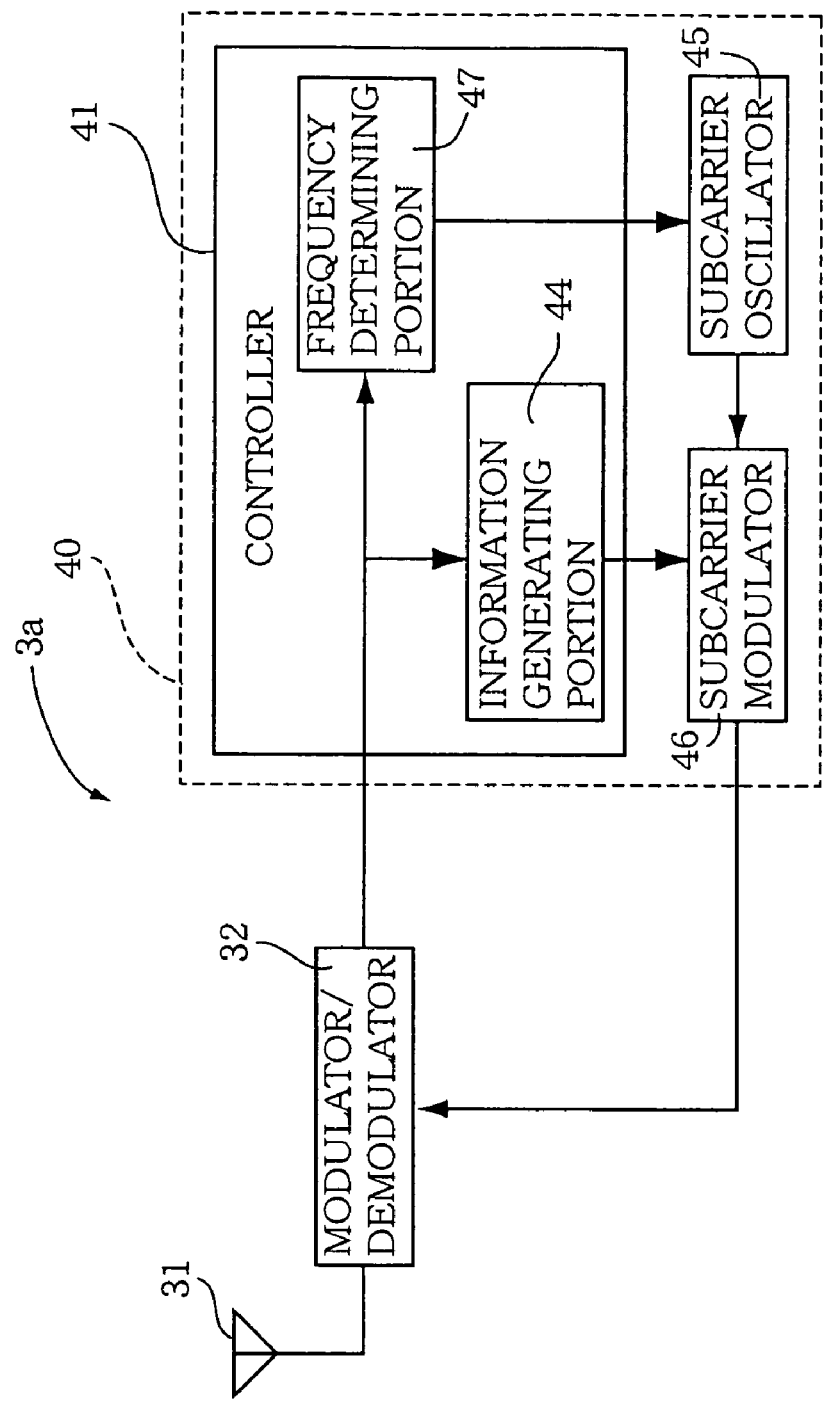
FIG. 15 is a block diagram showing an arrangement of each endpoint device in the fourth embodiment.

Referring to the block diagram of FIG. 15, the endpoint device 3a provided in the present fourth embodiment will be described by way of example. The endpoint device 3a in this embodiment does not include the information obtaining portion 33 provided in the endpoint device 3a in the third embodiment of FIG. 10, so that the interrogating signal demodulated by the modulator/demodulator 32 is directly applied to the frequency determining portion 47 and the information generating portion 44.

In the fourth embodiment, the frequency determining portion 47 is arranged to determine the frequency of the subcarrier signal for the reflected signal, on the basis of the frequency band information contained in the modulated interrogating signal received from the modulator/demodulator 32. Described more specifically, the frequency determining portion 47 quasi-randomly determines the frequency of the subcarrier signal, by frequency hopping within the available frequency band represented by the received band frequency information. Each time the endpoint device 3a transmits the reflected signal to the interrogator 2, the frequency of the subcarrier signal is hopped within the available frequency band determined by the interrogator 2.

Figure 16:
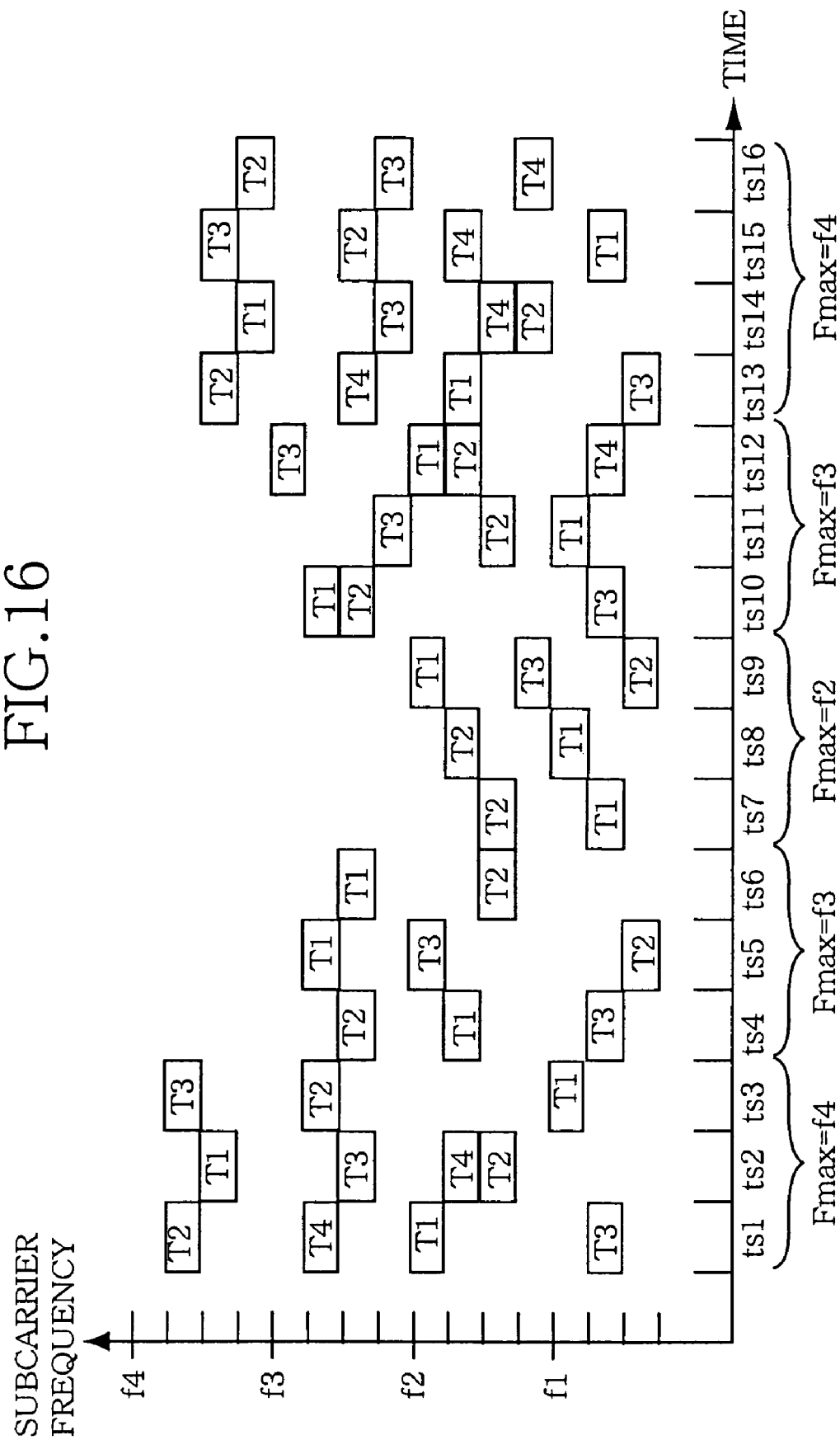
FIG. 16 is a graph showing a frequency distribution of subcarrier signals in relation to time.

There will next be described operations of endpoint devices to transmit the reflected signals in the form of the subcarrier signals, by reference to the graph of FIG. 16, which indicates a frequency distribution of the reflected signals. In this example, the communication system includes four endpoint devices 3a-3d which are operable to transmit reflected signal T1, T2, T3 and T4, respectively. The endpoint device 3d is not shown in FIG. 14. In the graph of FIG. 16, the frequency of the subcarrier signals is taken along the ordinate, while the time is taken along the abscissa. In the graph, ts1-ts16 arranged along the abscissa represent time frames each of which is long enough for each endpoint device to complete the transmission of the reflected signal T1-T4. Further, rectangular boxes in the graph represent relationships between the frequency of each reflected signal T1-T4 and the time frame ts1-ts16 in which the reflected signal is transmitted. As described above, f1-f4 represent the four upper limit values of the available frequency band of the subcarrier signal, and one of these four upper limit values is selected by the available-band determining portion 78 to determine the available frequency band. In the graph, "Fmax" values represent the upper limit values presently selected in respective time periods each consisting of a plurality of consecutive time frames ts1-ts3, ts4-ts6, ts7-ts9, ts10-ts12, ts13-ts16.

When the presently selected upper limit value Fmax is equal to f4, the second threshold value T1 for narrowing the available frequency band is set at 3. In this case, the upper limit value Fmax is not changed in the time frames ts1, ts2 and ts13-ts15 in which the number of the endpoint devices that have transmitted the reflected signal is equal to 4, and in the time frames ts3 which follow the time frames ts2 and ts15, respectively. In the time frame ts4 following the time frame ts3 in which the above-indicated number of the endpoint devices is changed from 4 to 3, the upper limit value Fmax is changed from f4 to f3. When the presently selected upper limit value Fmax is equal to f3, the first threshold value Th for broadening the available frequency band is set at 4 while the second threshold value T1 is set at 2. In this case, the upper limit value Fmax is not changed in the time frames ts4, ts5, ts10 and ts11 in which the above-indicated number of the endpoint devices is equal to 3, and in the time frames ts6 and ts12 following the time frames ts5 and ts11, respectively. In the time frame ts6 following the time frame ts5 in which the above-indicated number is changed from 3 to 2, the upper limit value Fmax is changed from f3 to f2. In the time frame ts13 following the time frame ts12 in which the above-indicated number is changed from 3 to 4, the upper limit value Fmax is changed from f3 to f4. When the presently selected upper limit value Fmax is equal to f2, the first threshold value Th for broadening the available frequency band is set at 3. In this case, the upper limit value Fmax is not changed in the time frames ts7 and ts8 in which the above-indicated number of the endpoint devices is equal to 2, and in the time frame ts9 following the time frame ts8. In the time frame ts9 following the time frame ts8 in which the above-indicated number is changed from 2 to 3, the upper limit value Fmax is changed from f2 to f3.

Figure 17:
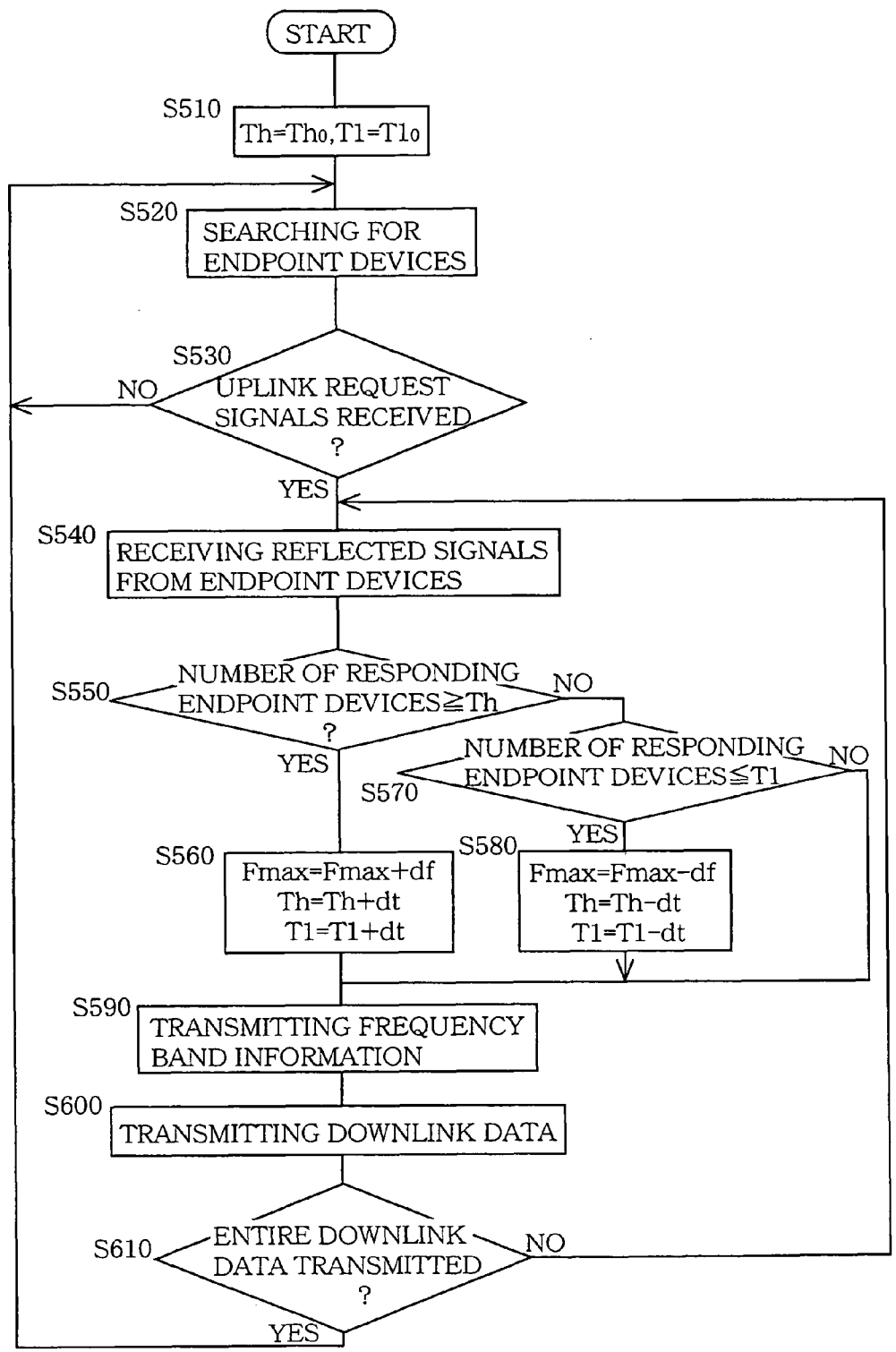
FIG. 17 is a flow chart illustrating a data communication routine executed by the interrogator in the fourth embodiment.

Referring next to the flow chart of FIG. 17, there will described a data communication routine executed by the interrogator 2. This data communication routine is initiated with step S510 to reset the first and second threshold values Th and T1 to respective initial values $Th_0$ and $T1_0$, which are the values set when the upper limit value Fmax is equal to f4. Then, the control flow goes to step S520 to search for the endpoint devices 3a-3c (3a-3d), namely, to transmit the interrogating, signal to the endpoint devices 3a-3c, for receiving the reflected signal or signals from some of the endpoint devices 3a-3c in response to the interrogating signal, in order to recognize those endpoint devices with which the interrogator 2 is communicable. Step S520 is followed by step S530 to determine whether an uplink request signal requesting data communication with the interrogator 2 is contained in the reflected signal or signals. If a negative decision (NO) is obtained in step S530, the control flow goes back to step S520 to repeat the search for the endpoint devices 3a-3c. If the uplink request signal is contained in the reflected signal or signals, that is, if an affirmative decision (YES) is obtained in step S530, the control flow goes to step S540 in which the received reflected signals are stored in the controller 26.

Then, the control flow goes to step S550 in which the communication-condition detecting portion 77 detects the number of the endpoint devices from which the reflected signals containing the uplink request signal have been received. Further, the available-band determining portion 78 determines whether the detected number is equal to or larger than the first, threshold value Th presently set for broadening the available frequency band. If the detected number is equal to or lager than the first threshold value Th, that is, if an affirmative decision (YES) is obtained in step S550, the control flow goes to step S560 to update the upper limit value Fmax of the available frequency band by adding a predetermined value df to the presently selected upper limit value Fmax. Further, the first and second threshold values Th and T1 used for broadening and narrowing the available frequency band are updated by adding the predetermined value df to the presently set threshold values Th and T1. If the presently selected upper limit value Fmax is equal to the maximum value f4, step S560 is not implemented, and step S550 is followed directly by step S590 (described below).

If the above-indicated number of the endpoint devices is not equal to or larger than the first threshold value Th, that is, if a negative decision (NO) is obtained in step S550, the control flow goes to step S570 to determine whether the number of the endpoint devices from which the reflected signals have been received is equal to or smaller than the second threshold value T1 presently set for narrowing the available frequency band. If an affirmative decision (YES) is obtained in step S570, the control flow goes to step S580 to update the upper limit value Fmax of the available frequency band by subtracting the predetermined value df from the presently selected upper limit value Fmax. Further, the first and second threshold values Th and T1 used for broadening and narrowing the available frequency band are updated by subtracting the predetermined value df from the presently set threshold values Th and T1. If the presently selected upper limit value Fmax is equal to the minimum value f1, step S580 is not implemented, and step S570 is followed directly by step S590 (described below). If a negative decision (NO) is obtained in step S570, the control flow goes directly to step S590.

In step S590, the band-information transmitting portion 79 transmits to the endpoint devices 3a-3c (3a-3d) the frequency band information indicative of the available frequency band determined by the available-band determining portion 78. Step S590 is followed by step S600 in which downlink data are transmitted to the endpoint devices from which the reflected signals have been received. The control flow then goes to step S610 to determine whether the entire downlink data have been transmitted. If a negative decision (NO) is obtained in step S610, the control flow goes back to step S540 and repeat the steps S540-S600 until the entire downlink data have been transmitted. When the entire downlink data have been transmitted, that is, if an affirmative decision (YES) is obtained in step S600, the control flow goes back to step S520 to search for the endpoint devices 3a-3c.

Figure 18:
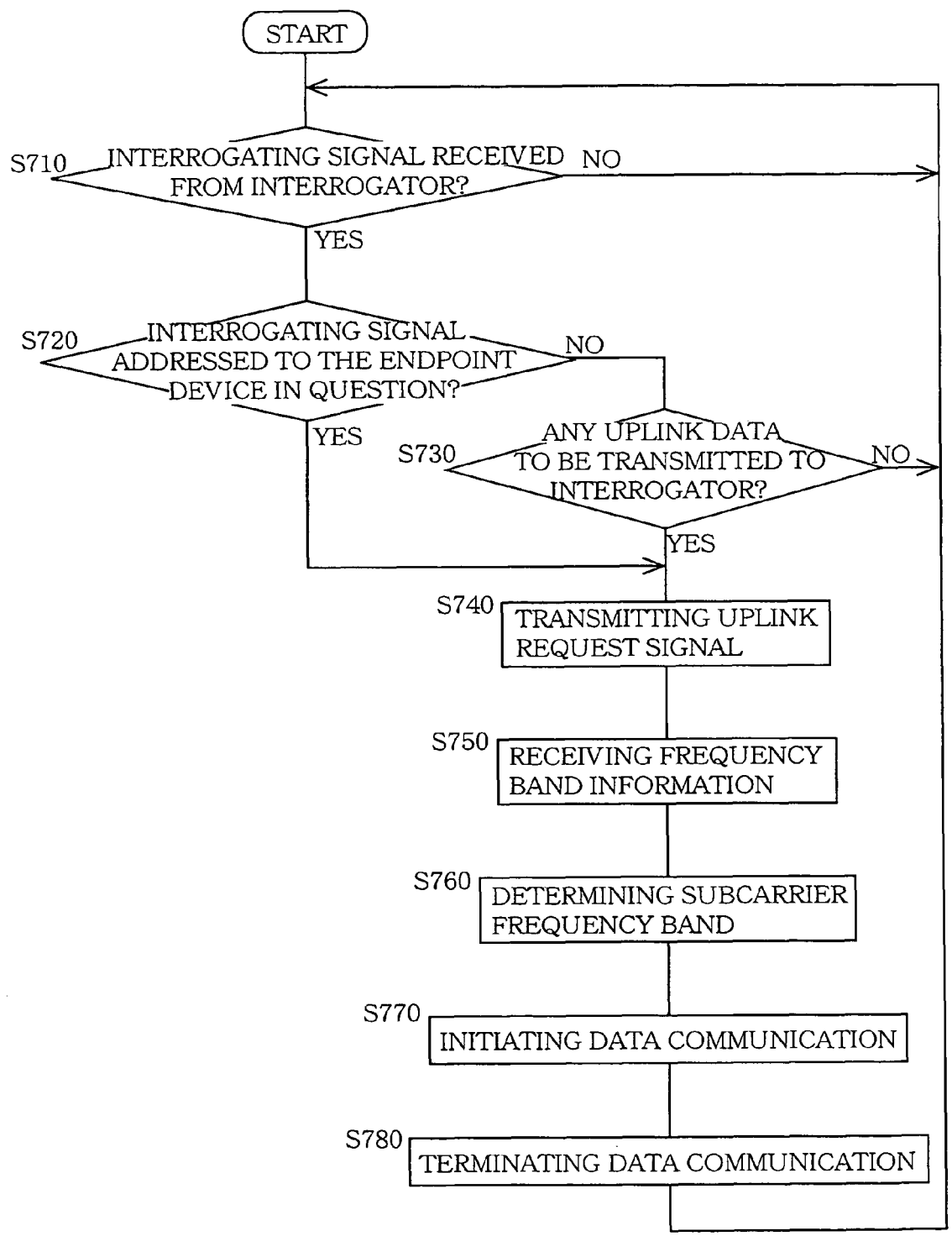
FIG. 18 is a flow chart illustrating a data-communication routine executed by each endpoint device in the fourth embodiment.

Referring to the flow chart of FIG. 18, there will be described a data communication routine executed by each of the endpoint devices 3a-3c (3a-3d). This data communication routine is initiated with step S710 to determine whether the interrogating signal has been received from the interrogator 2. If a negative decision (NO) is obtained in step S710, this step S710 is repeatedly implemented until the interrogating signal has been received. If an affirmative decision (YES) is obtained in step S710, the control flow goes to step S720 to determine whether the received interrogating signal is addressed to the endpoint device in question. If an affirmative decision (YES) is obtained in step S720, the control flow goes to step S740. If a negative decision (NO) is obtained in step S720, the control flow goes to step S730 to determine whether there are any uplink data to be transmitted to the interrogator 2. If an affirmative decision (YES) is obtained in step S730, the control flow goes to step S740. If a negative decision (NO) is obtained in step S730, the control flow goes back to step S710 and repeat the steps S710-S730, until the affirmative decision is obtained in step S720 or S730.

In step S740, the endpoint device in question transmits to the interrogator 2 the reflected information containing the uplink request signal. When the reflected information is transmitted to the interrogator 2 for the first time, no frequency band information has been received from the band-information transmitting portion 79 of the interrogator 2. In this case, therefore, the maximum value f4 is set as the upper limit value Fmax of the frequency band of the subcarrier signal used for the reflected signal. Step S740 is followed by step S750 in which the endpoint device in question receives the frequency band information. Then, the control flow goes to step S760 in which the frequency determining portion 47 determines the frequency of the subcarrier signal, by quasi-random frequency hopping within the available frequency band represented by the received frequency band information. Step S760 is followed by step S770 to initiate data communication with the interrogator 2. Step S770 is followed by step S780 in which the data communication is terminated upon completion of transmission of the entire uplink data. Then, the control flow goes back to step S710 to repeat the determination as to whether the interrogating signal has been received from the interrogator 2.

Figure 19:
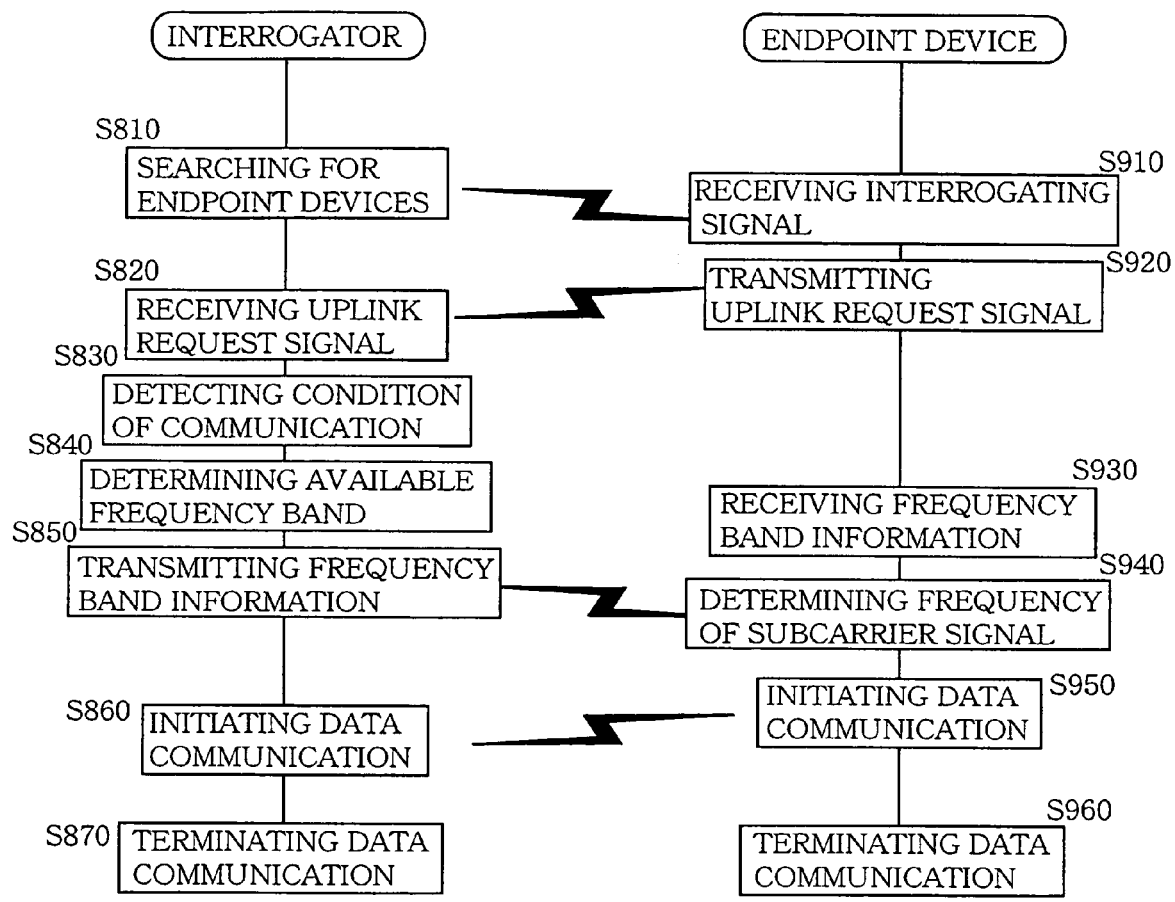
FIG. 19 is a flow chart illustrating a sequence of the data communication performed by the communication system in the third embodiment.

Referring further to the flow chart of FIG. 19, there will be described a sequence of the data communication between the interrogator 2 and each endpoint device 3a, by way of example. The following description applies to the endpoint devices 3b and 3c. The sequence is initiated with step S810 in which the interrogator 2 implements a search for the endpoint device 3a, by transmitting the interrogating signal to the endpoint device 3a. The transmitted interrogating signal is received by the endpoint device 3a in step S910. Step S910 is followed by step S920 in which the endpoint device 3a transmits the uplink request signal to the interrogator 2, in response to the received interrogating signal. In step S820, the interrogator 2 receives the transmitted uplink request signal. Step S820 is followed by step S830 in which the communication-condition detecting portion 77 detects the condition of communication between the interrogator 2 and the endpoint devices 3a-3c. Then, in step S840, the available-band determining portion 88 determines the upper limit of the available frequency-band, on the basis of the detected condition of communication. Step S840 is followed by step S850 in which the band-information transmitting portion 79 transmits to each endpoint device the frequency band information representative of the available frequency band determined by the available-band determining portion 78.

In step S930, the endpoint device 3a receives the frequency band information transmitted from the interrogator 2. Step S930 is followed by step S940 in which the frequency determining portion 47 determines the frequency of the subcarrier signal by hopping within the available frequency band represented by the received frequency band information. Then, in step S950, the endpoint device 3a modulates the interrogating signal received from the interrogator 2, with the subcarrier signal having the frequency determined by the frequency determining portion 47, and transmits to the interrogator 2 the thus obtained reflected signal containing the uplink data. Step S950 is followed by step S960 in which the data communication with the interrogator 2 is terminated upon completion of transmission of the entire uplink data. The reflected signal transmitted from the endpoint device 3a is received by the interrogator 2 in step S860. Step S860 is followed by step S870 in which the data communication with the endpoint device 3a is terminated upon completion of reception of the entire uplink data from the endpoint device 3a.

In the communication system constructed to the fourth embodiment of this invention which has been described above by reference to FIGS. 14-19, the upper limit of the frequency band of the subcarrier signal available for each endpoint device 3a-3c is determined and changed by the interrogator 2, on the basis of the number of the endpoint devices in operation for communication with the interrogator. Namely, the upper limit of the frequency band within which the frequency of the subcarrier signal is selected by hopping can be lowered to narrow the available frequency band, with a decrease in the above-indicated number is relatively small, so that the overall amount of electric energy consumption of the endpoint devices can be reduced. Further, the upper limit of the available frequency band can be increased to broaden the available frequency band, with an increase in the above-indicated number, so that a risk of collision among the reflected signals in the form of the subcarrier signals is reduced. Thus, the present fourth embodiment assures data communication between the interrogator and each endpoint device in a good condition, while saving the electric energy required for the data communication.

Further, the communication condition detecting portion 77 can accurately detect the condition of communication between the interrogator 2 and each of the endpoint devices, on the basis of the number of the endpoint devices ready to effect the data communication with the interrogator 2.

The fourth embodiment is further arranged to initiate the data communication when the available frequency band is maximum with the upper limit set at f4, so that the endpoint devices 3a-3c can initiate the data communication with high reliability.

Since each endpoint device is arranged to select the frequency of the subcarrier signal by quasi-random hopping within the determined available frequency band, and modulate the interrogating signal with the subcarrier signal having the thus selected, frequency, a risk of collision among the reflected signals is further reduced.

The fourth embodiment permits efficient determination of the available frequency band, by determining the upper limit of the available frequency band, by comparing the detected number of the endpoint devices ready for communication with the interrogator, with the first and second threshold values Th and T1.

There will be described a fifth embodiment of the invention wherein the controller 26 of the interrogator 2 includes a modified communication-condition detecting portion 77A (not shown). Unlike the communication-condition detecting portion 77 provided in the fourth embodiment of FIG. 14, the communication-condition detecting portion 77A is arranged to detect the condition of communication with the endpoint devices 3a-3c, on the basis of a probability of collision among the reflected signals transmitted from the endpoint devices 3a-3c. In the present embodiment, the probability of collision is obtained as a collision rate, which is a ratio of the number of the reflected signals received by the band dividing filter 21 to the number of the reflected signals (channels) which have not been demodulated by the subcarrier demodulator 22.

Figure 20:
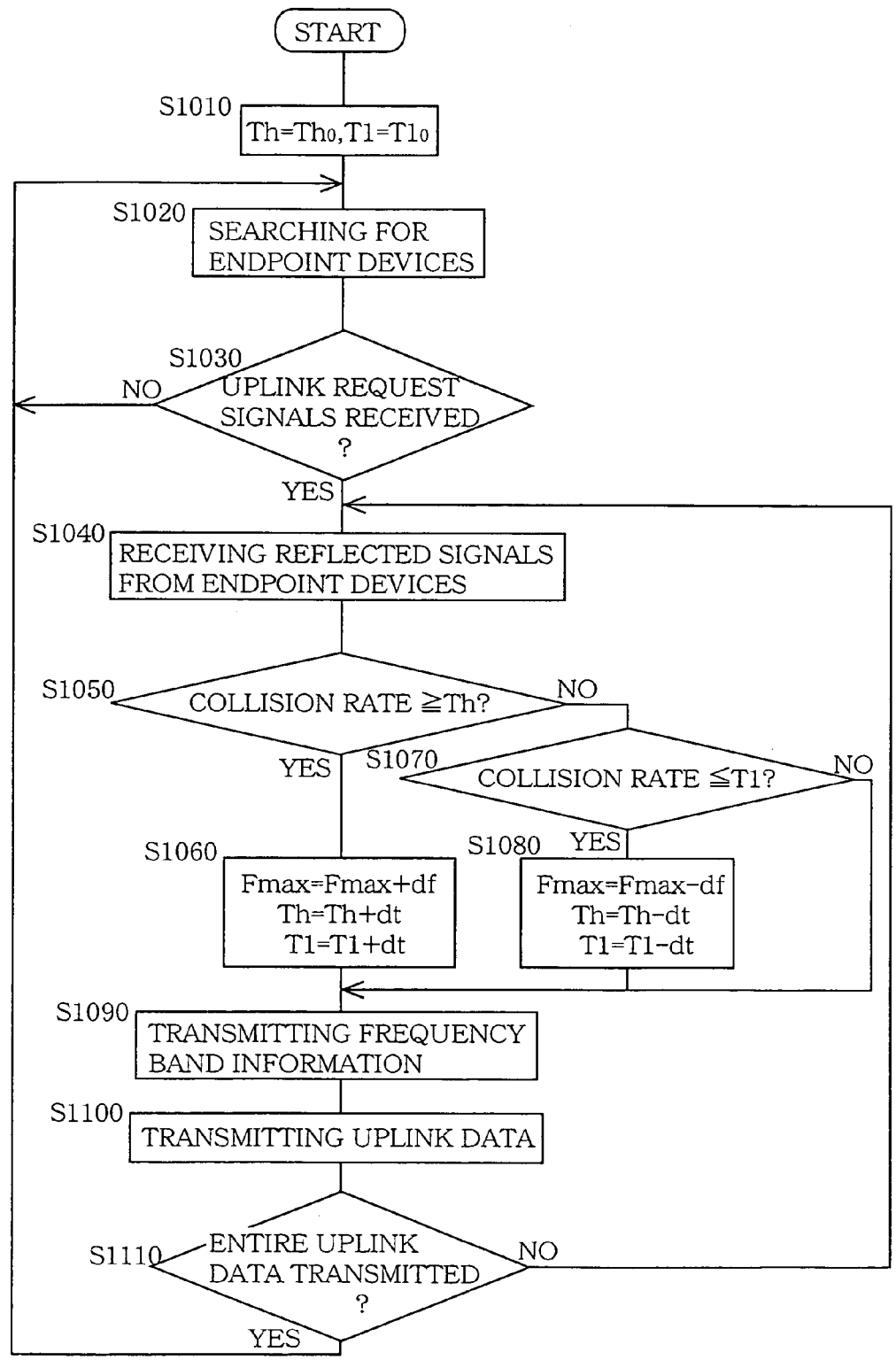
FIG. 20 is a flow chart illustrating a data communication routine executed by an interrogator included in a communication system according to a fifth embodiment of this invention.

Referring to the flow chart of FIG. 20, there will be described a data communication routine executed by the interrogator 2 including the modified communication-condition detecting portion 77A. Upon initiation of an operation of the interrogator 2, step S1010 is implemented to reset the first and second threshold values Th and T1 to initial values corresponding to the maximum value f4 of the upper limit Fmax of the available frequency band. Step 1010 is followed by step S1020 to search for the endpoint devices 3a-3c, by transmitting to these endpoint devices the interrogating signal, for receiving the reflected signals from the endpoint devices, to thereby recognize the endpoint devices ready for communication with the interrogator 2. Then, the control flow goes to step S1030 to determine whether the reflected signals transmitted from the endpoint devices 3a-3c in response to the interrogating signal contain the uplink request signals. If a negative decision (NO) is obtained in step S1030, the control flow goes back to step S1020 to search for the endpoint devices. If an affirmative decision (YES) is obtained in step S1030, the control flow goes to step S1040 in which the received reflected signals are stored in the controller 26.

Then, the control flow goes to step S1050 in which the communication-condition detecting portion 77A detects the above-described collision rate of the reflected signals received from the endpoint devices 3a-3c, and the available-band determining portion 78 determines whether the detected collision rate is equal to or higher than the first threshold value Th provided for broadening the available frequency band. If an affirmative decision (YES) is obtained in step S1050, the control flow goes to step S1060 to update the upper limit value Fmax of the available frequency band by adding a predetermined value df to the presently selected upper limit value Fmax. Further, the first and second threshold values Th and T1 used for broadening and narrowing the available frequency band are updated by adding the predetermined value df to the presently set threshold values Th and T1. If the presently selected upper limit value Fmax is equal to the maximum value f4, step S1060 is not implemented, and step S1050 is followed directly by step S1090 (described below).

If the above-indicated collision rate is not equal to or higher than the first threshold value Th, that is, if a negative decision (NO) is obtained in step S1050, the control flow goes to step S1070 to determine whether the detected collision rate is equal to or lower than the second threshold value T1 presently set for narrowing the available frequency band. If an affirmative decision (YES) is obtained in step S1070, the control flow goes to step S1080 to update the upper limit value Fmax of the available frequency band by subtracting the predetermined value df from the presently selected upper limit value Fmax. Further, the first and second threshold values Th and T1 used for broadening and narrowing the available frequency band are updated by subtracting the predetermined value df from the presently set threshold values Th and T1. If the presently selected upper limit value Fmax is equal to the minimum value f1, step S1080 is not implemented, and step S1070 is followed directly by step 1090 (described below). If a negative decision (NO) is obtained in step S1070, the control flow goes directly to step S1090.

In step S1090, the band-information transmitting portion 79 transmits to the endpoint devices 3a-3c the frequency band information indicative of the available frequency band determined by the available-band determining portion 78. Step S1090 is followed by step S1100 in which downlink data are transmitted to the endpoint devices from which the reflected signals have been received. The control flow then goes to step S1110 to determine whether the entire downlink data have been transmitted. If a negative decision (NO) is obtained in step S1110, the control flow goes back to step S1040 and repeat the steps S100-S1100 until the entire downlink data have been transmitted. When the entire downlink data have been transmitted, that is, if an affirmative decision (YES) is obtained in step S1110, the control flow goes back to step S1020 to search for the endpoint devices 3a-3c.

The fifth embodiment described above has substantially the same advantages as the fourth embodiment, and an additional advantage of increased efficiency of detection of the condition of communication with the endpoint devices, on the basis of the condition in which the reflected signals in the form of the subcarrier signals are demodulated by the subcarrier demodulator 22.

There will be described a sixth embodiment of the invention wherein the controller 26 of the interrogator 2 includes a modified communication-condition detecting portion 77B (not shown). Unlike the communication-condition detecting portions 77 and 77A provided in the fourth and fifth embodiments described above, the communication-condition detecting portion 77B is arranged to detect the condition of communication with the endpoint devices 3a-3c, on the basis of an error data amount, which is an amount of erroneous data contained in the reflected signals received from the endpoint devices 3a-3c. The erroneous data may include error correction codes and sum-check data contained in the information obtained by demodulation by the subcarrier demodulator 22.

Figure 21:
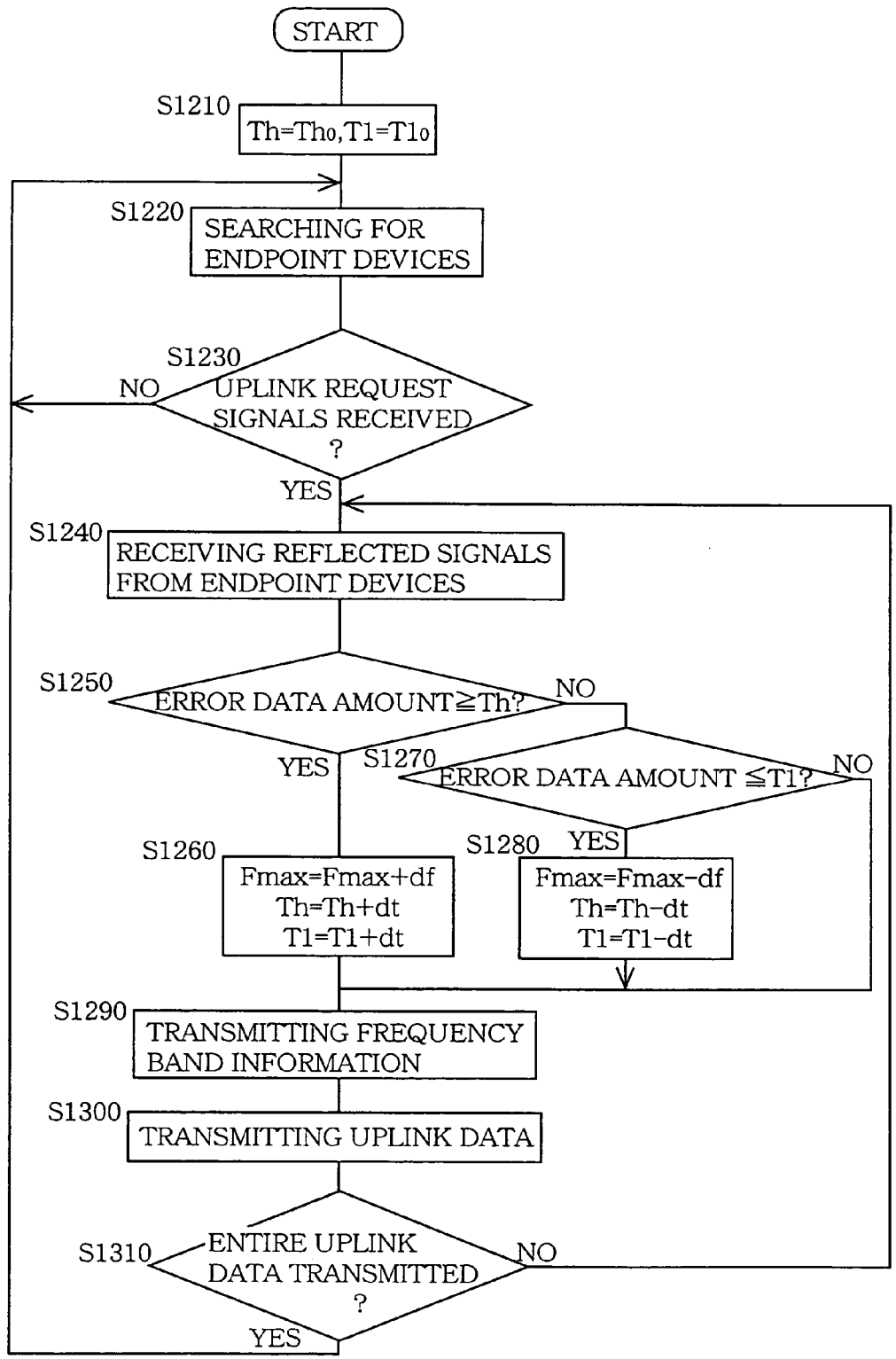
FIG. 21 is a flow chart illustrating a data communication routine executed by an interrogator in a sixth embodiment of the invention.

A data communication routine executed by the interrogator 2 including the modified communication-condition detecting portion 77B is illustrated in the flow chart of FIG. 21. This data communication routine is identical with the data communication routine of FIG. 20 in the fifth embodiment, except steps S1250 and S1270. Namely, steps S1210-S1240, S1260 and S1280-S1310 are identical with steps S1010-S1040, S1060 and S1180-S1110, respectively. In step S1250, the communication-condition detecting portion 77B detects the above-described error data amount of the reflected signals, and the available-band determining portion 78 determines whether the detected error data amount is equal to or larger than the first threshold value Th provided for broadening the available frequency band. If an affirmative decision (YES) is obtained in step S1250, the control flow goes to step S1260 to update the upper limit value Fmax of the available frequency band by adding a predetermined value df to the presently selected upper limit value Fmax. Further, the first and second threshold values Th and T1 used for broadening and narrowing the available frequency band are updated by adding the predetermined value df to the presently set threshold values Th and T1. If the presently selected upper limit value Fmax is equal to the maximum value f4, step S1260 is not implemented, and step S1250 is followed directly by step S1290.

If the above-indicated error data amount is not equal to or larger than the first threshold value Th, that is, if a negative decision (NO) is obtained in step S1250, the control flow goes to step S1270 to determine whether the detected error data amount is equal to or smaller than the second threshold value T1 presently set for narrowing the available frequency band. If an affirmative decision (YES) is obtained in step S1270, the control flow goes to step S1280 to update the upper limit value Fmax of the available frequency band by subtracting the predetermined value df from the presently selected upper limit value Fmax. Further, the first and second threshold values Th and T1 used for broadening and narrowing the available frequency band are updated by subtracting the predetermined value df from the presently set threshold values Th and T1. If the presently selected upper limit value Fmax is equal to the minimum value f1, step S1280 is not implemented, and step S1270 is followed directly by step 1290. If a negative decision (NO) is obtained in step S1270, the control flow goes directly to step S1290.

The sixth embodiment described above has substantially the same advantages as the fourth embodiment, and an additional advantage of increased accuracy of detection of the condition of communication with the endpoint devices, on the basis of the erroneous data contained in the reflected signals which have been modulated by the subcarrier demodulator 22 and which may include extraneous noises.

There will be described a seventh embodiment of the invention wherein the controller 26 of the interrogator 2 includes a modified communication-condition detecting portion 77C (not shown). Unlike the communication-condition detecting portions 77, 77A and 77B provided in the fourth, fifth and sixth embodiments described above, the communication-condition detecting portion 77C is arranged to detect the condition of communication with the endpoint devices 3a-3c, on the basis of counts Ne and Nt of first and second counters. The first counter is arranged to count the number Ne of consecutive occurrences of collision among the reflected signals received from the endpoint devices 3a-3c, while the second counter is arranged to count the number Nt of consecutive non-collisions of the reflected signals.

Figure 22:
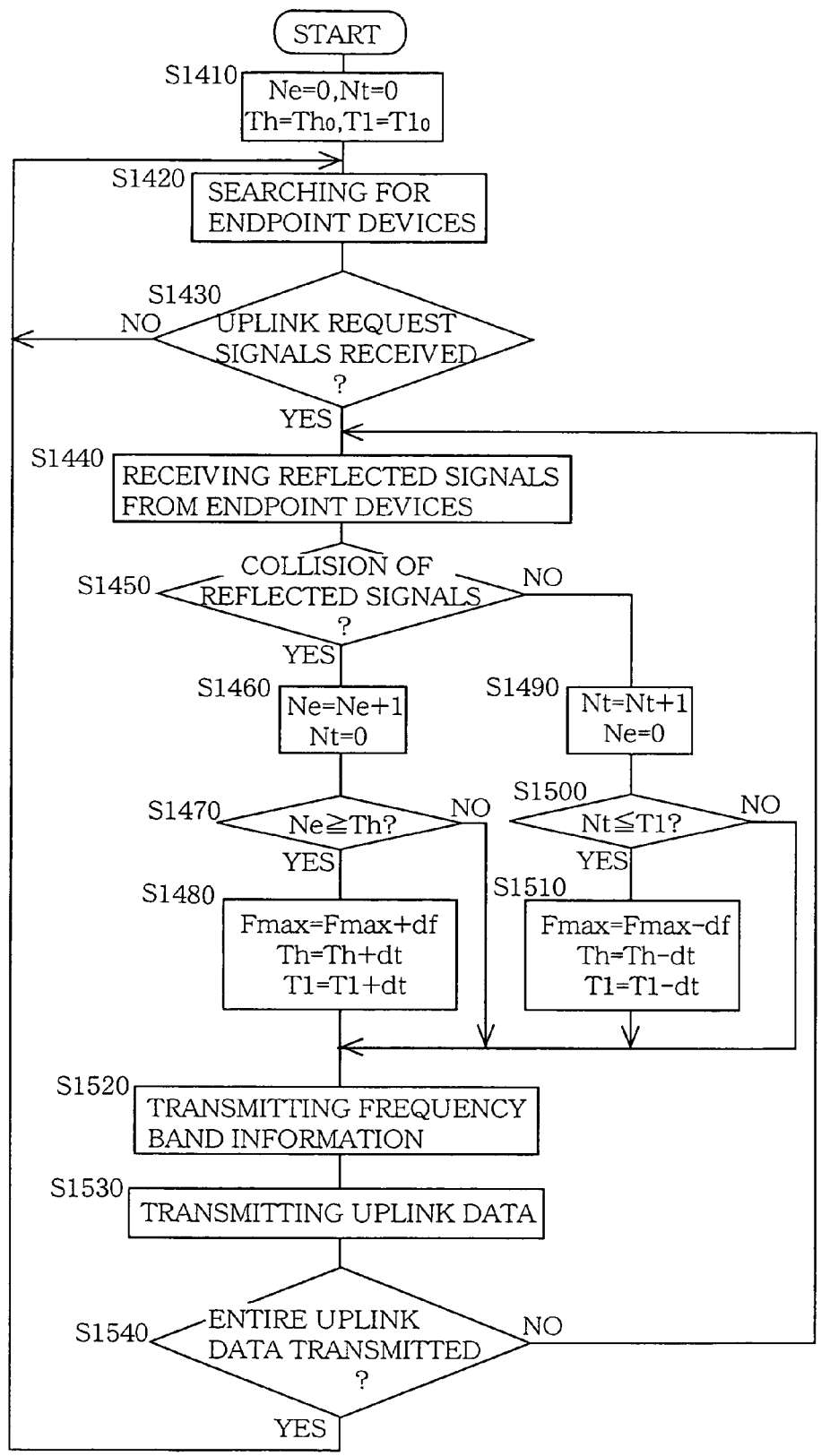
FIG. 22 is a flow chart illustrating a data communication routine executed by an interrogator in a seventh embodiment of the invention.

A data communication routine executed by the interrogator 2 including the modified communication-condition detecting portion 77C is illustrated in the flow chart of FIG. 22. This data communication routine is identical with the data communication routine of FIG. 20 in the fifth embodiment, except steps S1450-S1470, S1490 and S1500. Namely, steps S1410-S1440, S1480 and S1510-S1540 are identical with steps S1010-S1040, S1060 and S1080-S1110, respectively. In step S1450, the communication-condition detecting portion 77C determine whether a collision among the received reflected signals has occurred. If an affirmative decision (YES) is obtained in step S1450, the control flow goes to step S1460 in which the count Ne is incremented by one (1), and the count Nt is reset to zero (0).

Then, the control flow goes to step S1470 to determine whether the count Ne is equal to or larger than the first threshold value Th provided for broadening the available frequency band. If an affirmative decision (YES) is obtained in step S1470, the control flow goes to step S1480 to update the upper limit value Fmax of the available frequency band by adding a predetermined value df to the presently selected upper limit value Fmax. Further, the first and second threshold values Th and T1 used for broadening and narrowing the available frequency band are updated by adding the predetermined value df to the presently set threshold values Th and T1. If the presently selected upper limit value Fmax is equal to the maximum value f4, step S1480 is not implemented, and step S4470 is followed directly by step S1520.

If a collision among the reflected signals has not occurred, that is, if a negative decision is obtained in step S1450, the control flow goes to step S1490 in which the count Nt is incremented by one (1), and the count Ne is reset to zero (0).

Then, the control flow goes to step S1500 to determine whether the count Nt is equal to or smaller than the second threshold value T1 presently set for narrowing the available frequency band. If an affirmative decision (YES) is obtained in step S1500, the control flow goes to step S1510 to update the upper limit value Fmax of the available frequency band by subtracting the predetermined value df from the presently selected upper limit value Fmax. Further, the first and second threshold values Th and T1 used for broadening and narrowing the available frequency band are updated by subtracting the predetermined value df from the presently set threshold values Th and T1. If the presently selected upper limit value Fmax is equal to the minimum value f1, step S1510 is not implemented, and step S1500 is followed directly by step S520. If a negative decision (NO) is obtained in step S1500, the control flow goes directly to step S1520.

The seventh embodiment described above has substantially the same advantages as the fourth embodiment, and an additional advantage of increased stability and accuracy of detection of the condition of communication with the endpoint devices, on the basis of the collisions among the received reflected signal, which have actually occurred during successive cycles of data communication of the interrogator 2 with the endpoint devices 3*a*-3*c*.

While the fourth through seventh embodiments of this invention have been described with certain particularity, these embodiments may be modified as needed. In the illustrated fourth through seventh embodiments, the frequency band of the subcarrier signal available for each endpoint device 3*a*-3*c* is determined by comparing the detected condition of communication of the interrogator 2 with the endpoint devices 3*a*-3*c*, with the predetermined first and second threshold values. Th and T1, the available subcarrier signal frequency may be continuously changed depending upon the detected condition of communication of the interrogator 2 with the endpoint devices 3*a*-3*c*.

Although the illustrated fourth through seventh embodiments are arranged to update the first and second threshold values Th and T1 on the basis of the detected condition of communication of the interrogator 2 with the endpoint devices 3*a*-3*c*, the threshold values Th and T1 may be updated otherwise, namely, may be changed on the basis of other factors.

While the initial value of the upper limit of the available frequency band of the subcarrier signals is set to be the maximum value (f4), the initial value may be set otherwise, for instance, may be set to be the minimum value (f1). This modification results in the use of the subcarrier signals having relatively low frequencies, leading to a further reduction in the amount of consumption of electric energy by the endpoint devices 3*a*-3*c*.

The illustrated fourth through seventh embodiments are arranged such that the frequency of the subcarrier signal used by each endpoint device is determined by quasi-random frequency hopping within the determined available frequency band. However, the frequency of the subcarrier signal may be, determined otherwise within the determined available frequency band. For example, the frequency of the subcarrier signal may be determined in a predetermined pattern within the determined available frequency band.

Referring next to FIGS. 23-31, there will be described a communication system constructed according to an eighth embodiment of the present invention, which is different from the communication system according to the fourth embodiments of FIGS. 14 and 15, in that the interrogator 2 includes a controller 80 which incorporates an overall-frequency-utilization-ratio determining portion 82 and a switching-information generating portion 84, and in that each endpoint device 3*a*-3*c* (endpoint device 3*a* shown in FIG. 24 by way of example) includes a digital circuit portion 88 having a controller 90 which incorporates a power-source-information detecting portion 92 and an individual-frequency-utilization-ratio setting portion 94. The power-source-information detecting portion 92 is electrically connected to a power source device 86.

The overall-frequency-utilization-ratio determining portion 82 of the controller 80 of the interrogator 2 is arranged to determine a distribution of an overall utilization ratio of the frequency of the subcarrier signals of all of the three endpoint devices 3*a*-3*c*, by determining an overall ratio of utilization of each of different frequency channels (frequency bands) within an entire frequency range of the subcarrier signal available for the three endpoint devices 3*a*-3*c*. The overall ratio of utilization of each frequency channel of the subcarrier signal is a ratio of that frequency channel of the reflected signals in the form of the subcarrier signals which have been received by the interrogator 2 in the past operation of the communication system.

The switching-information generating portion 84 of the controller 80 is arranged to generate switching information for changing a distribution of an individual utilization ratio of frequency of the subcarrier signal for at least one of the endpoint devices 3*a*-3*c*, on the basis of the distribution of the overall utilization ratio of frequency of the subcarrier signals. The generated switching information is contained in the interrogating signal to be transmitted to each endpoint device 3*a*-3*c*. The switching information consists of endpoint-device information indicative of the endpoint device whose individual frequency utilization ratio is to be changed, and a shifting command indicative of a change of the distribution of the individual frequency utilization ratio of that endpoint device. Described more specifically; the endpoint-device information is supply-voltage information indicative of a predetermined range of a supply voltage, so that at least one of the endpoint devices 3a-3c which has a supply voltage within this supply voltage range is identified by the endpoint-device information. The shifting command is either a shift-up command for raising the hopping frequency of the subcarrier signal to a high frequency channel (band), or a shift-down command for lowering the hopping frequency to a lower frequency channel (band).

When the overall-frequency-utilization-ratio determining portion 82 determines that the overall utilization ratio of the relatively low frequency channels or bands of the subcarrier signal is higher than a predetermined first threshold, the switching-information generating portion 84 generates the switching information consisting of the endpoint-device information indicative of a predetermined supply voltage range and the shift-up command. When the overall-frequency-utilization-ratio determining portion 82 determines that the overall utilization ratio of the relatively low frequency channels is lower than a predetermined second threshold, the switching-information generating portion 84 generates the switching information consisting of the endpoint-device information indicative of a predetermined supply voltage range which covers the supply voltages of all of the endpoint devices 3a-3c, for example, and the shift-down command.

If the overall-frequency-utilization-ratio determining portion 82 determines that the overall utilization ratio of the relatively low frequency channels is higher than the first threshold value, even after the shift-up command is generated, the switching-information generating portion 84 generates the switching information consisting of the endpoint-device information in the form of the supply-voltage information indicative of a predetermined broader supply voltage range covering the supply voltages of an increased number of the endpoint devices 3a-3c, and the shift-up command. If the utilization-ratio determining portion 82 determines that the utilization ratio of the relatively low frequency channels is lower than the second threshold, even after the shift-down command is generated, the switching-information generating portion 84 generates the switching information consisting of the endpoint-device information in the form of the supply-voltage information indicative of a broader supply voltage range covering the supply voltages of an increased number of the endpoint devices 3a-3c.

The endpoint device 3a will be described by way of example. The power source device 86 is provided to energize the endpoint device 3a, and is constituted by a primary or secondary battery cell, or a circuit for rectifying and smoothing the received interrogating signal for obtaining an electric energy. The operating state of the power source device 86 is monitored by the power-source-information detecting portion 92 of the controller 90 of the digital circuit portion 86, as described below.

The power-source-information detecting portion 92 is arranged to monitor the operating state of the power source device 86, and transmit to the occupying-ratio setting portion 94 power source information indicative of the monitored operating state of the power source device 86. The power source information includes information indicative of the supply voltage and other specifications (indicative of the use of a primary or secondary battery cell, etc.) of the power source device 86.

The individual-frequency-utilization-ratio setting portion 94 is arranged to set the distribution of the individual frequency utilization ratio of the subcarrier signal for each of the endpoint devices 3a-3c, on the basis of the power source information received from the power-source-information detecting portion 92, and the switching information received from the switching-information generating portion 84 of the interrogator 2. The individual-frequency-utilization-ratio setting portion 94 includes a memory for storing data indicative of the set individual-frequency-utilization-ratio distribution. The term "individual frequency utilization ratio" is a ratio of a time period during which each frequency channel is used as the hopping frequency of the subcarrier signal of the endpoint device in question. For example, the individual-frequency-utilization-ratio setting portion 94 is arranged to set the distribution of the individual frequency utilization ratio by selecting one of two individual-frequency-utilization-ratio distribution patterns Pt1 and Pt2 (shown in FIG. 25) within the entire frequency range of the subcarrier signals. The individual-frequency-utilization-ratio setting portion 94 may use three or more individual-frequency-utilization-ratio distribution patterns.

The individual-frequency-utilization-ratio distribution patterns Pt1 and Pt2 will be described by reference to the graph of FIG. 25. In the graph, the individual frequency utilization ratio is taken along the ordinate, while the frequency of the subcarrier signal is taken along the abscissa. In the distribution patterns Pt1 and Pt2, the individual frequency utilization ratio continuously changes with a change in the frequency. In the distribution pattern Pt1, the individual frequency utilization ratio is relatively high in the relatively low frequency channels (bands). In the distribution pattern Pt2, on the other hand, the individual frequency utilization ratio is relatively high in the relatively high frequency channels (bands). In a normal operation of the endpoint device 3a-3c, the first individual-frequency-utilization-ratio distribution pattern Pt1 is selected by the individual-frequency-utilization-ratio setting portion 94, for reducing the amount of consumption of electric energy by the endpoint device. When the supply voltage of the power source device 86 detected by the power-source-information detecting portion 92 is lower than a nominal value, too, the first distribution pattern Pt1 is selected by the individual-frequency-utilization-ratio setting portion 94.

When the switching information received by the endpoint device 3a from the interrogator 2 includes the shift-up command, for example, the individual-frequency-utilization-ratio setting portion 94 changes the individual-frequency-utilization-ratio distribution pattern from Pt1 to Pt2. When the received switching information includes the shift-down command, on the other hand, the individual-frequency-utilization-ratio setting portion 94 changes the individual-frequency-utilization-ratio pattern from Pt2 to Pt1. Although the individual-frequency-utilization-ratio distribution patterns Pt1 and Pt2 are triangular patterns of distribution of the individual frequency utilization ratio, as indicated in FIG. 25, the individual-frequency-utilization-ratio setting portion 94 may use individual-frequency-utilization-ratio distribution patterns of any other configuration, such as normal distribution patterns, and asymmetric distribution patterns. Further, the individual-frequency-utilization-ratio setting portion 94 may use a plurality of individual-frequency-utilization-ratio distribution patterns which do not overlap each other.

The frequency determining portion 47 of the controller 90 is arranged to determine the frequency of the subcarrier signal used for the reflected signal, by frequency hopping according to the individual-frequency-utilization-ratio distribution pattern Pt1 or Pt2 selected by the individual-frequency-utilization-ratio setting portion 94. The subcarrier oscillator 45 generates the subcarrier signal having the frequency determined by the frequency determining portion 47.

Figure 25:
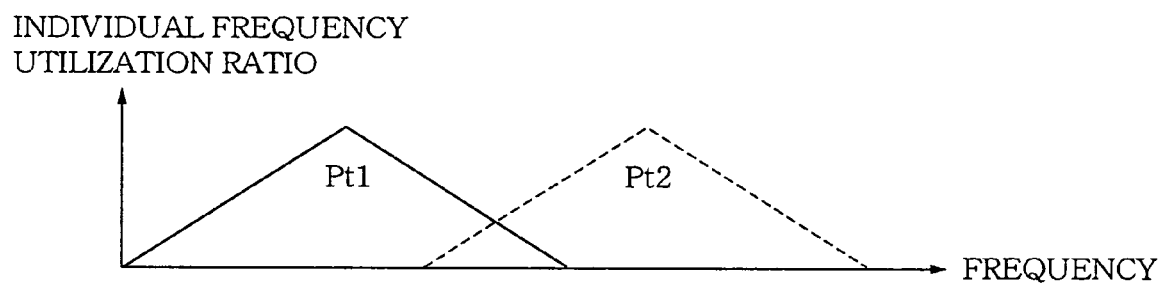
FIG. 25 is a graph indicating individual-frequency-utilization-ratio distribution patterns of the endpoint devices.
Figure 26A:
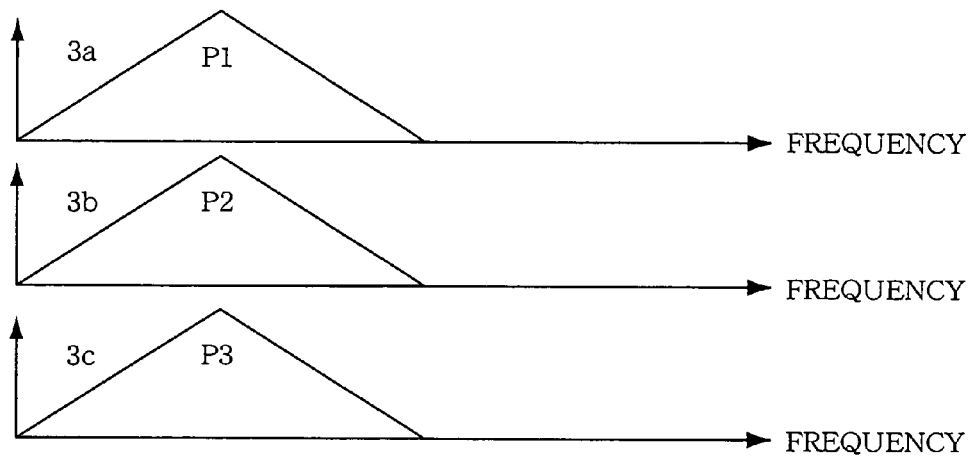
FIG. 26A is a graph indicating individual-frequency-utilization-ratio distribution patterns of subcarrier signals of the endpoint devices before transmission of switching information to the endpoint devices.
Figure 26B:
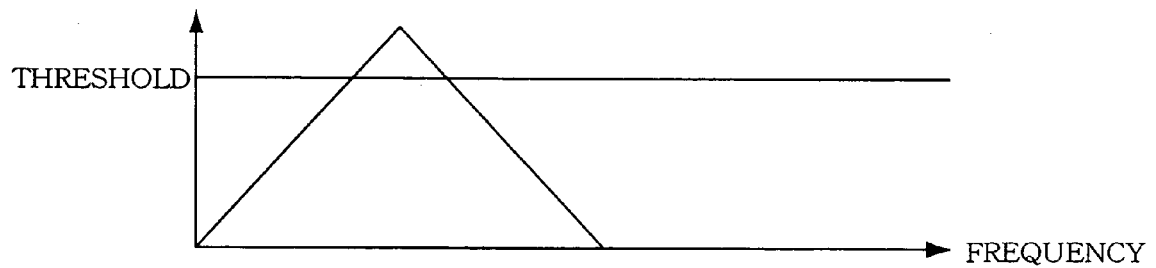
FIG. 26B is a graph indicating an overall-frequency-utilization-ratio distribution pattern of the subcarrier signals determined by the interrogator before transmission of the switching information.
Figure 27A:
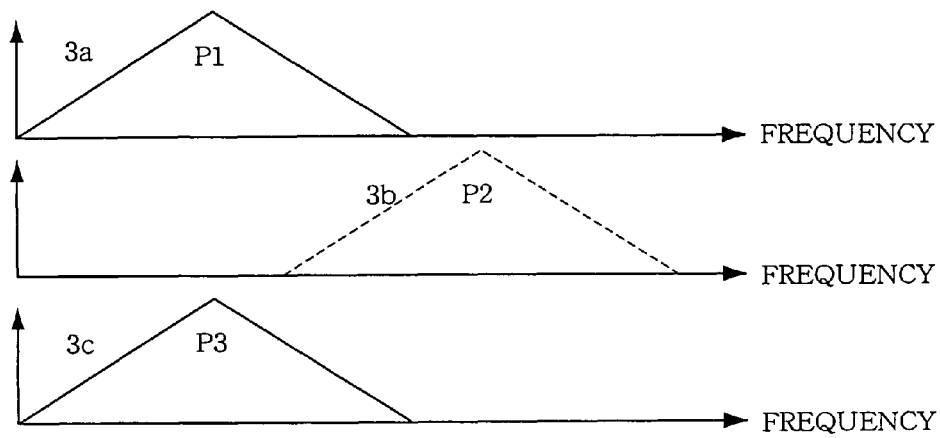
FIG. 27A is a graph indicating individual-frequency-utilization-ratio distribution patterns of subcarrier signals of the endpoint devices after transmission of the switching information to the endpoint devices.
Figure 27B:
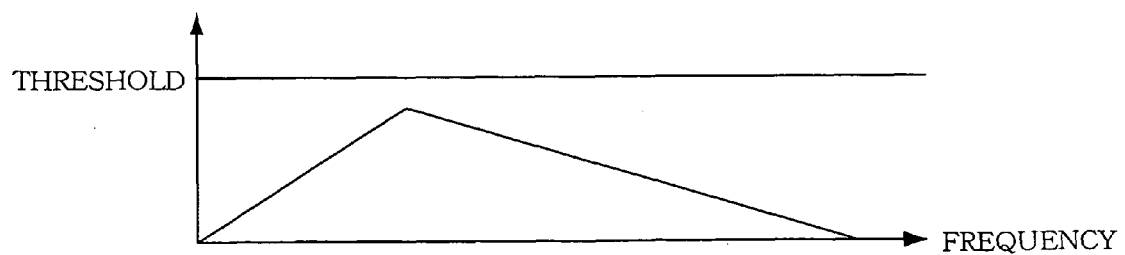
FIG. 27B is a graph indicating an overall-frequency-utilization-ratio distribution pattern of the subcarrier signals detected by the interrogator after transmission of the switching information.

Referring to FIG. 26A, there is shown examples of individual-frequency-utilization-ratio distribution patterns P1, P2 and P3 of the subcarrier signals used by the respective endpoint devices 3a, 3b and 3c before the switching information is transmitted from the interrogator 2 to the endpoint devices 3a-3c. FIG. 26B shows an example of an overall-frequency-utilization-ratio distribution pattern of the subcarrier signal determined by the overall-frequency-utilization-ratio determining portion 82 of the interrogator 2 before the transmission of the switching information to the endpoint devices 3a-3c. FIG. 27A shows examples of the individual-frequency-utilization-ratio distribution patterns P1, P2 and P3 of the respective endpoint devices 3a-3c after the switching information is transmitted to the endpoint devices 3a-3c, while FIG. 27B shows an example of the overall-frequency-utilization-ratio distribution pattern of the subcarrier signal determined by the overall-frequency-utilization-ratio determining portion 82 after the transmission of the switching information to the endpoint devices 3a-3c. In the examples of FIGS. 25A and 26A, the individual-frequency-occupying-ratio distribution patterns P1-P3 are triangular distribution patterns in which the individual frequency utilization ratio continuously changes with a change in the frequency of the subcarrier signals.

In the examples of FIG. 26A, the first individual-frequency-utilization-ratio distribution pattern Pt1 is initially selected by the individual-frequency-utilization-ratio setting portion 94, as the distribution patterns P1, P2 and P3 of all of the three endpoint devices 3a-3c, for the purpose of minimizing the amount of consumption of electric energy by the endpoint devices 3a-3c. In this state, therefore, the overall distribution pattern of the individual frequency utilization ratio of the subcarrier signals is a sum of the individual-frequency-utilization-ratio distribution patterns P1-P3, as shown in FIG. 26B.

The overall-frequency-utilization-ratio determining portion 82 of the interrogator 2 uses the first and second threshold values for the individual frequency utilization ratio of the subcarrier signal, as described above and as indicated in FIGS. 26B and 27B. When the individual-frequency-utilization-ratio determining portion 82 determines that the determined highest overall frequency utilization ratio is higher than the first threshold value, as indicated in FIG. 26B, the switching-information generating portion 84 generates the switching information including the shift-up command, for preventing a collision among the reflected signals transmitted from the endpoint devices 3a-3c. The generated switching information is transmitted to selected at least one of the endpoint devices 3a-3c, as part of the interrogating signal. In the examples of FIGS. 27A and 27B, the switching information including the shift-up command is transmitted to only the endpoint device 3b. As a result, the individual-frequency-utilization-ratio setting portion 94 of the endpoint device 3b selects the second individual-frequency-utilization-ratio distribution pattern Pt2 as its frequency-utilization-ratio distribution pattern P2, as indicated in FIG. 27A, and the individual-frequency-utilization-ratio determining portion 82 of the interrogator 2 detects the overall-frequency-utilization-ratio distribution pattern as indicated in FIG. 27B, which is a sum of the first distribution patterns Pt1 (P1 and P3) and the second distribution pattern Pt2 (P2). This overall-frequency-utilization-ratio distribution pattern of FIG. 27B covers also relative high frequency channels (bands), and has a peak which is smaller than the second threshold value.

Figure 28:
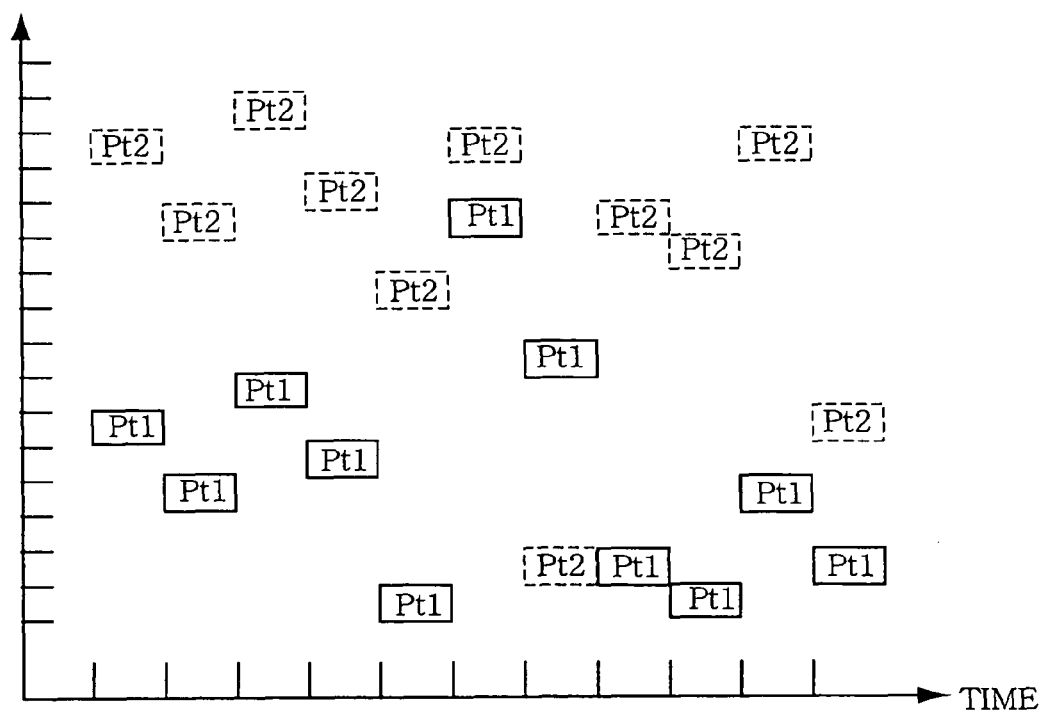
FIG. 28 is a graph indicating a frequency distribution of the subcarrier signals in relation to time, where two different individual-frequency-utilization-ratio distribution patterns are combined together.

Thus, the individual-frequency-utilization-ratio setting portion 94 is operable to set the distributions of the individual frequency utilization ratio of the endpoint devices 3a-3c, by a suitable combination of the first and second distribution patterns Pt1 and Pt2 as the individual-frequency-utilization-ratio distribution patterns P1, P2 and P3 of the three endpoint devices 3a-3c, so that the overall frequency utilization ratio of the subcarrier signals can be distributed over a relatively wide frequency range, as indicated in FIG. 27B. FIG. 28 shows an example of a frequency distribution of the subcarrier signals in relation to time where the first and second individual-frequency-utilization-ratio distribution patterns Pt1 and Pt2 are combined together. In the graph of FIG. 28, the time frames are taken along the abscissa while the frequency is taken along the ordinate. Each of the time frames is long enough for each endpoint device 3a-3c to complete the transmission of a reflected signal to the interrogator 2. One division of the graduation along the ordinate corresponds to one frequency channel (band). The endpoint device 3a-3c for which the first pattern Pt1 is set is controlled to be operated so as to relatively frequently transmit the reflected signals having relatively low frequencies, while the endpoint device 3a-3c for which the second pattern Pt2 is set is controlled to be operated so as to relatively frequently transmit the reflected signals having relatively high frequencies. Therefore, a suitable combination of the first and second distribution patterns Pt1, Pt2 as the individual-frequency-utilization-ratio distribution patterns P1-P3 for the three endpoint devices 3a-3c makes it possible to avoid a collision among the reflected signals transmitted by the three endpoint devices 3a-3c.

Figure 23:
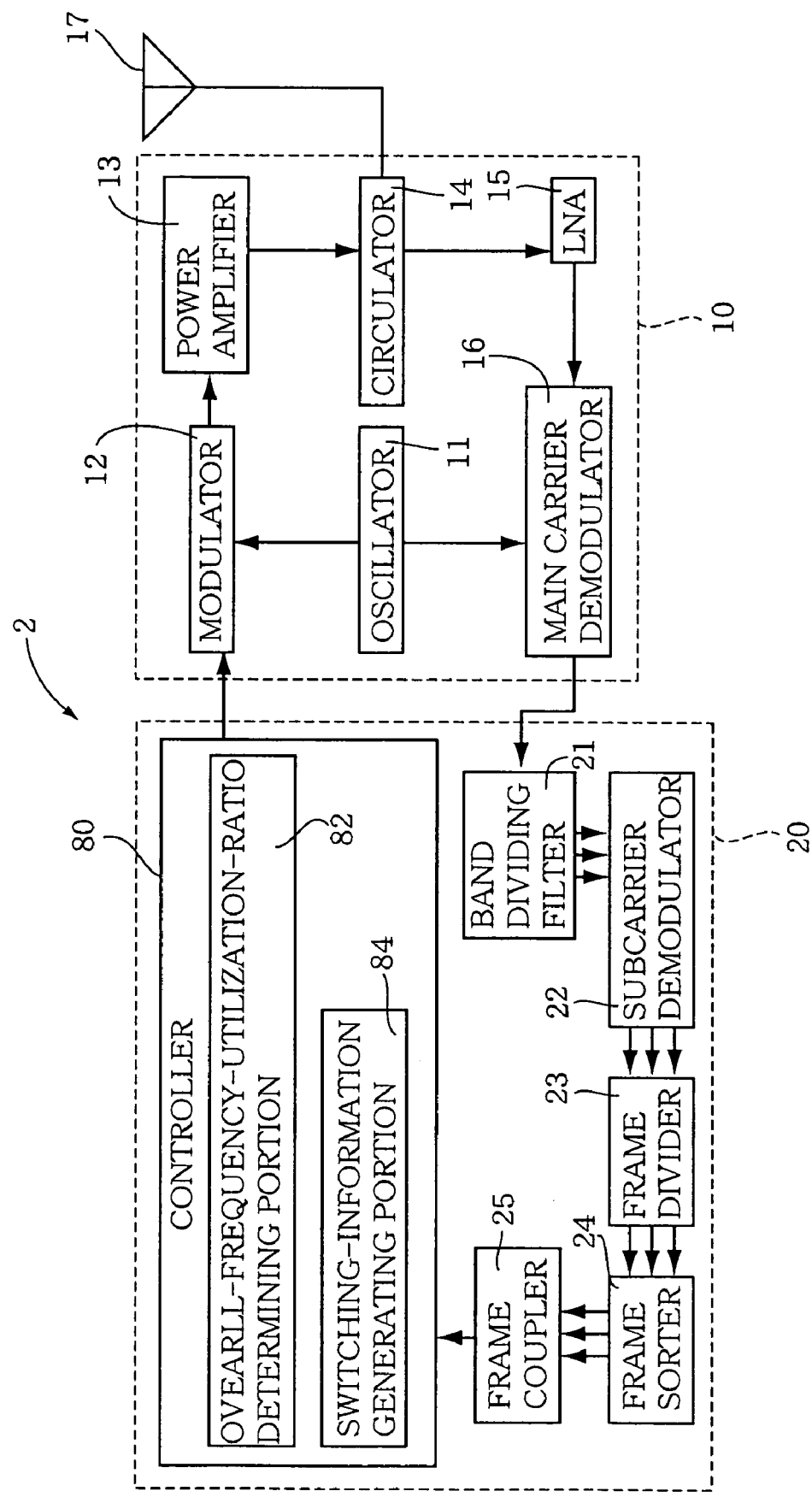
FIG. 23 is a block diagram showing an arrangement of an interrogator in an eighth embodiment of the invention.
Figure 24:
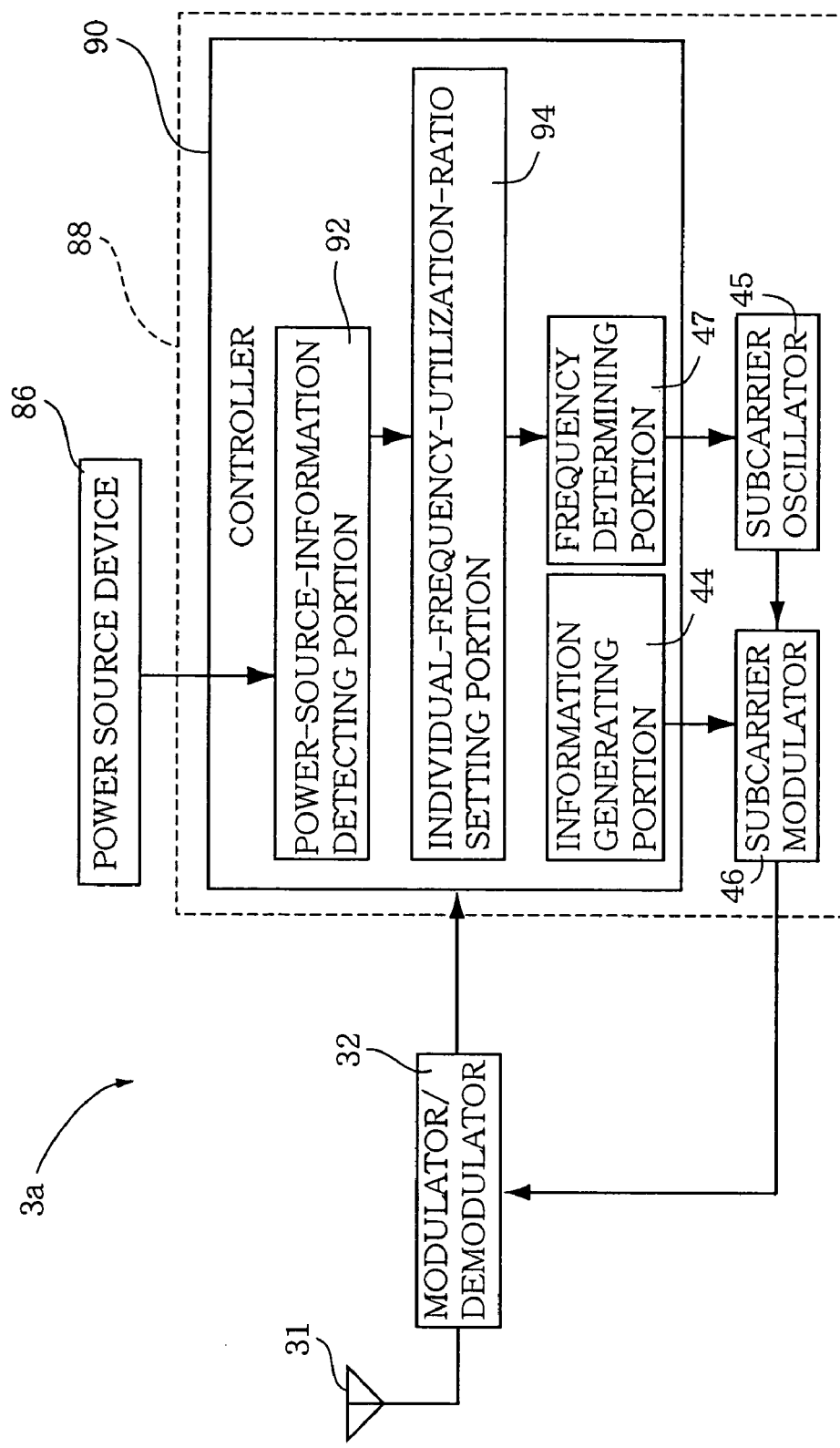
FIG. 24 is a block diagram showing an arrangement of each endpoint device in the eighth embodiment.
Figure 29:
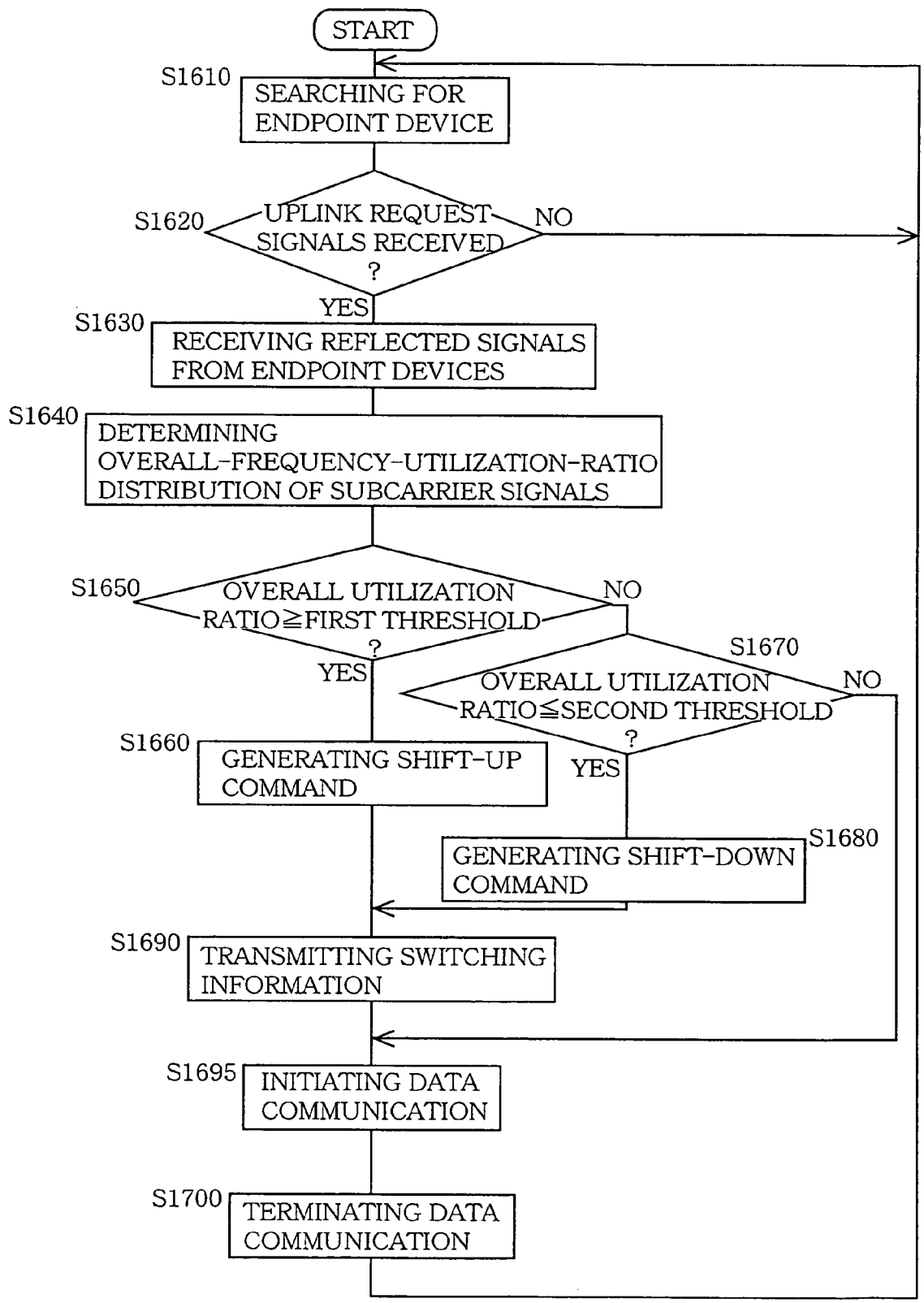
FIG. 29 is a flow chart illustrating a data communication routine executed by the interrogator in the eighth embodiment.

Referring next to the flow chart of FIG. 29, there will described a data communication routine executed by the interrogator 2 in the communication system of the eighth embodiment of FIGS. 23 and 24. This data communication routine is initiated with step S1610 to search for the endpoint devices 3a-3c, namely, to transmit the interrogating signal to the endpoint devices 3a-3c, for receiving the reflected signal or signals from some of the endpoint devices 3a-3c in response to the interrogating signal, in order to recognize those endpoint devices with which the interrogator 2 is communicable. When the interrogator 2 has any downlink data to be transmitted to any one of the endpoint devices 3a-3c, this endpoint device is identified by identification data contained in the interrogating signal to be transmitted to the endpoint device in question. Step S1610 is followed by step S1620 to determine whether an uplink request signal requesting data communication with the interrogator 2 is contained in the received reflected signal or signals. If a negative decision (NO) is obtained in step S1620, the control flow goes back to step S1610 to repeat the search for the endpoint devices 3a-3c. If the uplink request signal is contained in the reflected signal or signals, that is, if an affirmative decision (YES) is obtained in step S1620, the control flow goes to step S1630 in which the received reflected signals are stored in the controller 26.

Then, the control flow goes to step S1640 in which the overall-frequency-utilization-ratio determining portion 82 determines the overall frequency-utilization ratio of the subcarrier signals in the relatively low frequency channels or bands. Step S1640 is followed by step S1650 in which the overall-frequency-utilization-ratio determining portion 82 determines whether the peak of the determined utilization ratio is equal to or higher than the predetermined first threshold value. If the peak is equal to or lager than the first threshold value, that is, if an affirmative decision (YES) is obtained in step S1650, the control flow goes to step S1660 in which the switching-information generating portion 84 generates the switching information consisting of the endpoint-device information indicative of the supply voltage range covering the supply voltage or voltages of the appropriate endpoint device or devices 3a-3c, and the shift-up command. Step S1660 is followed by step S1690, which will be described. If the peak of the determined overall frequency utilization ratio is not equal to or larger than the first threshold value, that is, if a negative decision (NO) is obtained in step S1650, the control flow goes to step S1670 in which the overall-frequency-utilization-ratio determining portion 82 determines whether the peak of the determined overall frequency utilization ratio of the subcarrier signals in the relatively low frequency channels is equal to or smaller than the second threshold value. This second threshold value is smaller than the first threshold value indicated above. If a negative decision (NO) is obtained in step S1670, the control flow goes directly to step S1690. If an affirmative decision (YES) is obtained in step S1670, the control flow goes to step S1680 in which the switching-information generating portion 84 generates the switching information consisting of the endpoint-device information indicative of the supply voltage range covering the supply voltage or voltages of the appropriate endpoint device or devices 3a-3c, and the shift-down command. Step S1680 is followed by step S1690.

In step S1690, the interrogating signal containing the switching information generated by the switching-information generating portion 84 is transmitted from the interrogator 2 to the endpoint devices 3a-3c. Step S1690 is followed by step S1695 in which data communication between the interrogator 2 and the endpoint devices 3a-3c is effected. When entire downlink data have been transmitted to the endpoint devices 3a-3c, the control flow then goes to step S1700 to terminate the data communication.

Figure 30:
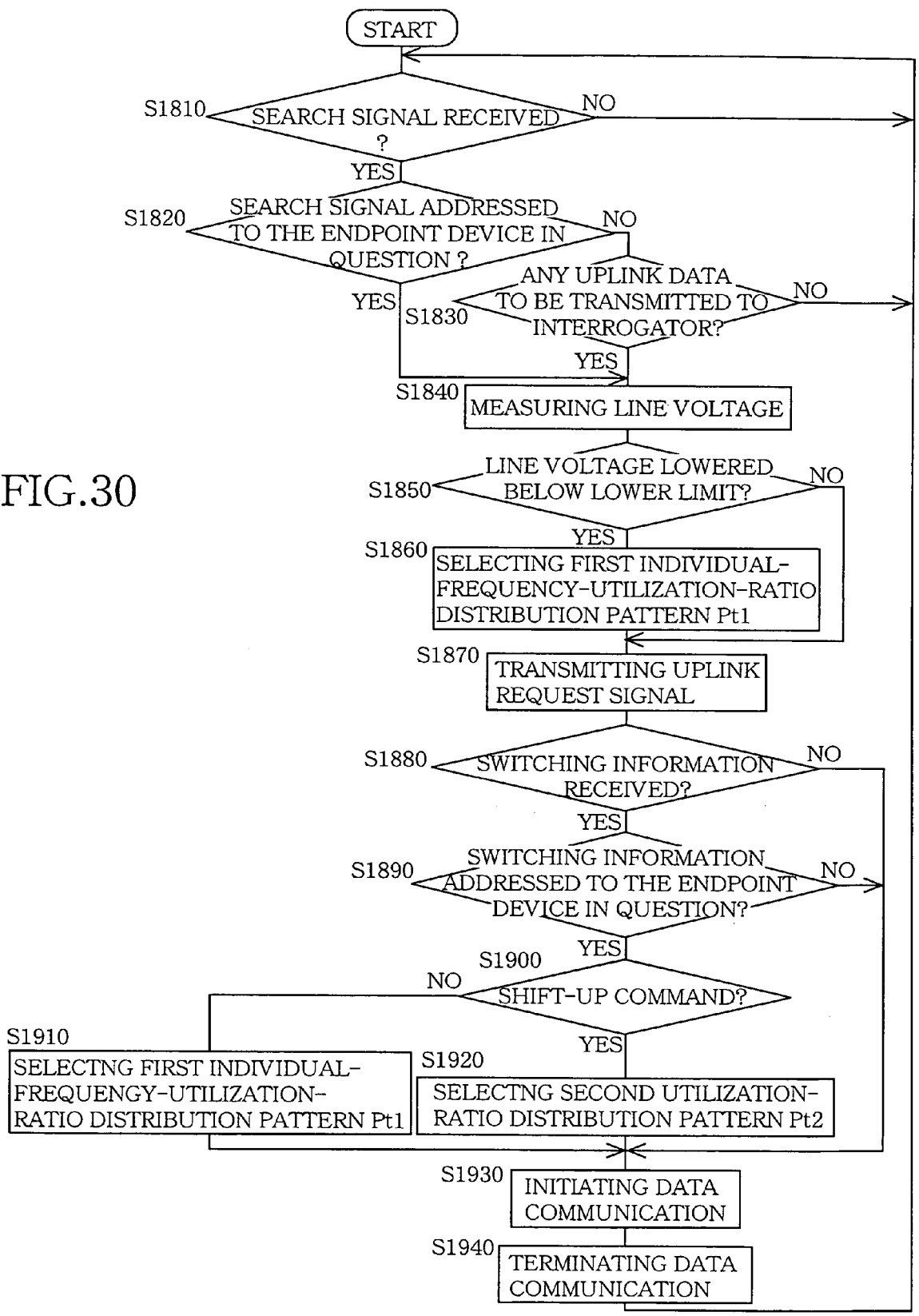
FIG. 30 is a flow chart illustrating a data communication routine executed by each endpoint device in the eighth embodiment.

Referring to the flow chart of FIG. 30, there will be described a data communication routine executed by each of the endpoint devices 3a-3c. This data communication routine is initiated with step S1810 to determine whether the interrogating signal has been received from the interrogator 2. If a negative decision (NO) is obtained in step S1810, this step S1810 is repeatedly implemented until the interrogating signal has been received. If an affirmative decision (YES) is obtained in step S1810, the control flow goes to step S1820 to determine whether the received interrogating signal is addressed to the endpoint device in question. If an affirmative decision (YES) is obtained in step S1820, the control flow goes to step S1840. If a negative decision (NO) is obtained in step S1820, the control flow goes to step S1830 to determine whether there are any uplink data to be transmitted to the interrogator 2. If an affirmative decision (YES) is obtained in step S1830, the control flow goes to step S1840. If a negative decision (NO) is obtained in step S1830, the control flow goes back to step S1810 and repeat the steps S1810-S1830, until the affirmative decision is obtained in step S1820 or S1830.

In step S1840, the power-source-information detecting portion 92 measures the supply voltage of the power source device 86. Then, the control flow goes to step S1850 to determine whether the supply voltage detected by the power-source-information detecting portion 92 is lower than a predetermined threshold value. If a negative decision (NO) is obtained in step S1850, the control flow goes to step S1870, which will be described. If an affirmative decision (YES) is obtained in step S1850, the control flow goes to step S1860 in which the individual-frequency-utilization-ratio setting portion 94 selects the first individual-frequency-utilization-ratio distribution pattern Pt1 for the distribution pattern P1 for the endpoint device in question. Namely, the setting portion 94 lowers the center frequency of the individual-frequency-utilization-ratio distribution pattern. The control flow then goes to step S1870.

In step S1870, the endpoint device in question transmits to the interrogator 2 the reflected information containing the uplink request signal. Step S1870 is followed by step S1880 to determine whether the received interrogating signal contains the switching information generated by the switching-information generating portion 84. If a negative decision (NO) is obtained in step S1880, the control flow goes to step S1930, which will be described. If an affirmative decision (YES) is obtained in step S1880, the control flow goes to step S1890 to determine whether the switching information identifies the endpoint device in question. If an affirmative decision (YES) is obtained in step S1890, the control flow goes to step S1900 to determine whether the switching information includes the shift-up command. If a negative decision (NO) is obtained in step S1900, the control flow goes to step S1910 in which the individual-frequency-utilization-ratio setting portion 94 selects the first individual-frequency-utilization-ratio distribution pattern Pt1 for the endpoint device in question. If an affirmative decision (YES) is obtained in step S1900, the control flow goes to step S1920 in which the setting portion 94 selects the second individual-frequency-utilization-ratio distribution pattern Pt2 for the endpoint device in question. Then, the control flow goes to step S1930.

In step S1930, data communication with the interrogator 2 is initiated. Step S1930 is followed by step S1940 in which the data communication is terminated upon completion of transmission of the entire uplink data. Then, the control flow goes back to step S1810 to repeat the determination as to whether the interrogating signal has been received from the interrogator 2.

Figure 31:
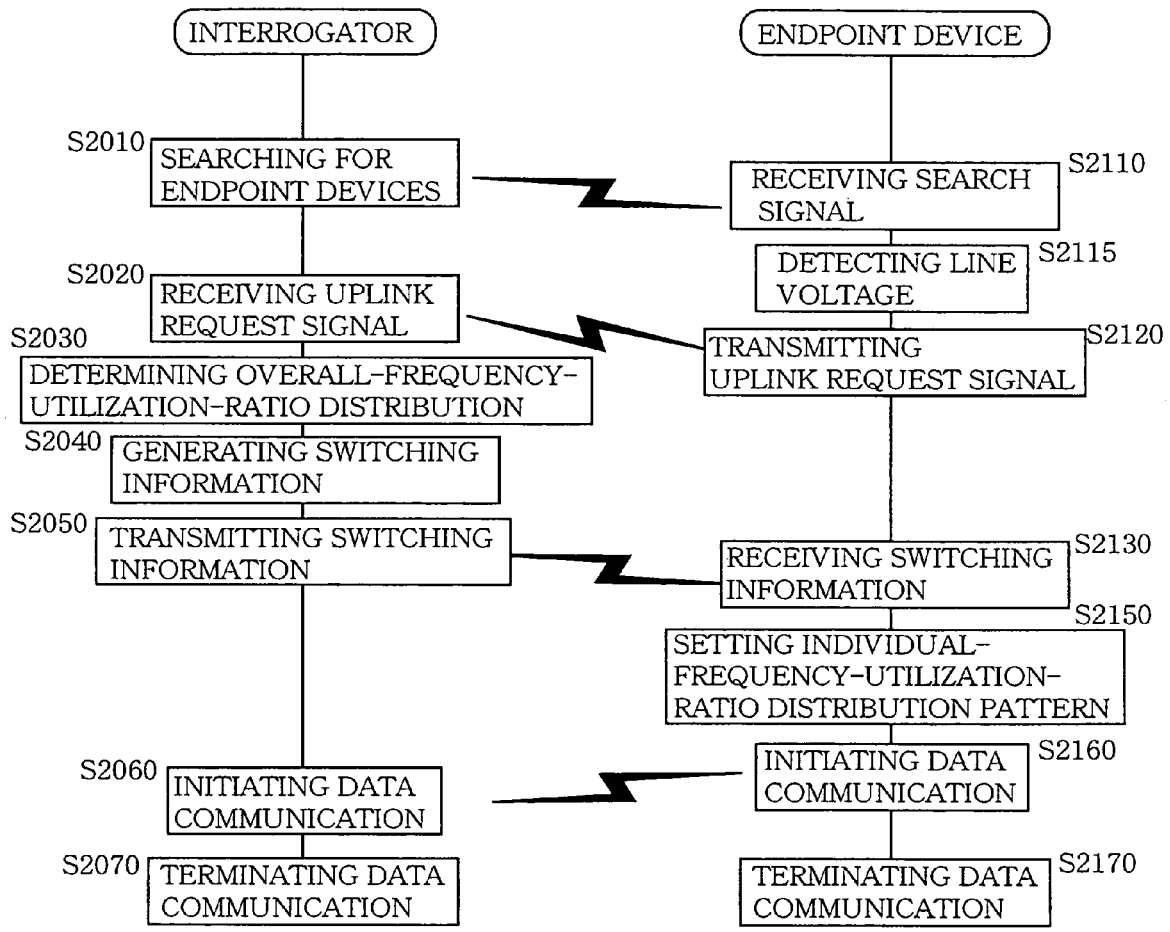
FIG. 31 is a flow chart illustrating a sequence of the data communication performed by the communication system of the eighth embodiment.

Referring further to the flow chart of FIG. 31, there will be described a sequence of the data communication between the interrogator 2 and each endpoint device 3a, by way of example. The following description applies to the endpoint devices 3b and 3c. The sequence is initiated with step S1010 in which the interrogator 2 implements a search for the endpoint device 3a, by transmitting the interrogating signal to the endpoint device 3a. The transmitted interrogating signal is received by the endpoint device 3a in step S2110. Step S2110 is followed by step S2115 in which the power-source-information detecting portion 92 detects the supply voltage of the power source device 86. If the detected supply voltage is lower than the predetermined threshold value, the individual-frequency-utilization-ratio setting portion 94 selects the first individual-frequency-utilization-ratio distribution pattern Pt1. Step S2115 is followed by step S2120 in which the endpoint device 3a transmits the uplink request signal to the interrogator 2, in response to the received interrogating signal, if the interrogating signal includes the downlink request signal addressed to the endpoint device 3a, or if there are any uplink data to be transmitted to the interrogator. In step S2020, the interrogator 2 receives the transmitted uplink request signal. Step S2020 is followed by step S2030 in which the overall-frequency-utilization-ratio determining portion 82 determines the distribution of the overall frequency utilization ratio of the subcarrier signals in the form of the reflected signals received from the endpoint device 3a. Then, in step S2040, the switching-information generating portion 84 generates the switching information on the basis of the overall-frequency-utilization-ratio distribution detected by the determining portion 82. Step S2040 is followed by step S2050 in which the interrogator 2 transmits to the endpoint device 3a the interrogating signal containing the generated switching information.

In step S3130, the endpoint device 3a receives the interrogating signal which contains the switching information and which has been transmitted from the interrogator 2. Step S2130 is followed by step S2150 in which the individual-frequency-utilization-ratio setting portion 94 sets the individual-frequency-utilization distribution pattern P1, on the basis of the supply voltage detected in step S2115 and the overall-frequency-utilization-ratio distribution determined by the overall-frequency-utilization-ratio determining portion 82. Then, in step S2160, the endpoint device 3a initiates the data communication with the interrogator 2. Step S2160 is followed by step S2170 to terminate the data communication when the entire uplink data have been transmitted to the interrogator 2. In the interrogator 2, the data communication is initiated in step S2060, and is terminated in step S2070 when the entire uplink data have been received from the endpoint device 3a.

In the communication system constructed to the eighth embodiment of this invention which has been described above by reference to FIGS. 23-31, the overall-frequency-utilization-ratio determining portion 82 of the controller 80 of the interrogator 2 directly determines the distribution of the overall frequency utilization ratio of the subcarrier signals used as the reflected signals, and the switching-information generating portion 84 generates the switching information which permits the individual-frequency-utilization-ratio setting portion 94 of each endpoint device 3a-3c to adjust its individual-frequency-utilization-ratio distribution pattern P1-P3, by selecting the appropriate one of the predetermined two individual-frequency-utilization-ratio distribution patterns Pt1 and Pt2, on the basis of the switching information received from the interrogator 2. Thus, the present communication system permits data communication between the interrogator 2 and each endpoint device 3a-3c, while reducing a risk of an inference among the reflected signals transmitted from the endpoint devices 3a-3c, without having to use a large number of spread codes.

Further, the individual-frequency-utilization-ratio setting portion 94 also uses the supply voltage of the power source device 86 of each endpoint device 3a-3c, for setting the individual-frequency-utilization-ratio distribution patterns of the individual endpoint devices 3a-3c, so that the risk of the collision among the reflected signals can be further reduced.

In addition, the endpoint devices 3a-3c of the eighth embodiment are controlled such that the frequencies of the subcarrier signals are likely to be lowered with a decrease in the supply voltages of their power source devices 86, so that the amount of consumption of electric energy by the endpoint devices 3a-3c can be significantly reduced. Therefore, where the power source device 86 is arranged to rectify and smooth the interrogating signal for obtaining an electric energy, the data communication between each endpoint device 3a-3c and the interrogator 2 is possible even if the distance therebetween is relatively large.

Further, the individual-frequency-utilization-ratio distribution patterns of the endpoint devices 3a-3c can be set with high efficiency, by the individual-frequency-utilization-ratio setting portion 94, by simply selecting one of the two predetermined individual-frequency-utilization-ratio distribution patterns Pt1 and Pt2 on the basis of the received switching information.

Figure 32:
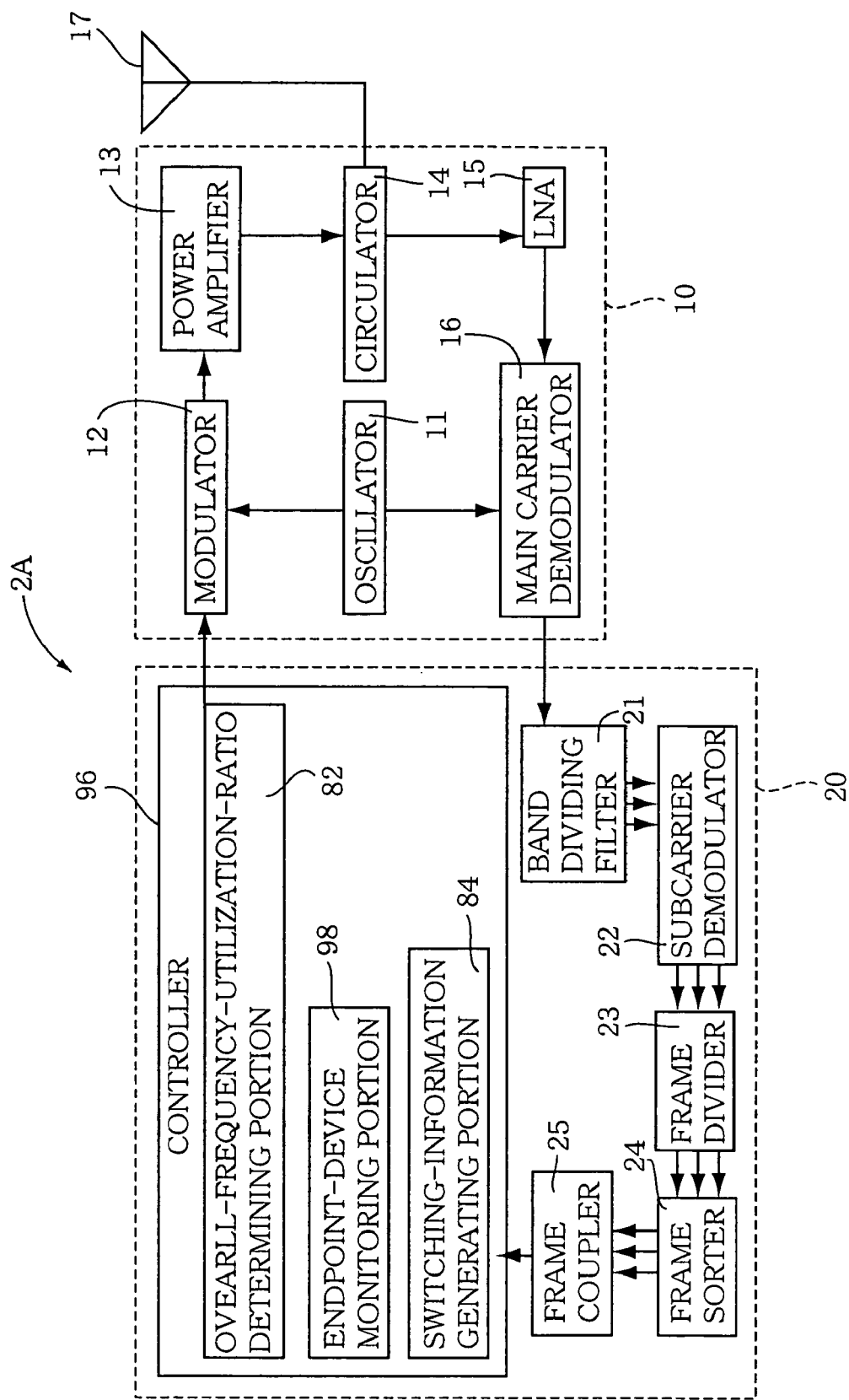
FIG. 32 is a block diagram showing an arrangement of each endpoint device in a ninth embodiment of the invention.
Figure 33:
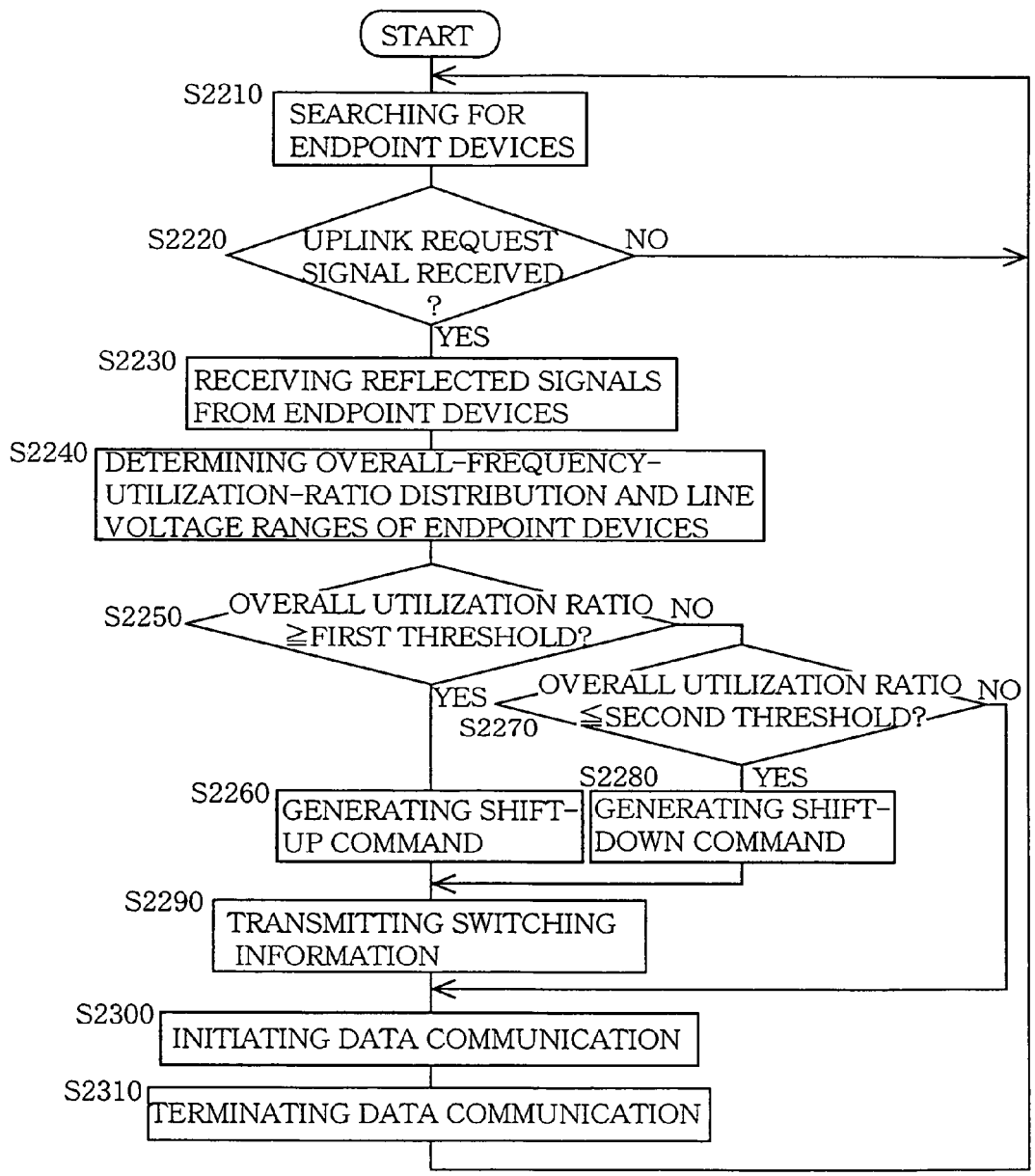
FIG. 33 is a flow chart illustrating a data communication routine executed by interrogator in the ninth embodiment.
Figure 34:
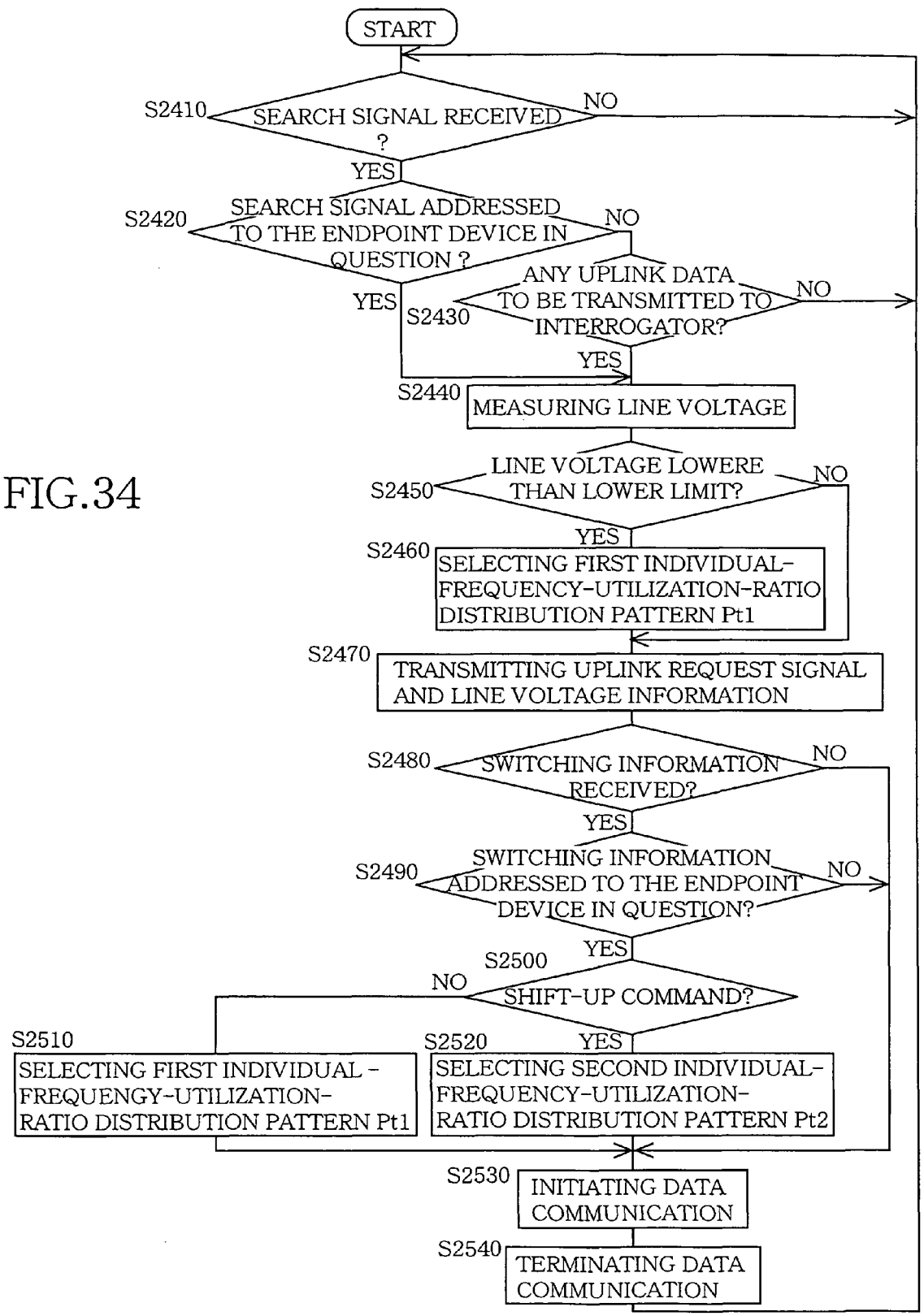
FIG. 34 is a flow chart illustrating a data communication routine executed by the endpoint device in the ninth embodiment.

Referring next to FIGS. 32-34, there will be described a ninth embodiment of the invention, which is different from the eighth embodiment of FIGS. 23-31, in that an interrogator 2A has a controller 96 which incorporates an endpoint-device monitoring portion 98, as well as the overall-frequency-utilization-ratio determining portion 82 and the switching-information generating portion 84, as shown in FIG. 32.

The ninth embodiment is further different from the eighth embodiment in that an output of the power-source-information detecting portion 92 of each of endpoint devices 3Aa-3Ac (not shown) is transmitted to the interrogator 2A so that the endpoint-device monitoring portion 98 determines one of a plurality of supply voltage ranges in which the supply voltage of the power source device 86 detected by the power-source-information detecting portion 92 of each endpoint device 3Aa-3Ac falls.

The switching-information generating portion 82 is arranged to generate the switching information to be received by the individual-frequency-utilization-ratio setting portion 94, on the basis of not only the distribution of the overall frequency utilization ratio of the subcarrier signals determined by the overall-frequency-utilization-ratio determining portion 82, but also the supply voltage range of each endpoint device 3Aa-3Ac determined by the endpoint-device monitoring portion 98. As in the eighth embodiment, the switching information consists of the endpoint-device information in the form of the supply voltage range, and the shifting command (either the shift-down command or the shift-up command).

The flow chart of FIG. 33 illustrates a data communication routine executed by the interrogator 2A in the communication system of the ninth embodiment. This data communication routine is identical with the data communication routine of FIG. 29 executed by the interrogator 2 in the eighth embodiment, except step S2240 which corresponds to step S1640 of FIG. 29. Steps S2210-S2230 and S2250-S2310 of FIG. 33 are identical with steps S1610-S1630 and S1650-S1700 of FIG. 29.

In step S2240, the overall-frequency-utilization-ratio determining portion 84 determines the distribution of the overall frequency utilization ratio of the received subcarrier signals, while at the same time the endpoint-device monitoring portion 98 determines one of the predetermined supply voltage ranges in which the supply voltage of each endpoint device 3Aa-3Ac which has been detected by the power-source-information detecting portion 92 and transmitted to the interrogator 2 falls. Step S2240 is followed by steps S2250 and S2270 corresponding to steps S1650 and 1670 of FIG. 29.

The flow chart of FIG. 34 illustrates a data communication routine executed by each of the endpoint devices 3Aa-3Ac. This data communication routine is identical with the data communication routine of FIG. 30 executed by each endpoint device 3a-3c in the eighth embodiment, except step S2470 which corresponds to step S1870 of FIG. 30.

In step S2470, each endpoint device 3Aa-3Ac transmits to the interrogator 2A the reflected signal containing the uplink request signal and supply voltage information indicative of the supply voltage of the power source device 86 detected by the power-source-information detecting portion 92. Step S2470 is followed by step S2480 corresponding to step S1880 of FIG. 30.

In the communication system according to the ninth embodiment described above, the individual-frequency-utilization-ratio distribution patterns P1-P3 of the endpoint devices 3Aa-3Ac are determined or adjusted by the individual-frequency-utilization-ratio setting portion 94, according to the switching information which is generated by the switching-information generating portion 84 on the basis of not only the detected distribution of the overall frequency utilization ratio of the subcarrier signals determined by the overall-frequency-utilization-ratio determining portion 82, but also the supply voltage ranges of the individual endpoint devices 3Aa-3Ac detected by the endpoint-device monitoring portion 98. This arrangement permits the interrogator 3A to recognize each endpoint device the frequency-utilization-ratio distribution pattern of which is to be changed (from Pt1 to Pt2, or from Pt2 to Pt1), and assures significant reduction in the risk of a collision among the reflected signals and the amount of consumption of electric energy by the endpoint devices 3Aa-3Ac, and an increase in the maximum distance between the interrogator 2A and the endpoint devices 3Aa-3Ac that permits data communication therebetween.

There will be described a communication system according to a tenth embodiment of this invention, by reference to FIG. 35. This tenth embodiment is identical with the eighth embodiment, except timings at which endpoint devices 3Ba-3Bc, (not shown) respond to the interrogating signal to the interrogator 2.

Figure 35:
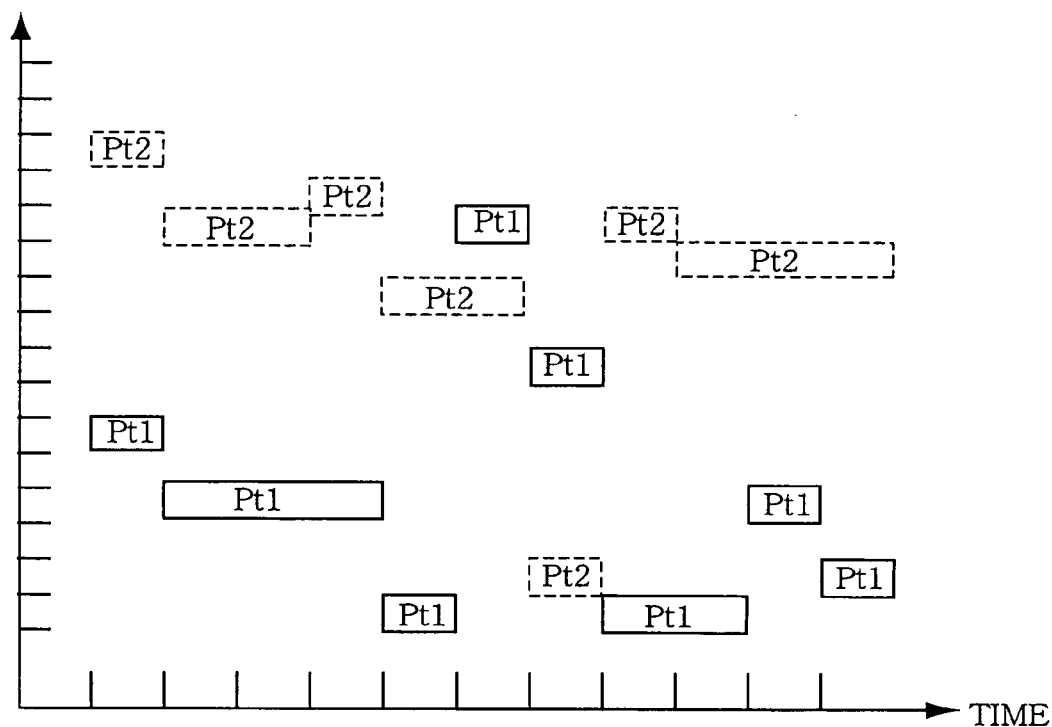
FIG. 35 is a graph indicating a frequency distribution of subcarrier signals in relation to time, where different frequency occupying ratio patterns are combined together, according to a tenth embodiment of the present invention.

The graph of FIG. 35 shows a frequency distribution of the subcarrier signals in relation to time, where the subcarrier signals are transmitted according to a combination of the above-described first and second individual-frequency-utilization-ratio distribution patterns Pt1 and Pt2 shown in FIG. 25. In the graph, the frequency is taken along the ordinate while the time is taken along the abscissa, as in the graph of FIG. 28. As shown in FIG. 35, each endpoint device 3Ba-3Bc is arranged to transmit the reflected signals (subcarrier signal) in respective different time frames. Since the individual-frequency-utilization-ratio setting portion 94 sets the individual-frequency-utilization-ratio distribution pattern of each of the individual endpoint devices 3Ba-3Bc, by selecting one of the two distribution patterns Pt1 and Pt2, the relatively low frequency channels or bands are relatively frequently used when the first distribution pattern Pt1 is selected for the endpoint device 3Ba-3Bc, while the relatively high frequency channels or bands are relatively frequently used when the second distribution pattern Pt2 is selected, even where the time frames during which the reflected signals in those frequency bands are transmitted are different from each other. In this embodiment, the individual frequency utilization ratio of the subcarrier signal is a ratio of the time period during which the subcarrier signal having a certain frequency band is being transmitted. Therefore, the individual frequency utilization ratio increases with an increase in the time frame. Accordingly, the individual frequency utilization ratio of each endpoint device can be increased by prolonging the time frame, and can be lowered by shortening the time frame.

The tenth embodiment has a reduced risk of a collision among the reflected signals, owing to the use of different time frames during which the reflected signals are transmitted from the individual endpoint devices 3Ba-3Bc to the interrogator 2.

In the eighth and ninth embodiments, each endpoint device 3a-3c, 3Aa-3Ac is provided with the power-source-information detecting portion 92 to detect the supply voltage of the power source device 86, so that the individual-frequency-utilization-ratio setting portion 94 sets the individual-frequency-utilization-ratio distribution pattern on the basis of the detected supply voltage as well as the determined overall-frequency-utilization-ratio distribution. However, the provision of the power-source-information detecting portion 92 is not essential. Further, each endpoint device whose frequency-utilization-ratio distribution pattern is to be changed may be identified by identification data contained in the switching information received from the interrogator 2, rather than the supply-voltage-range information indicative of the range in which the supply voltage of the endpoint device falls. Further, the interrogator may be arranged to transmit to all of the endpoint devices 3a-3c, 3Aa-3Ac the switching information for setting the individual-frequency-utilization-ratio distribution patterns.

In the eighth and ninth embodiments, the individual-frequency-utilization-ratio setting portion 94 is arranged to select one of the individual-frequency-utilization-ratio distribution patterns Pt1 and Pt2 which are represented by data tables. However, the setting portion 94 may be arranged to the distribution of the individual frequency utilization ratio for each endpoint device, according to a selected one of predetermined formula.

Although the eighth and ninth embodiments are arranged to set the individual-frequency-utilization-ratio distribution patterns of the endpoint devices, irrespective of whether the power source device 86 is a primary or secondary battery cell, the setting portion 94 may be arranged to set the individual-frequency-utilization-ratio distribution pattern of each endpoint device, depending upon whether the power source device 86 is the primary battery cell or the secondary battery cell. In this case, the power-source-information detecting portion 92 is arranged to determine whether the power source device 86 is the primary or secondary battery cell, and the setting portion 94 selects the first individual-frequency-utilization-ratio distribution pattern Pt1, to use the relatively low frequencies when the primary battery cell is provided as the power source device 86. This arrangement is effective to reduce the amount of consumption of the electric energy stored in the primary battery cell, which cannot be charged.

While the power source device 86 used in the eighth and ninth embodiments is a primary or secondary battery cell, or a circuit to rectify and smooth the interrogating signal to obtain an electric energy, each endpoint device may be provided with any other type of power source device, such as a solar cell. Although the supply voltage and other operating state of the solar cell varies from time to time, it is possible to reduce the risk of a collision among the reflected signals transmitted from the individual endpoint devices, by adjusting the individual-frequency-utilization-ratio distribution patters of the individual endpoint devices, depending upon the supply voltage of the solar cell.

In the eighth and ninth embodiments, the individual-frequency-utilization-ratio setting portion is arranged to set the individual-frequency-utilization-ratio distribution patterns of the individual endpoint devices, and store data indicative of the setting of the distribution patterns. However, the operation to set the distribution patterns and the operation to store the data indicative of the setting may be performed by respective different functional portions of the controller 90 of each endpoint device.

In the eighth, ninth and tenth embodiments, the interrogator 2, 2A is arranged to generate the switching information for setting the individual-frequency-utilization-ratio distribution patterns of the endpoint devices 3a-3c, 3Aa-3Ac, 3Ba-3Bc, on the basis of the distribution of the overall frequency utilization ratio of the reflected signals received from the endpoint devices. However, the interrogator need not include the switching-information generating portion 84, and each endpoint device may be arranged to set its frequency-utilization-ratio distributing pattern, on the basis of the supply voltage of the power source device 86, and/or the type of the power source device 86. This modification is also effective to reduce the risk of a collision among the reflected signals and the amount of consumption of electric energy by the endpoint devices.

While the preferred embodiments of this invention and some modifications thereof have been described in detail by reference to the accompanying drawings, it is to be understood that the present invention may be embodied with various other changes, modifications and improvements, which may occur to those skilled in the art, without departing from the spirit and scope of the invention defined in the appended claims.

What is claimed is:

1. An endpoint device for responding to an interrogator after receiving an interrogating signal containing a main carrier by transmitting a reflected signal generated by modulating the main carrier with appropriate information, the endpoint device comprising:
   an individual-frequency-utilization-ratio setting portion operable to set a distribution of an individual frequency utilization ratio which is a ratio of time period during which each frequency channel is used as a hopping frequency of a subcarrier signal in which a frequency hopping is implemented and which is used to modulate the main carrier, over a predetermined range of frequency of the subcarrier signal that consists of a plurality of mutually adjacent frequency channels;
   a frequency determining portion operable on the basis of the distribution of the individual frequency utilization ratio set by the individual-frequency-utilization-ratio setting portion to determine a frequency of the subcarrier signal by random selection within the predetermined range of frequency;
   a battery cell; and
   a power-source-information detecting portion operable to detect at least two discrete operating states of the battery cell, the at least two discrete operating states of the battery cell being at least able to power the endpoint device;
   wherein in response to a supply voltage of the battery cell being lower than a predetermined threshold value, the individual-frequency-utilization-ratio setting portion is configured to shift a statistical center frequency of the distribution of the individual frequency utilization ratio to a lower frequency by selecting a first individual-frequency-utilization-ratio distribution pattern from a plurality of individual-frequency-utilization-ratio distribution patterns that includes at least the first individual-frequency-utilization-ratio distribution pattern and a second individual-frequency-utilization ratio-distribution pattern,
   wherein the first individual-frequency-utilization-ratio distribution pattern is relatively high in the relatively low frequency channels and the second individual-frequency-utilization-ratio distribution pattern is relatively high in the relatively high frequency channels.

2. The endpoint device according to claim 1, wherein the individual-frequency-utilization-ratio setting portion is operable to raise a center frequency of the distribution of the individual frequency utilization ratio of the subcarrier signal, when a supply voltage of the battery cell detected by the power-source-information detecting portion is higher than a predetermined threshold value.

3. The endpoint device according to claim 1, wherein the individual-frequency-utilization-ratio setting portion is operable to select one of a plurality of different individual-frequency-utilization-ratio distribution patterns each of which represents a relationship between the plurality of mutually adjacent frequency channels and the individual frequency utilization ratio of the subcarrier signal, the endpoint device including a memory storing data table representative of the different individual-frequency-utilization-ratio distribution patterns, the frequency determining portion being operable to hop the frequency of the subcarrier signal according to the selected one of the different individual-frequency-utilization-ratio distribution patterns.

4. The endpoint device according to claim 1, wherein the individual-frequency-utilization-ratio setting portion is operable to set the distribution of the individual frequency utilization ratio of the subcarrier signal so that a center frequency of the distribution is lower when the battery cell is a primary battery cell, than when the battery cell is other than the primary battery cell.

5. The endpoint device according to claim 1, further comprising a solar cell as a power source device.

6. The endpoint device according to claim 1, wherein the individual-frequency-utilization-ratio setting portion is operable to set the distribution of the individual frequency utilization ratio of the subcarrier signal, by changing at least an amount of data transmitted with the reflected signal and a time period during which the reflected signal is transmitted, each time the reflected signal having a selected one of the mutually adjacent frequency channels is transmitted.

7. A communication system comprising:
   an interrogator having a transmitting portion operable to transmit an interrogating signal containing a main carrier; and
   a plurality of endpoint devices each operable to receive the interrogating signal and respond to the interrogator with a reflected signal that is generated by modulating the main carrier with appropriate information;
   each endpoint device including:
      (a) an individual-frequency-utilization-ratio setting portion operable to set a distribution of an individual frequency utilization ratio which is a ratio of a time period during which each frequency channel is used as a hopping frequency of a subcarrier signal in which a frequency hopping is implemented and which is used to modulate the main carrier over a predetermined range of frequency of the subcarrier signal, which consists of a plurality of mutually adjacent frequency channels,
      (b) a frequency determining portion operable on the basis of the distribution of the individual frequency utilization ratio set by the individual-frequency-utilization-ratio setting portion to determine a frequency of the subcarrier signal by random selection within the predetermined range of frequency,
      (c) a battery cell, and
      (d) a power-source-information detecting portion operable to detect supply-voltage information indicative of at least two discrete supply voltages of the battery cell, the at least two discrete supply voltages of the battery cell being at least able to power the endpoint device;
   the interrogator including:
      (i) an overall-frequency-utilization-ratio determining portion operable to determine a distribution of an overall frequency utilization ratio of the reflected signal received from the plurality of endpoint devices,
      (ii) an endpoint-device monitoring portion operable on the basis of the supply-voltage information received from the power-source-information detecting portion to determine one of a plurality of predetermined supply voltage ranges in which the supply voltage of the battery cell detected by the power-source-information detecting portion of the each endpoint device falls, and
      (iii) a switching-information generating portion operable on the basis of the distribution of the overall frequency utilization ratio determined by the overall-frequency-utilization-ratio determining portion, and a result of determination by the endpoint-device monitoring portion, to generate switching information on the basis of which the individual-frequency-utilization-ratio determining portion of the each endpoint device sets the distribution of the individual frequency utilization ratio of the subcarrier signal;

the transmitting portion of the interrogator being operable to transmit the interrogating signal containing the main carrier and the switching information generated by the switching-information generating portion; and the individual-frequency-utilization-ratio setting portion is configured to shift a statistical center frequency of the distribution of the individual frequency utilization ratio to a lower frequency in response to a supply voltage of the battery cell being lower than a predetermined threshold value, wherein the statistical center is shifted based on the switching information generated by the switching-information generating portion and one of the at least two discrete supply voltages of the battery cell detected by the power-source-information detecting portion, the statistical center is shifted by selecting a first-individual-frequency-utilization-ratio distribution pattern from a plurality of individual-frequency-utilization-ratio distribution patterns that includes at least the first individual-frequency-utilization-ratio distribution pattern and a second individual-frequency-utilization-ratio distribution pattern, and wherein the first individual-frequency-utilization-ratio distribution pattern is relatively high in the relatively low frequency channels and the second-individual-frequency-utilization-ratio distribution pattern is relatively high in the relatively high frequency channels.

8. The communication system according to claim 7, wherein the switching-information generating portion is operable to generate the switching information for raising a center frequency of the distribution of the individual frequency utilization ratio of the subcarrier signal of the each endpoint device, when the overall-frequency-utilization-ratio determining portion determines that the overall frequency utilization ratio of the reflected signals in low frequency channels of the predetermined range of frequency of the subcarrier signal is higher than a predetermined threshold value.

9. The communication system according to claim 7, wherein the switching-information generating portion is operable to generate the switching information for lowering a center frequency of the distribution of the individual frequency utilization ratio of the subcarrier signal of the each endpoint device, when the overall-frequency-utilization-ratio determining portion determines that the overall frequency utilization ratio of the reflected signals in the predetermined range of frequency of the subcarrier signal is lower than a predetermined threshold value.

10. The communication system according to claim 7, wherein the plurality of endpoint devices include at least one first endpoint device wherein a primary battery cell is provided as the battery cell, and at least one second endpoint device wherein a secondary battery cell is provided as the battery cell, the switching-information generating portion being operable to generate the switching information that causes the individual-frequency-utilization-ratio setting portion of each of the at least one first endpoint device to set the distribution of the individual frequency utilization ratio of the subcarrier signal so that a center frequency of the distribution of the individual frequency utilization ratio of the subcarrier signal of the each first endpoint device is lower than that of the each second endpoint device.

* * * * *